US006938079B1

(12) United States Patent
Anderson et al.

(10) Patent No.: US 6,938,079 B1
(45) Date of Patent: Aug. 30, 2005

(54) SYSTEM AND METHOD FOR AUTOMATICALLY CONFIGURING A CLIENT DEVICE

(75) Inventors: Mark Anderson, Lindenhurst, IL (US); Gordon Molek, Vernon Hills, IL (US); Sachin Lawande, Schaumburg, IL (US); Ray Winninger, South Holland, IL (US); John Conmy, Oak Park, IL (US)

(73) Assignee: 3Com Corporation, Marlborough, MA (US)

( * ) Notice: Subject to any disclaimer, the term of this patent is extended or adjusted under 35 U.S.C. 154(b) by 605 days.

(21) Appl. No.: 09/665,050

(22) Filed: Sep. 19, 2000

(51) Int. Cl.[7] .............................................. G06F 15/177
(52) U.S. Cl. ........................ 709/222; 709/217; 709/218; 709/219; 709/220; 709/223; 709/224; 709/225
(58) Field of Search ................................. 709/217–219, 709/220, 222, 223–225

(56) References Cited

U.S. PATENT DOCUMENTS

| | | | |
|---|---|---|---|
| 4,432,057 A | 2/1984 | Daniell et al. ............... 364/300 |
| 4,866,611 A | 9/1989 | Cree et al. .................... 364/300 |
| 5,261,094 A | 11/1993 | Everson et al. .............. 395/600 |
| 5,392,390 A | 2/1995 | Crozier ......................... 395/161 |
| 5,434,994 A | 7/1995 | Shaheen et al. ............. 395/500 |
| 5,475,819 A * | 12/1995 | Miller et al. ................. 709/203 |
| 5,475,833 A | 12/1995 | Dauerer et al. .............. 395/600 |
| 5,727,202 A | 3/1998 | Kucala ......................... 395/610 |
| 5,737,739 A | 4/1998 | Shirley et al. ............... 707/512 |
| 5,787,441 A | 7/1998 | Beakhardt .................... 707/201 |
| 5,832,489 A | 11/1998 | Kucala ......................... 707/19 |
| 5,884,323 A | 3/1999 | Hawkins et al. ............. 707/201 |
| 5,884,324 A | 3/1999 | Cheng et al. ................ 707/201 |
| 5,973,696 A | 10/1999 | Agranat et al. .............. 345/357 |
| 5,983,228 A | 11/1999 | Kobayashi et al. ........... 707/10 |
| 6,000,000 A | 12/1999 | Hawkins et al. ............. 707/201 |
| 6,006,242 A | 12/1999 | Poole et al. .................. 707/531 |
| 6,006,274 A | 12/1999 | Hawkins et al. ............. 709/248 |
| 6,012,088 A * | 1/2000 | Li et al. ....................... 709/219 |
| 6,449,642 B2 * | 9/2002 | Bourke-Dunphy et al. . 709/222 |
| 6,535,896 B2 * | 3/2003 | Britton et al. ............... 715/523 |
| 6,560,606 B1 * | 5/2003 | Young ........................... 707/100 |

OTHER PUBLICATIONS

Borenstein et al, "*MIME (Multipurpose Internet Mail Extensions): Mechanisms for Specifying and Describing the Format of Internet Message Bodies*", Network Working Group, RFC 1341, Jun. 1992, pp. i–77.

(Continued)

*Primary Examiner*—Glenton B. Burgess
(74) *Attorney, Agent, or Firm*—McDonnell Boehnen Hulbert & Berghoff LLP

(57) ABSTRACT

A user of a client device selects a service provider from a plurality of available service providers. The client device then queries the user for the user's information and formats the user's information into a predetermined data structure and format. The client device connects to the service provider and sends the formatted user's information to the service provider. The service provider responsively creates configuration data and provides it to the client device. The configuration data is used to configure a plurality of applications on the client device, allowing the user to establish future communication sessions with the service provider.

21 Claims, 24 Drawing Sheets

OTHER PUBLICATIONS

T. Berners–Lee, "*Universal Resource Identifiers in WWW—A Unifying Syntax for the Expression of Names and Addresses of Objects on the Network as used in the World–Wide Web*", Network Working Group, RFC 1630, Jun. 1994, pp. 1–28.

Berners–Lee et al, "*Hypertext Transfer Protocol—HTTP/1.0*", Network Working Group, RFC 1945, May 1996, pp. 1–60.

Fielding et al, "*Hypertext Transfer Protocol—HTTP/1.1*", Network Working Group, RFC 2068, Jan. 1997, pp. 1–162.

Douglas C. McArthur, *World Wide Web & HTML*, Dr. Dobb's Journal, Dec. 1994, pp. 18–26 and 86.

Berners–Lee et al., "The World–Wide Web", Communications of the ACM, vol. 37, No. 8, Aug. 1994, pp. 76–82.

IETF, W3C, "*Information technology–Document description and processing languages–HyperText Markup Language (HTML)*", ISO/IEC 15445:2000/DCOR 1:2001 (E), Dec. 16, 2000, pp. 1–19.

Bray et al., "*Extensible Markup Language (XML) 1.0*", W3C Recommendation, REC–xml–19980210, Feb. 10, 1998, pp. 1–28.

Berners–Lee et al, "*Hypertext Markup Language—2.0*", Network Working Group, RFC 1866, Nov. 1995, pp. 1–77.

* cited by examiner

SYSTEM AND METHOD FOR AUTOMATICALLY CONFIGURING A CLIENT DEVICE

CROSS REFERENCES TO RELATED APPLICATIONS

The present application is related to co-pending and commonly assigned U.S. patent application Ser. No. 09/665,635, for METHOD AND SOFTWARE ARCHITECTURE FOR ACCESSING AND DISPLAY DATA IN A CLIENT DEVICE, filed on even date herewith, herein incorporated by reference for all purposes. The present invention relates to co-pending and commonly assigned U.S. patent application Ser. No. 09/664,613, for METHOD AND APPARATUS FOR AUTOMATICALLY UPDATING INFORMATION IN A CLIENT DEVICE, filed on even date herewith, herein incorporated by reference for all purposes.

FIELD OF INVENTION

The present invention relates to computer communication and more particularly to a system and a method for providing access to Internet Service Providers.

BACKGROUND OF THE INVENTION

Users of computer systems use their computers to perform a variety of tasks, such as word processing, spread sheets, games, and email. Each of these tasks typically involves activating a user application program that interacts with the user to perform the task. An application is a software program that carries out a task, i.e. a database manager, a spreadsheet, a communications package, a graphics program or a word processor. User input is received from the user via user input devices, such as a mouse and keyboard, and information is output to the user by outputting information to the user via a display, such as a monitor.

Each user application typically has its own user interface. In other words, each application accesses data that is typically specific to the application, processes the data, and assembles and formats textual and graphical data for display to the user. The data for each application is typically formatted and structured specifically for the application, so, unless multiple applications are designed to share data, it is often difficult for one application program to access and utilize the data from another application program. Furthermore, the task of assembling and formatting data for output to the user can be complex. Each user application typically uses the interface drivers provided by the operating system of the computer system to output information to the display of the computer system. However, the user interface software for each program is often substantially customized for that program and can represent a significant amount of the code for each application.

Another type of user application is a browser application, which provides users of computer systems access to a vast amount of information through their network connections to the Internet. The Internet is a wide area network that interconnects computer networks around the world and provides a user client device connected to the Internet with access to a broad array of resources connected to the Internet, i.e. access to servers that are also connected to the Internet. In order for information to be accessible to a wide number of client devices and servers, a body of software, a set of protocols and a set of defined conventions are generally needed that permit intercommunication. The World Wide Web is one example of such a body of software, set of protocols and set of defined conventions.

The World-Wide-Web and similar private architectures, such as internal corporate LANs, provide a "web" of interconnected document entities. On the World-Wide-Web, these document entities are located on various sites on the global Internet. The World-Wide-Web is also described in "The World-Wide Web," by T. Berners-Lee, R. Cailliau, A. Luotonen, H. F. Nielsen, and A. Secret, Communications of the ACM, 37 (8), pp. 76–82, August 1994, and in "World Wide Web: The Information Universe," by Berners-Lee, T., et al., in Electronic Networking: Research, Applications and Policy, Vol. 1, No. 2, Meckler, Westport, Conn., Spring 1992. On the Internet, the World-Wide-Web is a collection of documents (i.e., content), client software (i.e., browsers) and server software (i.e., servers) which cooperate to present and receive information from users. The World-Wide-Web is also used to connect users to a variety of databases and services from which information may be obtained.

The World-Wide-Web is based on a conventional client-server model. Content is held in documents accessible to servers. Clients can request, through an interconnect system, documents which are then served to the clients through the interconnect system. The client software is responsible for interpreting the contents of the document served, if necessary.

Among the types of document entities in a "web" are documents and scripts. Documents in the World-Wide-Web may contain text, images, video, sound or other information sought to be presented, in undetermined formats known to browsers or extensions used with browsers. The presentation obtained or other actions performed when a browser requests a document from a server is usually determined by text contained in a document which is written in Hypertext Markup Language (HTML). HTML is described in Hyper-Text Markup Language Specification—2.0, by T. Berners-lee and D. Connolly, RFC 1866, proposed standard, November 1995, and in "World Wide Web & HTML," by Douglas C. McArthur, in Dr. Dobbs Journal, December 1994, pp. 18–20, 22, 24, 26 and 86. HTML documents stored as such are generally static, that is, the contents do not change over time except when the document is manually modified. Scripts, on the other hand, can generate HTML documents when executed. Some common scripting languages are CGI (common gateway interface), PERL, and Active Server Pages (ASP). Scripts can provide the web server with an interface to other applications such as database management software and the like.

HTML is one of a family of computer languages referred to as mark-up languages. Mark-up languages are computer languages that describe how to display, print, etc., a text document in a device-independent way. The description takes the form of textual tags indicating a format to be applied or other action to be taken relative to document text. The tags are usually unique character strings having defined meanings in the mark-up language. Tags are described in greater detail, below.

HTML is used in the World-Wide-Web because it is designed for writing hypertext documents. The formal definition is that HTML documents are Standard Generalized Markup Language (SGML) documents that conform to a particular Document Type Definition (DTD). An HTML document includes a hierarchical set of markup elements, where most elements have a start tag, followed by content, followed by an end tag. The content is a combination of text and nested markup elements. Tags are enclosed in angle brackets ('<' and '>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features.

A site, i.e. an organization having a computer connected to a network, that wishes to make documents available to network users is called a "Web site" and must run a "Web server" program to provide access to the documents. A Web server program is a computer program that allows the server computer on the network to make documents available to the rest of the World-Wide-Web or a private web. The documents are often hypertext documents in the HTML language, but may be other types of document entities as well, as well as images, audio and video information.

The information that is managed by the Web server includes hypertext documents that are stored on the server or are dynamically generated by scripts on the Web server. Several Web server software packages exist, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc 11 workstation running the Unix operating system, and personal computers with the Intel Pentium processor running the Microsoft® MS-DOS operating system and the Microsoft® Windows™ operating system.

A user typically accesses the resources of the World Wide Web through the use of a browser application program. The browser program allows the user to retrieve and display documents from Web servers. Some of the popular Web browser programs are: the Navigator browser from NetScape Communications Corp., of Mountain View, Calif.; the Mosaic browser from the National Center for Supercomputing Applications (NCSA); the WinWeb browser, from Microelectronics and Computer Technology Corp. of Austin, Tex.; and the Internet Explorer, from Microsoft Corporation of Redmond, Wash. Browsers exist for many platforms, including personal computers with the Intel Pentium processor running the Microsoft® MS-DOS operating system and the Microsoft® Windows™ environment, and Apple Macintosh personal computers.

A browser program typically executes on a client device connected to Internet. The Web server and the Web browser communicate using the Hypertext Transfer Protocol (HTTP) message protocol and the underlying transmission control protocol/internet protocol (TCP/IP) data transport protocol of the Internet. HTTP is described in Hypertext Transfer Protocol—HTTP/1.0, by T. Berners-Lee, R. T. Fielding, H. Frystyk Nielsen, Internet Draft Document, Oct. 14, 1995, and is currently in the standardization process. At this writing, the latest version is found in RFC 2068 which is a draft definition of HTTP/1.1. In HTTP, the Web browser establishes a connection to a Web server and sends an HTTP request message to the server.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) are a standardized way for describing the content of messages that are passed over a network. HTTP request and response messages use MIME header lines to indicate the format of the message. MIME is described in more detail in MIME Multipurpose Internet Mail. Extensions): Mechanisms for Specifying and Describing the Format of Internet Message Bodies, Internet RFC 1341, June 1992.

The user enters a resource identifier value that identifies a desired web resource through a command input line of the user interface of the browser. The resource identifier value is typically a Uniform Resource Identifier (URI) or a Uniform Resource Locator (URL) that is resolved into an address for a server device having the desired object. See Request for Comment (RFC) 1630 available through the Internet Engineering Task Force at URL www.ietf.org.

When a URL value has been input to the browser, the browser transmits a command containing the URL value. The command is typically formatted according to a Hypertext Transfer Protocol (HTTP) that provides a convention for commands and replies over the web. The URL value in the command is typically resolved to an address for a server connected to the web and to a resource on the server, such as a document. See RFC 1945. The server that receives the command will typically respond with an HTTP reply message containing information. This information is typically in the form of a document that uses the Hypertext Mark-up Language (HTML).

In response to an HTTP request message, the server performs any requested action and returns an HTTP response message containing an HTML document resulting from the requested action, or an error message. The returned HTML document may simply be a file stored on the Web server, or it may be created dynamically using a script called in response to the HTTP request message. For instance, to retrieve a document, a Web browser residing in a client device sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed.

The server constructs the HTML reply message by retrieving an HTML document corresponding to the URL value. The HTML document typically includes markup data that encodes a description of the HTML document's graphical layout and logical structure. It may also include a set of tags that identify data entities that are to be retrieved and inserted into the HTML document as indicated by the tag. These tags may take many forms, one common form being Server Side Include (SSI) statements. SSI statements are command embedded in the document that are interpreted by the server prior to the server sending the completed document to the requester. In response to SSI statements, the server typically obtains data for the HTML document, or sets environmental variables, or the like. The SSI statement may result in the server executing another program, or transmitting a database query to a database manager to obtain specified data. The database manager may be internal to the server itself or may be connected to the server via a backend network. The database manager uses parameters within the query to search and retrieve the data object. The data object is returned to the server for incorporation into the HTML document. When the server has completed the population of the HTML document with the data entities for each tag of the HTML document, the server will transmit the HTML document in the reply to the client device.

As another example, a user may fill in a form requesting a database search, the Web browser will send an HTTP request message to the Web server that may include the name of the database to be searched and the search parameters and the URL of the search script. The Web server calls a program or script to process the SSI, passing in the search parameters. The SSI processing program examines the parameters and attempts to answer the query, perhaps by sending a query to a database interface. When the SSI processing program receives the results of the query, it constructs an HTML document that is returned to the Web server, which then sends it to the Web browser in an HTTP response message. Of course, the SSI processing may be performed by the web server software itself.

When the client device receives the response from the server containing the HTML document, the browser will process the document according to the HTML standard in order to render a page for display to the user via the display of the user's computer system. The HTML document provided by the server to the browser in the client may contain text, which is formatted and rendered according to the corresponding markup instructions, and further references to objects identified using URLs. To render the HTML document into a page, the browser application will perform a "get" commands for each URL, whereby the browser obtains the data object from the remote server corresponding to the URL embedded in the HTML document.

U.S. Pat. Nos. 5,973,696; 6,006,242; 5,983,228; and 5,737,739 provide additional examples of web architectures and applications and are herein incorporated by reference.

FIG. 1 is a functional block diagram illustrating an example of an architecture 10 involving a client device 20, e.g. a user's computer system, and a server device 60 that can communicate via a network, such as the Internet. Client device 20 includes a keyboard 24 and a mouse 26 as user input devices and a display 28 for user output. Client 20 has a communications port, such as a network interface card, through which it is connected to a local area network (LAN) 30 via communication link 22. LAN 30 is connected to a public Internet Protocol (IP) network 50, i.e. a wide area network, that provides access to a broad range of network resources including those of remote server 60, which is connected to public IP network 50 via communication link 62. Client device 20 is controlled by a user through a combination of command inputs via mouse 26 in concert with keyboard 24 to execute application programs in client device 20 that display output to the user via display 28.

FIG. 2 is a functional block diagram illustrating an example of another architecture 15 involving a client device 20, e.g. a user's computer system, and a server device 60 that can communicate via a network, such as the Internet. In architecture 15, client device 20 includes a communications device, such as a modem, capable of communicating through public switched telephone network (PSTN) 35 to a network access server (NAS) 40. NAS 40 is connected to IP network 50 and enables client device 20 to communicate with server 60.

FIG. 3 is a simplified functional block diagram illustrating an embodiment of an architecture 100 for a central processing unit (CPU) for client device 20. The CPU includes a processor 110 connected to a system bus 120. Processor 110 accesses several subsystems via bus 120 including a memory subsystem 130 for storage of data and code. A network interface subsystem 140 is connected to bus 120 and is used to communicate with the network via connection 22. The network interface may, for example, be a network interface card or a modem device that communicates with a network access server connected to public IP network 50.

The CPU outputs information to the user via a display interface 150 connected to bus 120 that sends video information to display monitor 28. The CPU receives user input via user interface 160 that receives user input via keyboard 24 and mouse 26 and forwards the user input to processor 110 via bus 120.

FIG. 4 is a simplified software architecture diagram illustrating an embodiment of a software architecture 200 for a typical client device 20. At the center of architecture 200 is an operating system (OS) 210 that controls access to the resources of the client device, including memory, display and communications, and activation of application programs 260 and 270. Output to display monitor 28 of client 20 is accomplished using the display driver primitives 230 provided through OS 210. User input from keyboard 24 and mouse 26 is detected by user interface drivers 240, which receive, interpret, and forward the user input signals to OS 210 for further action. Communications with the network connection 22 are handled through communications drivers 250.

A user of client device 20 selects one of user application programs 260 and 270 through a combination of user inputs. For example, the user may double click an icon displayed on monitor 28 with mouse 26 to activate user application 260. OS 210, upon receiving the user's selection, spawns a process for the selected application.

The application 260 will typically operate with a data store 262, which is a portion of memory subsystem 130 allocated to the application. For example, application 260 may be a word processor that retrieves a document from long term storage, such as a disk drive that is part of memory subsystem 130, and buffers the document in a random access memory (RAM) that is also part of the memory subsystem. The data in data store 262 is typically formatted for use only by the application. For another application to share data, it must be designed to read the data. For example, a word processor application may be configured so that it can read data from a spreadsheet application or import a graphic created by a graphics application.

As an application processes data, it also formats the data for display to the user and outputs the display data using display drivers 230. Above the display driver level, each application essentially includes its own graphical display capability. When, for example, application 260 is a word processor, it formats the ASCII codes and control characters from a document along with the menu and control bars for display via monitor 28 and outputs the formatted document to the user using display drivers 230.

In another example, application 270 is a browser application that communicates through communication drivers 250 to send a HTTP request containing a URL over the network and receive an HTML document in response. The browser application then renders the graphics and text of the HTML document into a page, as discussed above, and outputs the page to the display monitor 28 using display drivers 230.

Configuration of Client Devices

The Internet is a worldwide system of computer networks, a network of networks in which users at any one computer can, if they have permission, get information from any other computer. The Internet, as commonly known in the art, is a commercialized entity and anyone having a computer, a modem, a telephone line and an access provider may access the Internet. The access provider is a specialized company that is commonly known as an Internet Service Provider ("ISP"), which allows its customers to reach the Internet via a dial-up connection or a dedicated line.

An Internet service provider typically provides computer users the ability to dial telephone numbers using their computer modems or other type of connection such as a cable connection or a Digital Subscriber Line for establishing a connection to a remote computer owned or managed by the Internet service provider. Todays Internet service provider generally create a number of mini-points of presence ("POPs"). A point of presence is a location of an access point to the Internet that can terminate a large number of telephone calls. Terminating equipment comprising a number of remote computers is typically purchased for a number of locations. The remote computers then make services available to the computer users. Typically, the services available to the computer users include, for example, a search facility, a browsing facility and electronic mail facilities with which a user may send and/or receive electronic mail messages.

Prior to obtaining access to the Internet, a computer user is required to register with one of the Internet service providers. To do that, the computer user may obtain, for example, a Compact Disc-Read Only Memory ("CD-ROM") disk from an Internet service provider, and the CD-ROM typically has all required information stored on the disk and enables the computer user to register with that ISP. The computer user having the CD-ROM provided by the Internet service provider may input information required by the Internet service provider to register for the program and configure the user's computer to access the Internet service provider. However, using that method, the computer user may only be given a choice of one Internet service provider when using such a sign up process. Therefore, the existing technology employs a unique sign up process for each ISP, and such sign up processes are specially customized for each ISP.

Further, a process that a computer user is forced to follow in order to sign up with an ISP that does not provide a special program stored, for example, on a CD-ROM may be burdensome for some computer users that are not computer wizards. Typically, to sign up with such an ISP, a computer user would be required to know such information as a gateway address or an IP address of a plurality of entities associated with the user's computer system.

Therefore, a need exists to develop a universal method for configuring client devices and enabling client device users to easily register with an Internet service provider, while employing a single or universal set-up method for registering with different Internet service providers instead of using a unique set-up program for each Internet service provider.

SUMMARY OF THE INVENTION

In accordance with preferred embodiments of the present invention, some of the problems associated with selecting a network resource in the prior art are overcome.

In one exemplary embodiment, a user of a client device selects a service provider such as an Internet Service Provider from a plurality of service providers that conform to an automatic configuration process. Subsequently, based on the user's selection, the client device queries the user for user information data such as user's location data, a username, a user's e-mail address or credit information data, for example. Further, the client device formats the user's information data to a predetermined data structure, such as an XML data structure, and a predetermined data format that is employed by the service provider selected by the user. Then, the client device establishes a communication session with the service provider selected by the user. According to one embodiment, the client device establishes the communication session with a predetermined server of the service provider, for example. When the client device accesses the service provider, it sends the formatted user's information data to the service provider. According to the exemplary embodiment, the client device sends the user's information data as an XML data stream having a plurality of DTDs associated with the user's information data. Further, when the service provider receives the user's information data, the service provider validates the data structure and the format of the received data and based on the user's information data, it provides configuration data to the client device. In one exemplary embodiment, the configuration data that the client device receives from the service provider is an XML data stream having a plurality of DTDs associated with the configuration parameters for the client device. Further, when the client device receives the configuration data from the service provider selected by the user, the client device configures internal application such as a network dial-up application and provides data such as login information data to the user.

The foregoing and other features and advantages of the present invention will be more readily apparent from the following detailed description of an embodiment of the present invention, which proceeds with references to the accompanying drawings.

BRIEF DESCRIPTION OF THE DRAWINGS

Particular embodiments of the present invention are described below with reference to the following drawings, wherein.

Note that elements that are related to one another in the drawings are identified using the same or similar reference numbers.

DETAILED DESCRIPTION OF PREFERRED EMBODIMENTS

The present invention is directed toward a method and a system for automatically configuring a client device.

Figure 5:
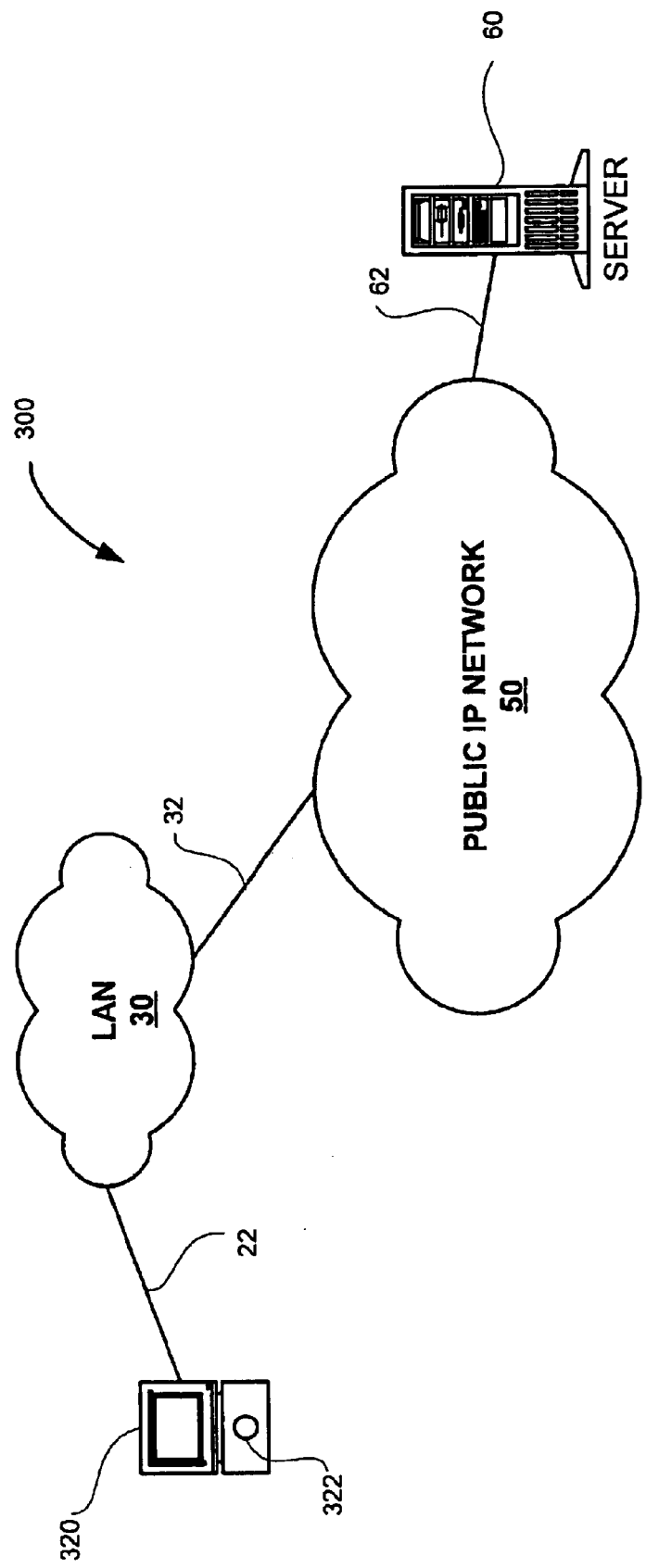
FIG. 5 is a functional block diagram illustrating an example of an architecture for communication of a client device according to the present invention with a server connected to a public IP wide area network, where the client communicates through a LAN also connected to the IP network.
Figure 6:
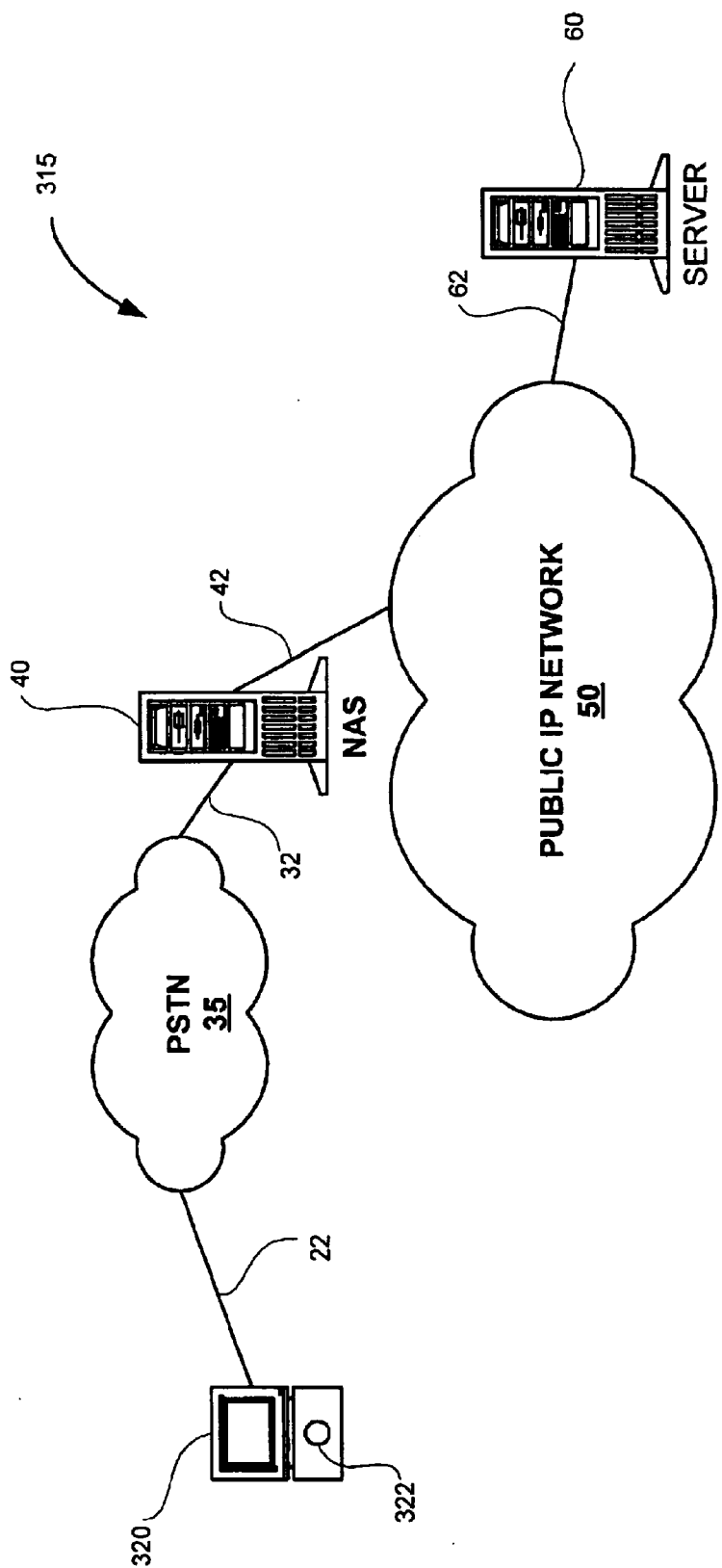
FIG. 6 is a functional block diagram illustrating another example of an architecture for communication of a client device according to the present invention with a server connected to a public IP wide area network, where the client communicates through a public switched telephone network to a network access server also connected to the IP network.

FIG. 5 is a functional block diagram illustrating an embodiment of an architecture 300 that includes an embodiment of a client device 320 according to the present invention. The preferred client device 320 includes a communications port, such as a network interface card, that is connected to LAN 30 via communication connection 22. Communication connection 22 may be an ethernet connection, token ring, or one of many other network protocol standards. Client device 320 includes a user input knob 322 for selecting network resources accessible through public IP network 50, such as those residing on server 60. FIG. 6 is a functional block diagram illustrating another embodiment of an architecture 315 that includes an embodiment of the client device 320 according to the present invention. In architecture 315, client 320 includes a communication port, such as a modem, for establishing a communication session 23 with network access server 40 connected to IP network 50 that enables the client device to communicate with a server on the IP network, such as server 60.

Figure 7:
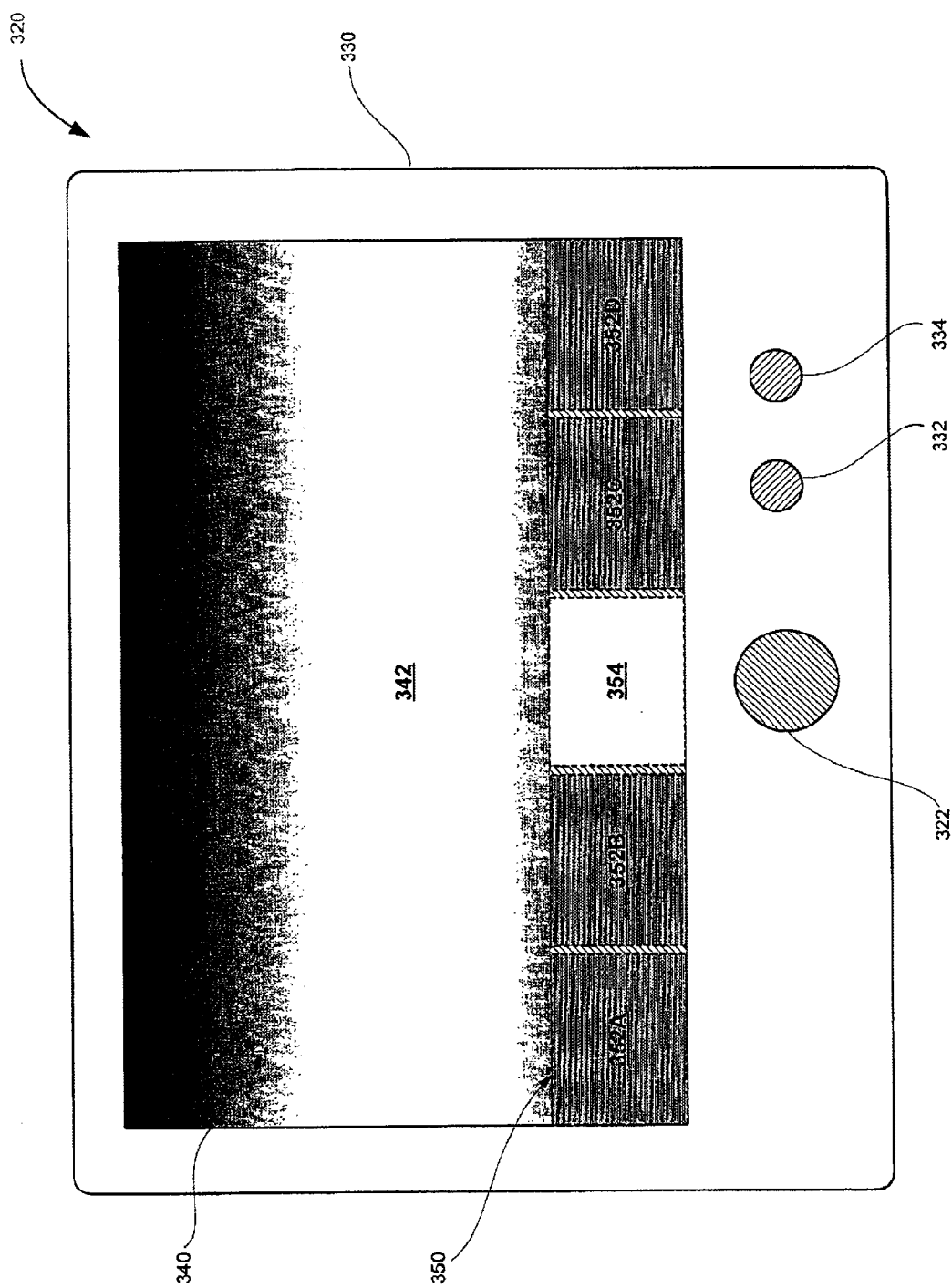
FIG. 7 is a diagram illustrating a front view of an embodiment of the client device, according to the present invention, shown in FIGS. 5, 6 and 7.

FIG. 7 is a frontal view of a preferred embodiment of client device 320. Client device 320 includes a housing 330 that houses the user input knob 322, input buttons 332 and 334, which are optional, and a display 340. Display 340 is a graphical display device, such as a digital liquid crystal display (LCD), that includes a viewing area 342 in which is displayed an output page for a currently selected channel or, at initialization, a default page. Certain inventive aspects described herein may be embodied in a client device that utilizes a separate display device, such as a television.

Display 340 also includes a previewing area 350 that includes previewing frames 352A–D and selection frame 354. Previewing frames 352A–D and selection frame 354 display graphical images representing channels accessible using the client device 320 within a predetermined previewing window. In the embodiment shown in FIG. 7, the previewing window consists of five frames. Selection frame 354 corresponds to a channel at the center of previewing window. Previewing frames 352A and 352B represent channels preceding the channel at the center of the previewing window in a predefined hierarchy of channels that may be selected. Similarly, previewing frames 352C and 352D represent channels following the channel at the center of the previewing window in the predefined hierarchy of channels that may be selected. The previewing frames 352A–D and selection frame 354 may be removed from the display 340 once a channel has been selected and re-displayed, for example, when the user rotates knob 322.

An embodiment of user input knob 322 includes a rotary encoder device that outputs a clock signal and a data signal that indicate rotational motion of the knob. The rotary encoder device may include a selection switch for generating a selection signal in response to a user depressing a shaft of the rotary encoder. As selection knob 322 is rotated, the channel at the center of the previewing window changes, with the center of the previewing window moving up or down the hierarchy of channels depending upon the direction of rotation. As the center of the previewing window is changed, graphical images, such as gif files, corresponding to the channels are scrolled through the previewing frames 352A–D and the selection frame 354. Thus, as the knob is rotated and the channels within the previewing window change, the graphical images displayed within previewing area 350 change correspondingly so as to scroll the graphical images through the previewing frames 352A–D and the selection frame 354. The user rotates the user input knob in order to preview graphical representations of the channel options in the hierarchy. The resulting effect is somewhat like a filmstrip projection.

In order to select a channel, the user rotates selection knob 322 to scroll graphical images until the graphical image corresponding to a desired channel is displayed in selection frame 354. Then, the user depresses knob 322 in order to select the desired channel. A channel identifier corresponding to the channel at the center of the previewing window is sent to an operating system executing within client device 320.

Alternatively, the user may make a selection by rotating the selection knob 322 until the desired channel is displayed in selection frame 354 and then wait for a predetermined time period to expire, e.g. a time-out event. When the time-out event occurs, e.g. through the expiration of a timer, then the channel identifier corresponding to the channel in selection frame 354 is sent to the operating system for further processing. As a further alternative, depressing the selection knob 322 when client device 320 is displaying an application program, such as a calendar or datebook application, may result in the channel application being activated with the most recently selected channel displayed.

Figure 8:
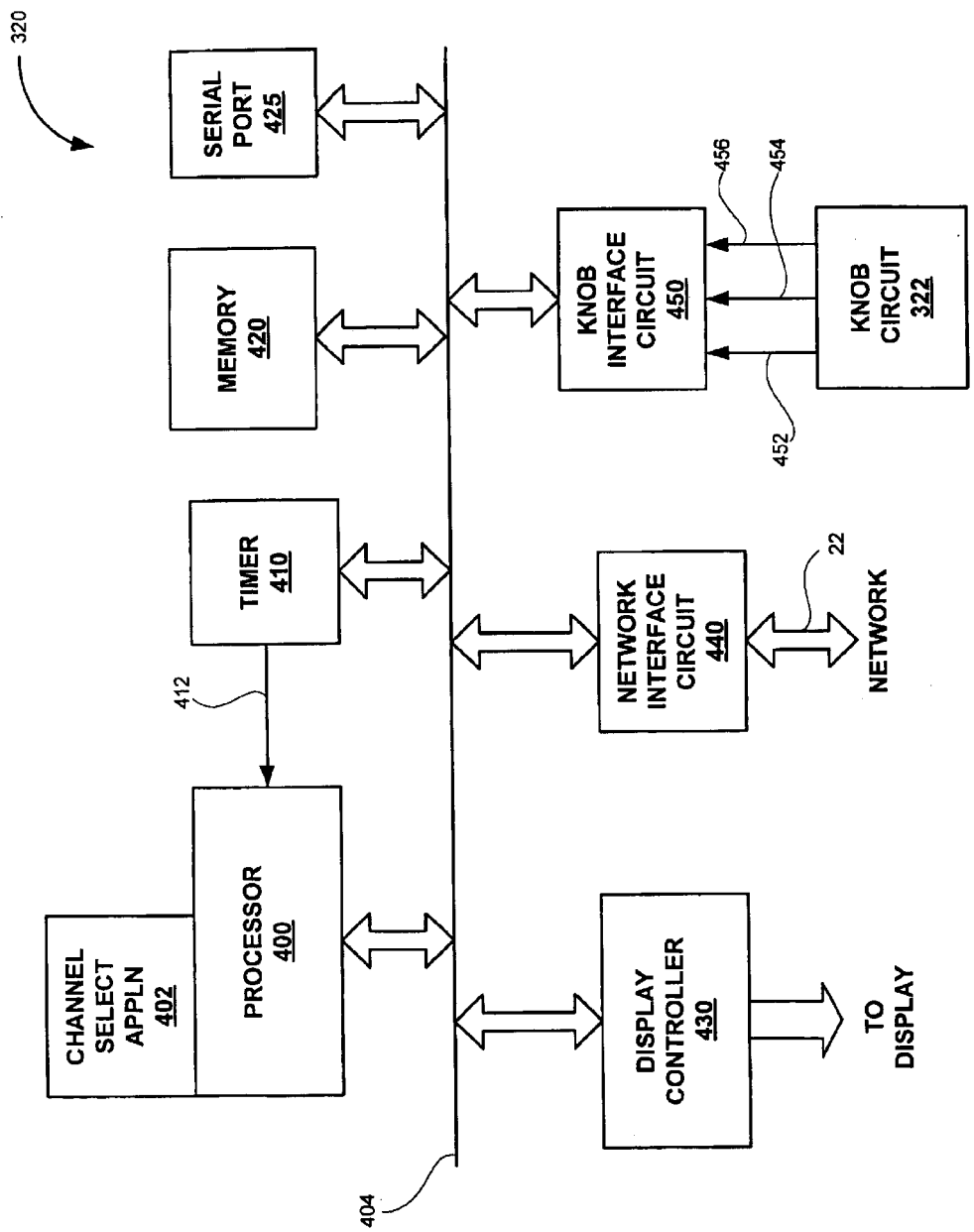
FIG. 8 is a functional block diagram illustrating an example of a client system architecture for the client device of the present invention.

FIG. 8 is a functional block diagram illustrating one embodiment of a processor system of the client device 320 shown in FIGS. 5–7, where the processor system is configured to receive user input via the user input knob 322 and display information to the user via display 340. The embodiment of a processor system shown in FIG. 8 includes a processor 400 that is coupled to various peripheral devices through processor bus 404. The peripheral devices coupled to processor 400 include a programmable timer 410, a memory subsystem 420, a display controller 430, a network interface circuit 440, and a knob interface circuit 450.

One of ordinary skill in the art will readily recognize that a variety of computer systems may be adapted provide the hardware platform for the client device 320. In one embodiment of the present invention, a Geode GX1 processor from National Semiconductor Corporation (Santa Clara, Calif.: www.national.com) may be used as processor 400. The GX1 processor may communicate through a Peripheral Component Interconnect (PCI) bus to a CS5530 Geode I/O Companion Multifunction South Bridge device to drive display and communications subsystems. For example, a CS9211 Graphics Companion Flat Panel Display Controller may be used as display controller 230 to drive display 140. A Universal Serial Bus (USB) interface of the CS5530 may be attached to an ethernet adapter in order to provide an interconnection to a broadband communication interface device for highspeed communication with the Internet. Examples of broadband communication interface devices are digital subscriber line (DSL) gateways and cable modems. For PSTN access, a modem device may be connected to the PCI bus. One example of a modem that may be connected to the PCI bus is composed of the Analog Devices (Norwood, Mass.: www.analogdevices) Model 1807 modem processor and Model 1804 data access arrangement (DAA).

Programmable timer 410 is programmed with a time-out value by processor 400 and, when the time-out value is reached, generates an interrupt signal 412 that is input to the processor. Memory subsystem 420 stores data and executable code for processes running on processor 400, such as channel application 402. Display controller 430 drives a display device, such as the display 340 of client device 420 shown in FIG. 7, and receives display updates under the control of processor 400. A network interface circuit 440, such as a network interface card (NIC) or a modem, sends and receives data packets, such as HTTP commands and responses, over network connection 22. Knob interface circuit 450 receives and decodes the user selection information that is input via knob circuit 322, as illustrated in FIGS. 5–7.

In the embodiment of FIG. 8, knob circuit 322 outputs three signals, a clock signal 452, and a data signal 454, and a selection signal 456. When the user rotates the knob, the clock signal 452 will transition between logic states, such as a logical "1" and logical "0". When knob interface circuit 450 detects a transition in the clock signal, such as a falling edge, then it checks the value of the data signal 454. If the data signal is a logic 1, then the knob has been rotated in one direction, and when the data signal is a logic 0, then the knob has been rotated in the opposite direction. By counting the number of clock pulses and sensing the data signal value, a count representing the position of the knob is maintained by knob interface circuit 450.

The user input from knob 322 is received and processed by a channel selection application 402. An example of a design approach for channel selection application 402 to detect the changes in the position of knob 322 is an interrupt routine based upon a polling approach. This approach assumes that the system of client 320 has been initialized at power-up such that a data index, e.g. a data pointer, indexes or points to a default start value for the center of the selection window discussed above and the data index points to a portion of a data structure containing the predetermined hierarchy of channels. This approach further assumes that the knob 322 is an incremental device, e.g. there is not an absolute relationship between the knob position and an output value of the knob circuit, and that a previous count value is initialized at start-up to the same value present in the counter within knob interface circuit 450.

When timer 410 times-out and interrupts processor 400, the interrupt routine is entered and the processor will read the current count value from the knob interface circuit 450. Processor 400 compares the current count value to the previous count value. If the current count and previous count values are the same, then the knob has not been moved and no further action is required.

If the current count and previous count values are not the same, then knob 322 has been turned and the pointer to the center of the preview window in the predetermined hierarchy of network resources is incremented or decremented according to the change in counter value. Channel application 402 causes processor 400 to obtain the graphics corresponding to the channels within the preview window and updates the graphics in the preview areas 352A–D and selection frame 354 of display 340, accordingly, which results in the graphics scrolling across the preview area 350. The previous count value is then set to the current count value to prepare for the next polling period and the process continues on to check for additional user input.

The processor 400 then checks whether the selection signal 456 is set. If signal 456 is not set, then processor 400 resets timer 410 and returns from the interrupt routine. However, if signal 456 is set, then process 400 obtains the channel value pointed to by the pointer to the hierarchy of channels for processing by channel application 402, as discussed in further detail below. The register or flip-flop within knob interface circuit 450 that stores the selection signal 456 is then reset.

Figure 9:
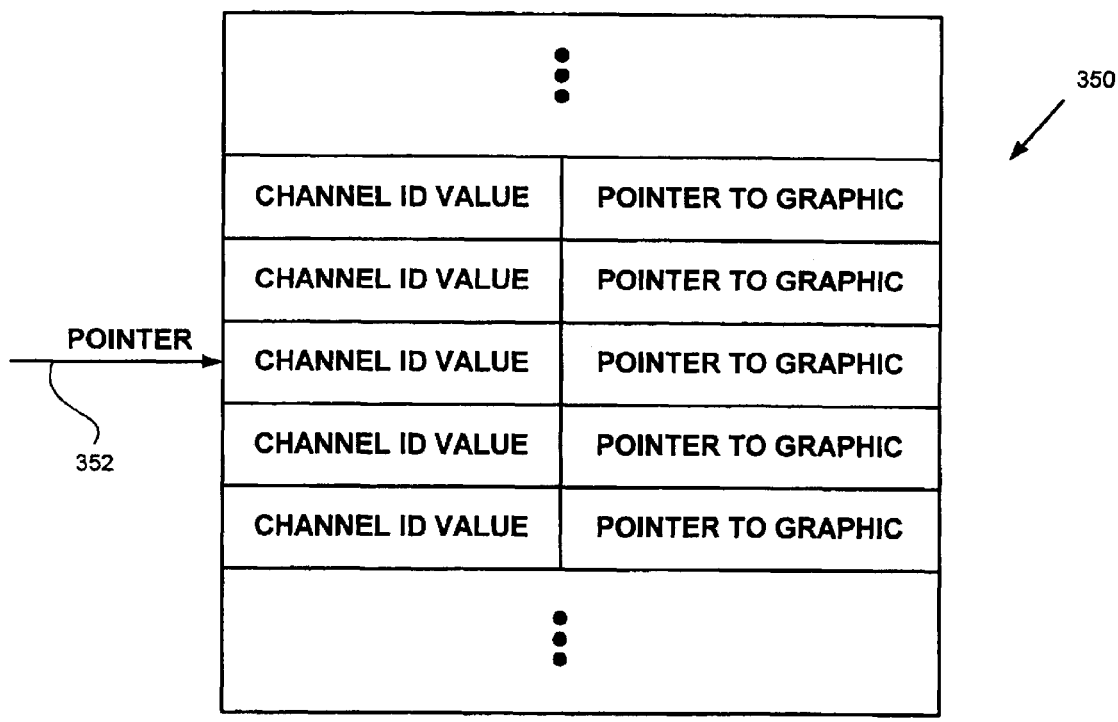
FIG. 9 is a data diagram illustrating a channel ID value table for the client device of the present invention.

FIG. 9 is a block diagram of an embodiment of a data structure 460 for the hierarchy of channels used in one embodiment of the present invention. Data structure 460 is shown in FIG. 9 as a table containing multiple channel identifier pairs composed of a channel D value and a pointer to a graphic. The structure 460 can take on a variety of other forms, such as a linked list, as one of ordinary skill in the art will readily understand. Pointer 462 is the pointer to the center of the preview window and generally points to the channel identifier pair for the network resource shown in the select area 354 of FIG. 7. The channel identifier pairs stored in the data structure 460 for the hierarchy include a channel ID value for the channel and a pointer to a graphic for the channel. The graphic for the channel identifier pair pointed to by pointer 462 is displayed in selection frame 354. The graphics for the other network resource identifier pairs within the preview window, i.e. the network resource identifier pairs that are adjacent to the network resource identifier pair currently indexed by pointer 462, are displayed in the preview windows 352A–D of FIG. 7. In the embodiment shown in FIG. 7, the preview window is plus and minus two pairs relative to pointer 462 for a total of five graphics displayed in preview area 350.

As selection knob 322 is rotated, the position of pointer 462 moves up or down the hierarchy depending upon the direction and magnitude of the knob rotation. As the preview window is changed by the knob rotation to include channel identifier pairs not previously displayed, the pointer to the graphic in each new channel identifier pair is used to retrieve the graphic for the channel for output to the display 340 by processor 400. As the knob 322 is rotated clockwise or counterclockwise, the graphics for the network resources within the preview window are scrolled forwards or backwards, respectively, through the preview area 350. When the selection signal 456 is activated by depressing the knob 322, then the channel ID value from the channel identifier pair indexed by pointer 462 is retrieved for processing by channel application 402. Data structure 460 resides in memory subsystem 420, which preferably includes persistent memory elements, such as flash memory, for storing the hierarchy. Likewise, the graphics for the channels may also be stored in persistent memory elements within memory subsystem 420.

As noted above, the selection signal 456 may be replaced with a time-out event from a timer, such as time-out signal 412 from timer 410 of FIG. 8. Thus, the user rotates knob 322 until the icon or graphic representing the desired channel is displayed in selection window 354. The user then stops rotating knob 322 and waits for a predetermined time period, which may be user selectable. In this embodiment, processor 400 resets timer 410 with the predetermined time period each time it processes the signals from the knob interface circuit. When the user stops turning knob 322, the timer does not get reset and, when the predetermined time period expires, timer 410 generates timer signal 412. As a result, the channel ID value from the channel identifier pair indexed by pointer 462 is retrieved for processing by channel application 402. When an application other than channel selection application 402, such as a calendar application, is currently running, then processor 400 may be configured to interpret selection signal 456 activated by knob 322 as a command to activate the channel selection application 402

The channel identifier pairs within data structure 460 may be predetermined by a manufacturer of the client device 320, defined by the user of client device 320, or both. A user interface application may be included that allows a user to update the contents of data structure 460. Alternatively, channel selection application 402 may be used to access a particular channel that provides for the request and download of a new channel identifier pair and associated data, such as in a XML file, as is discussed below, and a graphic representing the new channel in the data structure.

By using an incremental rotary encoder device for user selection knob 322, the number of selections available to the user is not limited by the number of positions of the knob 322. Consequently, the number of selections available to the user is determined by the number of channel identifier pairs provided for by data structure 460. Thus, the amount of available memory substantially determines the number of selections available to the user.

The clock and data signals generated by the rotary encoder of knob 322 may also be referred to as quadrature signals and one embodiment of the knob interface circuit 450 is a quadrature decoder circuit. When knob 322 is rotated forward, e.g. in a clockwise direction, the phase of the clock signal 452 leads the phase of the data signal 454 and the data signal is in a logic zero state at the rising edge of the clock signal. When knob 322 is rotated backwards, e.g. counter-clockwise, then the phase of the data signal 454 leads the phase of the clock signal and the data signal is in a logic one state at the rising edge of the clock signal.

Figure 10:
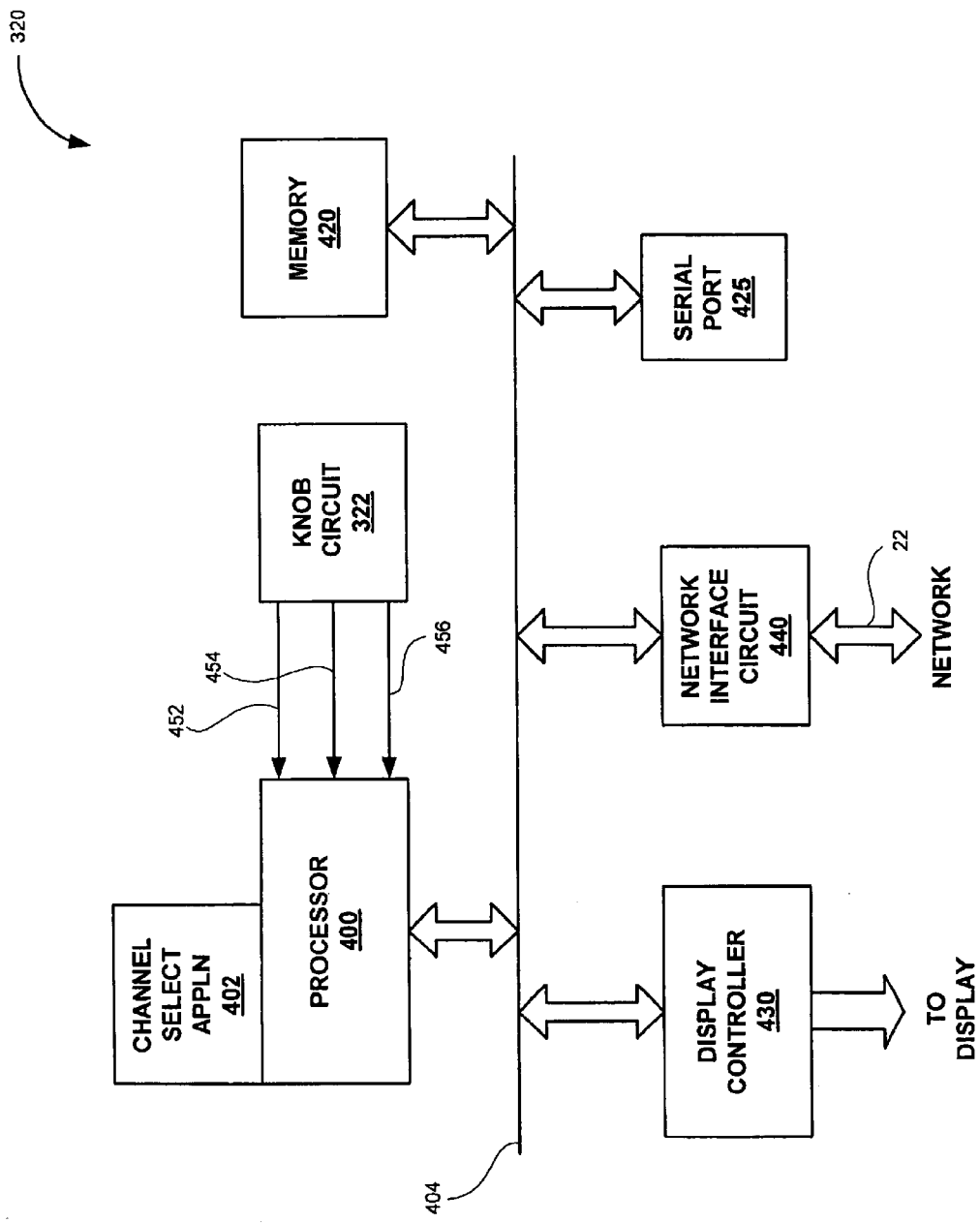
FIG. 10 is a functional block diagram illustrating another example of a client system architecture for the client device of the present invention.

While the architecture of FIG. 8, and the corresponding interrupt routine, is configured to monitor user manipulation of knob 322 by periodically polling the knob interface circuit 450, an to interrupt driven approach may also be employed with respect to channel selection application 402. In FIG. 10, an architecture is shown whereby the processor 400 directly monitors user input via knob 322 through the use of the processor's interrupt scheme. In FIG. 10, clock signal 452 is coupled to a first interrupt input of processor 400, such as a non-maskable interrupt (NMI) input and selection signal 456 is coupled to a second interrupt input of processor 400, such as an interrupt request (IRQ) signal. Data signal 454 may be coupled to an interrupt level input or be read through bus 404 as an interrupt vector or simply as data. One of ordinary skill in the art will appreciate that there are a variety of interrupt based approaches and corresponding designs and that the present embodiment is illustrative of one such approach.

As an example of an interrupt routine for directly monitoring the rotation of knob 322 using processor 400 using clock signal 452 to generate an interrupt. In this approach, the interrupt routine is entered when clock signal 452 transitions to an active state, e.g. a rising edge of clock signal 452. At step 452, the value of data signal 454 is read. As noted above, data signal 454 may be input to processor 400 in various ways, including using a buffer, such as a flip-flop. If the value of data signal 454 is a logic zero, then the pointer to the center of the preview window in the hierarchy of network resources is incremented. If the value of data signal 454 is a logic one, then the pointer is decremented. In either case, the preview area 350 is updated with graphics for the channels within the preview window. Once this processing is completed, the interrupt routine returns and awaits the next transition of clock signal 452.

Another interrupt routine may be used to process an interrupt caused by selection signal 456. This interrupt routine is entered when selection signal 456 transitions to an active state, e.g. a rising edge of selection signal 456. At this point, any rotation of knob 322 has been handled by the interrupt routines discussed above. As a result, the selection signal interrupt routine only needs to process the selected channel, which is pointed to by the current position of the pointer to the center of the preview window. Therefore, the channel ID value indicated by the pointer is processed by channel application 402 for further processing, as discussed in further detail below, and the channel selected by the user is displayed to the user in the display area 340. The user selection interrupt routine then returns to normal processing.

Figure 4:
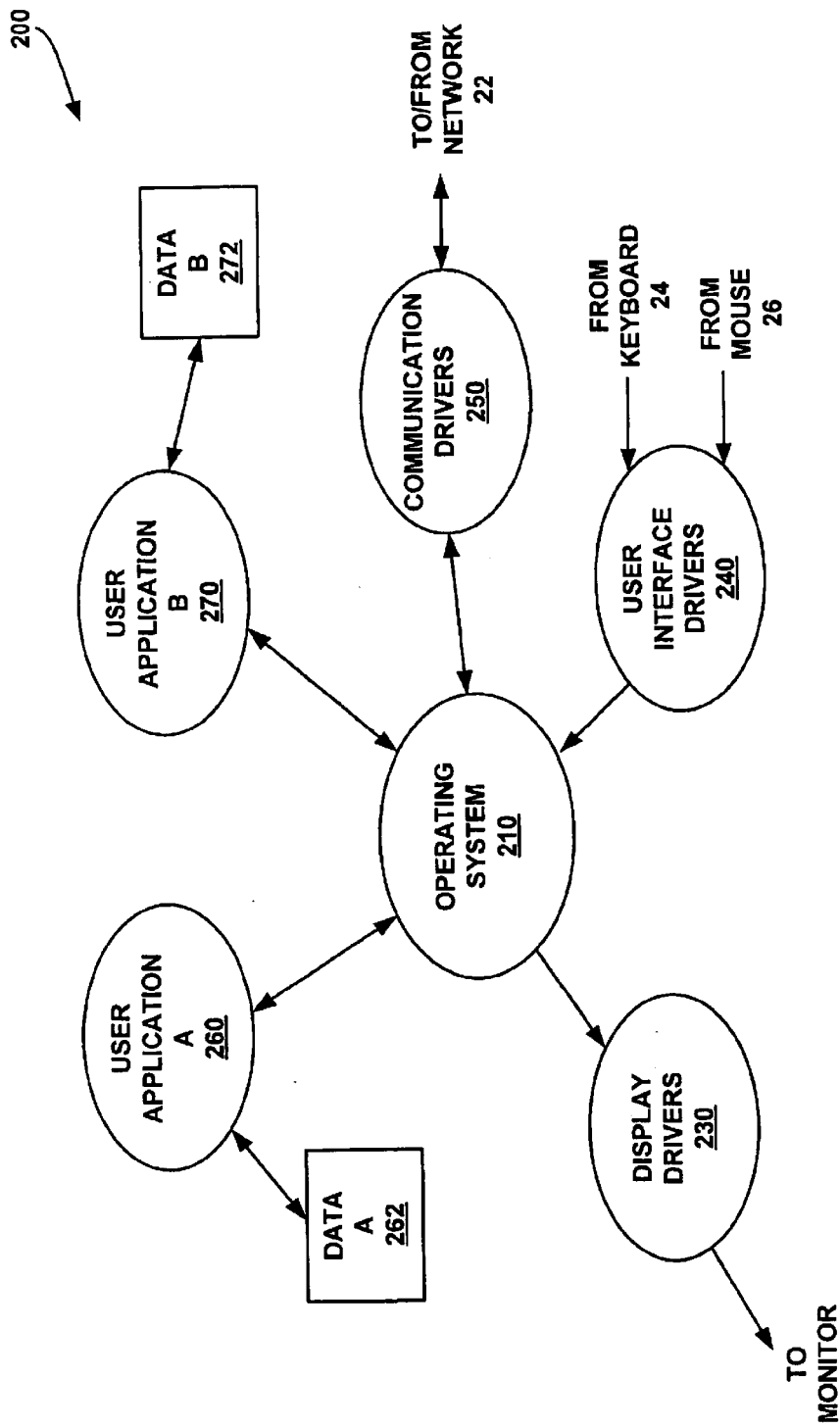
FIG. 4 is a software architecture diagram illustrating an example of an operating system for the client system architecture of FIGS. 1–3.
Figure 11:
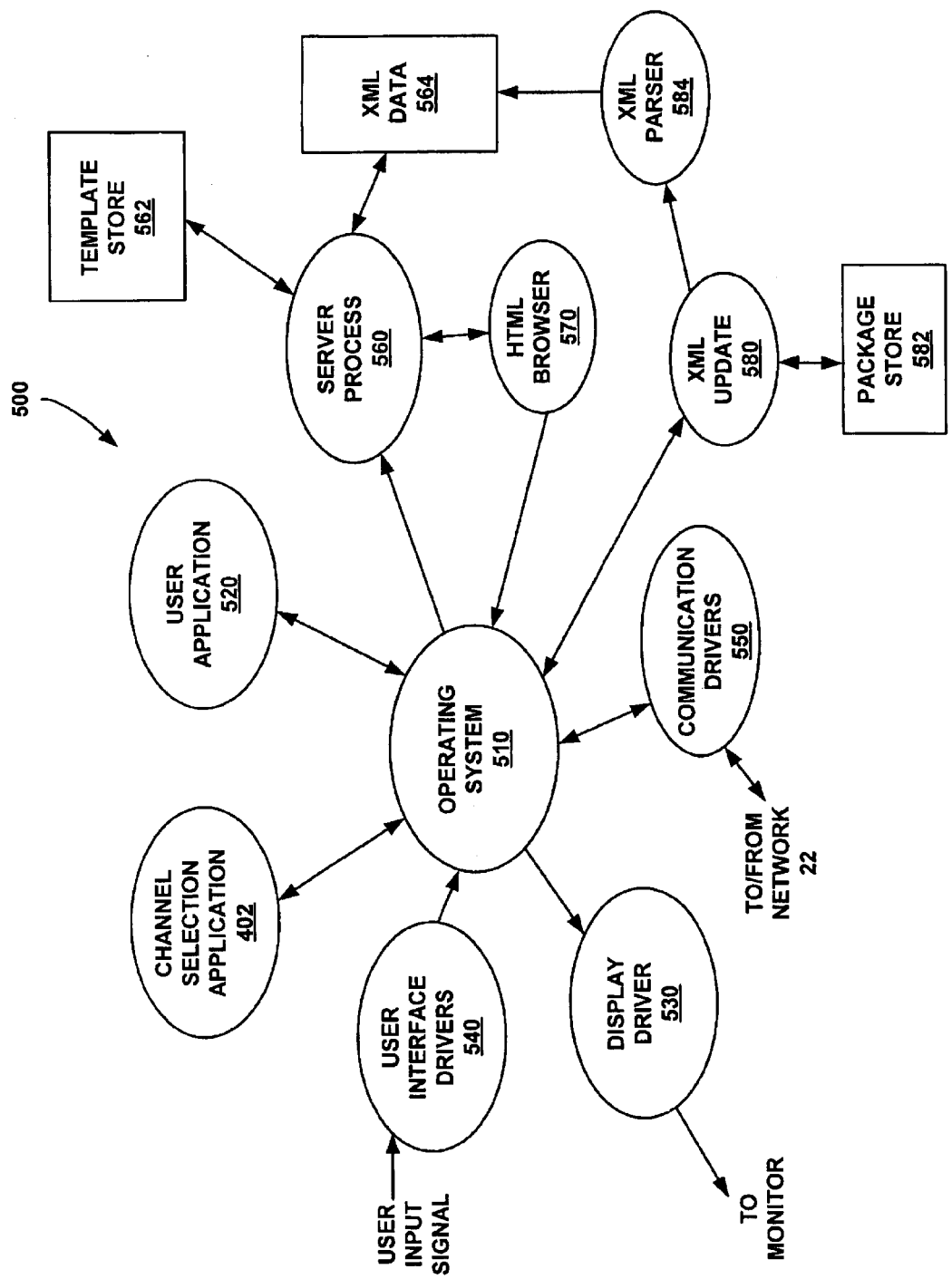
FIG. 11 is a software architecture diagram illustrating an example of an operating system for the client device of the present invention.

FIG. 11 is a software architecture diagram illustrating an embodiment of a software architecture 500 for client device 320. Similar to software architecture 200 of FIG. 4, architecture 500 includes an operating system 510 for controlling the resources of the client device and activating application program 520 and channel application 302. Architecture 500 also includes a display driver 530 for driving the display monitor of client device 530, user interface drivers 540 for receiving and processing user input signals from a user interface, including knob 322, and a communications driver 550 for handling a communications via network interface circuitry for connection 22.

An example of an operating system suitable for use as OS 510 in client device 320, according to the present invention, is the QNX operating system available from QNX, 175 Terence Matthews Crescent, Kanata, Ontario Canada, k2M 1W8. See www.qnx.com for further details regarding the QNX OS.

The QNX OS includes features such as multitasking, threads, priority-driven preemptive scheduling, synchronization, and fast context switching that enhance its real-time performance. Preferably, the OS has a small memory footprint for execution and storage to keep cost and complexity down in the client device.

For networking services, the preferred device also is configured to provide a full implementation of the TCP/IP protocol suite and utilities, including PPP, DHCP, NFS, RPC, and SNMP, that make it possible to run a variety of Internet services over a wide choice of networks. Using Ethernet with a network interface card, or serial lines, with a modem, users can connect to the Internet, the private wide area networks, and log-in to remote systems. The network services may also be scaled back to a small TCP/IP stack.

The device also includes a customized windowing system that permits high-end graphics to be displayed even on small memory-constrained devices. This graphical user interface (GUI) has a small memory footprint.

Architecture 500 also includes a thin server process 560, which is a server process residing in the client device rather than a remote server, that accesses a template store 562 and an Extended Markup Language (XML) database 564. The QNX OS discussed above includes a server that may be modified for use as the thin server process 560. XML and the more familiar Hypertext markup language (HTML) are both restricted forms of the Standard Generalized Markup Language (SGML) defined by the International Standards Organization (ISO) standard 8879 (1986). XML 1.0 (Feb. 10, 1998), herein incorporated by reference, is defined by the World Wide Web Consortium (W3C) and is available at www.w3c.com.

XML describes a class of data entities called XML documents and generally describes the behavior of computer programs that process these documents. XML documents are made up of storage units called entities that contain either parsed or unparsed data. Parsed data is made up of characters, some of which form character data and some of which form markup. Markup encodes a description of the document's storage layout and logical structure. XML provides a mechanism to impose constraints on the storage layout and logical structure. An XML processor is a program configured to read and interpret XML documents according to the XML standard and process them into a viewable format on behalf of an application program.

Each XML document is structured according to a document type definition (DTD) that contains or points to markup declarations that describe a class of documents. The DTD can point to an external subset of entities containing markup declarations or can contain the markup declarations directly in an internal subset, or both. The DTD for a document consists of both subsets taken together. Each XML document also contains one or more elements that are delimited by tags. Each element has a type, identified by a name and sometimes called its generic identifier. Table 1 below is an example of a DTD file used for defining a channel, according to the present invention, for weather information.

TABLE 1

Weather.dtd

```
<!--
    Import the common Ergo element/attribute/entity definitions.
-->
<!ENTITY % ErgoTypesDTD SYSTEM "ErgoTypes.dtd">
%ErgoTypesDTD;
<!--
    Import the Media element/attribute/entity definitions.
-->
<!ENTITY % MediaDTD SYSTEM "Media.dtd">
%MediaDTD;
<!ENTITY % TempScaleEnt "
        unit      (C|F)     #REQUIRED
">
<!ENTITY % WxcodeEnt "
    wxcode (
        01 | 02 | 03 | 04 | 05 | 06 | 07 | 08 | 09 | 10 |
        11 | 12 | 13 | 14 | 15 | 16 | 17 | 18 | 19 | 20 |
        21 | 22 | 23 | 24 | 25 | 26 | 27 | 28 | 29 | 30 |
        31 | 32 | 33 | 34 | 35 | 36 | 37 | 38 | 39 | 40 |
        41 | 42 | 43 | 44
    ) #IMPLIED
">
<!ELEMENT Locale (#PCDATA)>
<!ELEMENT DayName     (#PCDATA)>
<!ELEMENT Conditions  (#PCDATA)>
<!ATTLIST Conditions
        %WxcodeEnt;
>
<!ELEMENT Temperature  (#PCDATA)>
<!ATTLIST Temperature
        %TempScaleEnt;
>
<!ELEMENT Pressure     (#PCDATA)>
<!ATTLIST Pressure
        unit      (INHG | KPS)     #REQUIRED
>
<!ELEMENT Winds (#PCDATA)>
<!ATTLIST Winds
        unit      (KPH | MPH)      #REQUIRED
        speed     CDATA            #IMPLIED
>
<!ELEMENT Windfrom    (#PCDATA)>
<!ELEMENT Pollen (#PCDATA)>
<!ELEMENT Airquality  (#PCDATA)>
<!ELEMENT High        (#PCDATA)>
<!ATTLIST High
        %TempScaleEnt;
>
<!ELEMENT Low         (#PCDATA)>
<!ATTLIST Low
        %TempScaleEnt;
>
<!ELEMENT Day    (DayName, Conditions, (
        (Temperature, Pressure, Winds, Pollen, Airquality) |
        (High?, Low))
)>
<!ATTLIST Day
        _ID (
            Current    |
            Day1.1|
            Day1.2 |
            Day2   |
            Day3   |
            Day4   |
            Day5
        ) #REQUIRED
        %DateEnt;
>
<!--
    Definition of a weather forecast.
    The images must have their "_ID" attributes set to either
    "NationalMap" or "RegionalMap".
-->
<!ELEMENT Weather (
    Locale,
    PrettyDayTime,
    Day+1
```

TABLE 1-continued

Weather.dtd

```
           Copyright,
           Image*
)>
<!ATTLIST Weather
       _Version CDATA    #FIXED    "0.2"
       Partner  CDATA    #FIXED    "Weather.com"
>
```

XML entities may refer to other entities to cause their inclusion into the document. Entities may be resolved through inference resolution to incorporate the content of data objects external to the XML document into the document. For example, the Weather.dtd file of Table 1 defines a Weather entity that includes subelements Locale, PrettyDayTime, one or more Day subelements, a copyright element, and may include one or more Image subelements. The subelement Day, in turn, is composed of further subelements DayName, Conditions, Temperature, Pressure, Winds, Pollen, Airquality, High and Low and includes an _ID attribute that can take on a value from the set of Current, Day1.1, Day1.2, Day2, Day3, Day4, and Day5. The Day subelement also includes a datestamp attribute called DateEnt. Several of the subelements also include subelements, such as Temperature, which includes a text portion that contains parsed character data (PCDATA) and a TempScaleEnt entity that requires that the units for the text portion be defined as either "C" of "F".

The definitions for some entities can be obtained from other files. For example, the Weather.dtd file of Table 1 references another DTD file called ErgoTypes.dtd that is used to define entities that are used by multiple channels and/or applications. For instance, a data structure may be used by a news channel and also by a calendar application. The inclusion of the ErgoTypes.dtd, in this example, causes the entity PrettyDayTime to be defined for use in Weather.dtd. Table 2 shows an example of the ErgoTypes.dtd file.

TABLE 2

ErgoTypes.dtd

```
<!--Definition of Parameter entities for use below -->
<!--
    Tracking information. Elements with this attribute
    will have hit times reported back to the channel partner.
    NOTE: Can not have un-escaped commas present.
-->
<!ENTITY % TrackEnt"
    _TrackID    CDATA    #IMPLIED
">
<!--
    Date provides the normalized date. The format is YYYYMMDD.
-->
<!ENTITY % DateEnt "
    Date    CDATA    #IMPLIED
">
<!--
    Time provides the normalized time. The format is:
    HHMM[SS][Z|"-12" ... "-01" ... "+00" ... "+01" ... "+12"].
-->
<!ENTITY % TimeEnt "
    Time    CDATA    #IMPLIED
">
<!--
    Timestamp provides the normalized date (and time if available).
    The format is <DATE>[T<TIME>]. For "<DATE>", see "Date"
    above, for "<TIME>", see "Time" above.
-->
```

TABLE 2-continued

ErgoTypes.dtd

```
<!ENTITY % TimeStampEnt"
    TimeStamp    CDATA    #IMPLIED
">
<!--
    Common attribute to express a URL.
-->
<!ENTITY % URLEnt "
    _Source    CDATA    #IMPLIED
    _Cache (
          True       |
          False
    ) #IMPLIED
    %TrackEnt;
">
<!--Definition of common data objects -->
<!--
    Human readable, free-form day, time or day-time information.
-->
<!ELEMENT PrettyDayTime(#PCDATA)>
<!--
    ContentTag is the Generator Tag the object is associated with
    and consists of a '.' separated list of identifiers prefixed by:
    "com.macromedia.generator.commands"
-->
<!ELEMENT ContentTag     (#PCDATA)>
<!--
    ReferenceTable is a table of DTD element references (e.g. a refer
    to a CalendarEntry from within a Story, etc.). Element is the
    name of the referenced element (e.g. "CalendarEntry"), and Path is
    the "DTD path" to the referenced element.
-->
<!ELEMENT Element        (#PCDATA)>
<!ELEMENT Path           (#PCDATA)>
<!ELEMENT Reference      (Element, Path)>
<!ATTLIST Reference
    _ID    CDATA    #REQUIRED
>
<!ELEMENT ReferenceTable    (Reference+)>
<!ATTLIST ReferenceTable
    _Type    CDATA    #FIXED    "Table"
>
<!--The attribute "Units" is specified using ISO 4217 format -->
<!ELEMENT Money (#PCDATA)>
<!ATTLIST Money
    Units    CDATA    "USD"
>
<!ELEMENT Email (#PCDATA)>
<!ELEMENT Phone (#PCDATA)>
<!ELEMENT Country        (#PCDATA)>
<!ELEMENT City           (#PCDATA)>
<!ELEMENT State          (#PCDATA)>
<!ELEMENT Street         (#PCDATA)>
<!ELEMENT Zip            (#PCDATA)>
<!ELEMENT Address        (Street, City, State, Zip, Country)>
<!--What's in a name? Here's the definition -->
<!ELEMENT FirstNName     (#PCDATA)>
<!ELEMENT LastName       (#PCDATA)>
<!ELEMENT Name           (FirstName?, LastName?)>
<!ELEMENT Company        (#PCDATA)>
<!ELEMENT Note           (#PCDATA)>
<!ATTLIST Note
    _MaxLength    CDATA    #FIXED    "4096"
>
<!ELEMENT Title          (#PCDATA)>
<!--Table definition. Used for Sports scores, etc. -->
<!ELEMENT Cell           (#PCDATA)>
<!ATTLIST Cell
    %URLEnt;
>
<!ELEMENT Row            (Cell+)>
<!ELEMENTTable           (Row+)>
<!--Ergo/Palm database elements -->
<!--Ergo DB keys -->
<!ELEMENT DBKey (#PCDATA)>
<!--Ergo/Palm DB owner's name. -->
<!ELEMENT DBName         (#PCDATA)>
<!--Palm DB record ID -->
```

TABLE 2-continued

ErgoTypes.dtd

```
<!ELEMENT RecordId      (#PCDATA)>
<!--Palm DB record index -->
<!ELEMENT RecordIndex   (#PCDATA)>
<!--Attributes, implemented (of course) as attributes. -->
<!ELEMENT RecordAttributes EMPTY>
<!ATTLIST RecordAttributes
    Deleted         (True|False) "False"
    Dirty           (True|False) "False"
    Secret          (True|False) "False"
    Archived        (True|False) "False"
>
<!--Archives -->
<!ELEMENT Archive   EMPTY>
<!ATTLIST Archive
    _ID     CDATA   #REQUIRED
    _Type   CDATA   #FIXED       "Archive"
    _Format (
        pkzip |
        tar
    ) "tar"
    %URLEnt;
>
<!--An applet (e.g. for channel configuration. -->
<!ELEMENT Applet EMPTY>
<!ATTLIST Applet
    _Type   CDATA   #FIXED       "Applet"
    _Format (
        html |
        swf
    ) "html"
```

TABLE 2-continued

ErgoTypes.dtd

```
    %URLEnt;
>
```

When the thin server process 560 is activated by channel selection application 402 or user application 520, it receives an index in template store 562 that identifies a template file corresponding to the calling application. Alternatively, the channel selection application may include a channel selector process and a channel browser process. The channel selector process is configured to receive and interpret the user input signals and pass to the channel browser a path to an index.shtml file corresponding to the user's selection. The channel browser process then sends an HTTP request to local thin server 560.

The template store 562 contains template files, which are SHTML files in this embodiment, that may act as templates for channels and applications residing on client device 320. The SHTML files utilize server side include statements or entities (SSIs). During processing of an SHTML file, an entity, such as a SSI statement, is "included" or resolved when its replacement text is retrieved and further processed in place of the entity reference itself as though it were part of the document at the location the entity reference was recognized. Table 3 below shows an example of an SHTML template for a weather channel that has SSI statements conforms to the Weather.dtd of Table 1.

TABLE 3

Weather SHTML

```
<tml>
<head>
</head>
<body bgcolor="#FFFFFF" marginwidth="0" marginheight="0" topmargin="0"
leftmargin="0">
<!#config cmdecho="ON" --> <!--#exec cmd="SetXMLPath /" --> <img
border=0 height=60 src="logo.jpg" width=640>
<table bgcolor=#ffffff border=0 cellpadding=5 cellspacing=0 width=640
height="220">
    <tr align="left">
        <td colspan="3" height="40"><b><font color=#000066 face=Arial size=+1>
Weather®
            5-DAY FORECAST FOR <!--#exec cmd="GetXMLPCData
Content/Weather/Primary/locale" -->
            </font> </b> </td>
    </tr>
    <tr>
            <td align=middle width="75%">
                <table border=0 cellpadding=0 cellspacing=0 width="100%">
                    <tr align="left"> <!--Timestamp -->
                        <td colspan=2> <b> <font color="#000066"0 face="Arial" size="+1">
CURRENT
                            (<!--#exec cmd="GetXMLPCData /.updateTimes/Weather" -->)
                            </font> </b> </td>
                    </tr>
                    <tr> <!--Current Icon -->
                        <td align=center> <img border=0 src="Icons/<!--#exec
cmd="GetXMLAttribute Content/Weather/Primary/Current/Conditions wxcode" -
```

TABLE 3-continued

Weather SHTML

```
-->/<!--#exec cmd="GetXMLAttribute
Content/Weather/Primary/Current/Conditions wxcode" -->.gif">
                </td>
                <!--Current Condition/Temperature/Barometer -->
                <td> <b> font face=Arial> <!--#exec cmd="GetXMLPCData
Content/Weather/Primary/Current/Conditions" -->
                        <br>
                        TEMP: <!--#exec cmd="GetXMLPCData
Content/Weather/Primary/Current/Temperature" -->
                        <br>
                        BAROMETER: <!--#exec cmd="GetXMLPCData
Content/Weather/Primary/Current/Pressure" -->"
                        </font> </b> </td>
                </tr>
                <tr> <!--Current Winds -->
                        <td colspan=2> <b> <font face=Arial> WIND: <!--#exec
cmd="GetXMLPCData Content/Weather/Primary/Current/Wind_from" -->
                        AT <!--#exec cmd="GetXMLPCData
Content/Weather/Primary/Current/Windspeed" -->MPH
                        </font> </b> </td>
                </tr>
                <tr> <!--Current Air Quality/Pollen -->
                        <td colspan=2> <b> <font face=Arial> AIR QUALITY: <i> <font
color=#009900>
                        <!--#exec cmd="GetXMLPCData
Content/Weather/Primary/Current/Airquality" -->
                        </font> </i> POLLEN: <i> <font color=#ff0000> <!#exec
cmd="GetXMLPCData Content/Weather/Primary/Current/Pollen" -->
                        </font> </i> </font> </b> </td>
                </tr>
            </table>
        </td>
        <td align=middle width="25%">
            <table border=0 cellpadding=0 cellspacing=0>
                <tr>
                    <td align=middle bgcolor=#ffffff> <font face=Arial size=-1> <b> TODAY
                        </b> </font> </td>
                </tr>
                <tr> <!--Today Forecast Icon -->
                    <td align=middle> <img border=0 src="Icons/<!--#exec
cmd="GetXMLAttribute Content/Weather/Primary/Day1.1/Conditions wxcode" -
-->/<!--#exec cmd="GetXMLAttribute
Content/Weather/Primary/Day1.1/Conditions wxcode" -->.gif">
                        </td>
                </tr>
                <tr> <!--Today Forecast Conditions/Temperature -->
                    <td align=middle bgcolor=#ffffff> <b> <font face=Arial size=-1> <!--
#exec cmd="GetXMLPCData Content/Weather/Primary/Day1.1/Conditions" -->
                        <br>
                        <!--#exec cmd="GetXMLPCData
Content/Weather/Primary/Day1.1/High" -->/<!--#exec cmd="GetXMLPCData
Content/Weather/Primary/Day1.1/Low" -->
                        </font> <4b> </td>
                </tr>
            </table>
        </td>
        <td bgcolor=#f2ffff> </td>
    </tr>
    <tr>
        <td align=middle colspan="3" height="20"> </td>
    </tr>
</table>
<table border=0 cellpadding=0 cellspacing=0 height="120">
    <tr>
        <td align=middle bgcolor=#ffffff width=128> <font face=Arial size=-1> <b>
            TONIGHT </b> </font> </td>
        <!--Day2 Name -->
        <td align=middle bgcolor=#ffffff width=128> <font face=Arial size=-1> <b>
            <!--#exec cmd="GetXMLPCData Content/Weather/Primary/Day2/DayName"
-->
            </b> </font> </td>
        <!--Day3 Name -->
        <td align=middle bgcolor=#ffffff width=128> <font face=Arial size=-1> <b>
            <!--#exec cmd="GetXMLPCData Content/Weather/Primary/Day3/DayName"
-->
            </b> </font> </td>
        <!--Day4 Name -->
```

TABLE 3-continued

Weather SHTML

```
            <td align=middle bgcolor=#ffffff width=128> <font face=Arial size=-1> <b>
                <!--#exec cmd="GetXMLPCData Content/Weather/Primary/Day4/DayName"
-->
                </b> </font> </td>
            <!- Day5 Name -->
            <td align=middle bgcolor=#ffffff width=128> <font face=Arial size=-1> <b>
                <!--#exec cmd="GetXMLPCData Content/Weather/Primary/Day5/DayName"
-->
                </b> </font> </tb>
        </tr>
        <tr> <!--Day 1.2 Icon -->
            <td align=middle width=128> <img border=0 src="Icons/<!--#exec
cmd="GetXMLAttribute Content/Weather/Primary/Day1.2/Conditions wxcode" -
->/<!--190 exec cmd="GetXMLAttribute
Content/Weather/Primary/Day1.2/Conditions wxcode" -->.gif">
            </td>
            <!--Day2 Icon -->
            <td align=middle width=128> <mg border=0 src="Icons/<!--#exec
cmd="GetXMLAttribute Content/Weather/Primary/Day2/Conditions wxcode" --
>/<!--#exec cmd="GetXMLAttribute Content/Weather/Primary/Day2/Conditions
wxcode" -->.gif">
            </td>
            <!-- Day3 Icon -->
            <td align=middle width=128> <img border=0 src="Icons/<!--#exec
cmd="GetXMLAttribute Content/Weather/Primary/Day3/Conditions wxcode" --
>/<!--#exec cmd="GetXMLAttribute Content/Weather/Primary/Day3/Conditions
wxcode" -->.gif">
            </td>
            <!'- Day4 Icon -->
            <td align=middle width=128> <img border=0 src="Icons/<!--#exec
cmd="GetXMLAttribute Content/Weather/Primary/Day4/Conditions wxcode" --
>/<!--#exec cmd="GetXMLAttribute Content/Weather/Primary/Day4/Conditions
wxcode" -->.gif">
            </td>
            <!--Day5 Icon -->
            <td align=middle width=128> <img border=0 src="Icons/<!--#exec
cmd="GetXMLAttribute Content/Weather/Primary/Day5/Conditions wxcode" --
>/<!--#exec cmd="GetXMLAttribute Content/Weather/Primary/Day5/Conditions
wxcode" -->.gif">
            </td>
        </tr>
        <tr> <!--Day 1.2 Text -->
            <td align=middle bgcolor=#ffffff valign=top width=128> <b> <font face=Arial
size=-1>
                <!--#exec cmd="GetXMLPCData
Content/Weather/Primary/Day1.2/Conditions" -->
                </font> </b> </td>
            <!--Day2 Text -->
            <td align=middle bgcolor=#ffffff valign=top width=128> <b> <font face=Arial
size=-1>
                <!--#exec cmd="GetXMLPCData
Content/Weather/Primary/Day2/Conditions" -->
                </font> </b> </td>
            <!--Day3 Text -->
            <td align=middle bgcolor=#ffffff valign=top width=128> <b> <font face=Arial
size=-1>
                <!--#exec cmd="GetXMLPCData
Content/Weather/Primary/Day3/Conditions" -->
                </font> </b> </td>
            <!--Day4 Text --->
            <td align=middle bgcolor=#ffffff valign=top width=128> <b> <font face=Arial
size=-1>
                <!--#exec cmd="GetXMLPCData
Content/Weather/Primary/Day4/Conditions" -->
                </font> </b> </td>
            <!--Day5 Text -->
            <td align=middle bgcolor=#ffffff valign=top width=128> <b> <font face=Arial
size=-1>
                <!-#exec cmd="GetXMLPCData
Content/Weather/Primary/Day5/Conditions" -->
                </font> </b> </td>
        </tr>
        <tr> <!--Day1.2 Temperature -->
            <td align=middle bgcolor=#ffffff width=128> <b> <font face=Arial size=-1>
                Low: <!--#exec cmd="GetXMLPCData
Content/Weather/Primary/Day1.2/Low" -->
                </font> </b> </td>
```

TABLE 3-continued

Weather SHTML

```
        <!--Day2 Temperature -->
        <td align=middle bgcolor=#ffffff width=128> <b> <font face=Arial size=-1>
            <!--#exec cmd="GetXMLPCData Content/Weather/Primary/Day2/High" --
>/<!--#exec cmd="GetXMLPCData Content/Weather/Primary/Day2/Low" -->
            </font> </b> </td>
        <!--Day3 Temperature -->
        <td align=middle bgcolor=#ffffff width=128> <b> <font face=Arial size=-1>
            <!--#exec cmd="GetXMLPCData Content/Weather/Primary/Day3/High" --
>/<!--#exec cmd="GetXMLPCData Content/Weather/Primary/Day3/Low" -->
            </font> </b> </td>
        <!--Day4 Temperature -->
        <td align=middle bgcolor=#ffffff width=128> <b> <font face=Arial size=-1>
            <!--#exec cmd="GetXMLPCData Content/Weather/Primary/Day4/High" --
>/<!--#exec cmd="GetXMLPCData Content/Weather/Primary/Day4/Low" -->
            </font> </b> </td>
        <!--Day5 Temperature -->
        <td align=middle bgcolor=#ffffff width=128> <b> <font face=Arial size=-1>
            <!--#exec cmd="GetXMLPCData Content/Weather/Primary/Day5/High" --
>/<!--#exec cmd="GetXMLPCData Content/Weather/Primary/Day5/Low" -->
            </font> </b> </td>
    </tr>
</table>
<table border="0" cellspacing="0" cellpadding="0" width="640">
    <tr>
        <td colspan="2" height="20"> </td>
    </tr>
    <tr>
<!--Ad -->
        <td width="468" height="60">
        <a href="<!--#exec cmd="GetXMLPCData
        Content/AccuWeather/Primary/Current/Ad1" -->"><img src= <!--#exec
        cmd="GetXMLPCImageSrc Content/AccuWeather/Primary/Current/Ad1" -->
        width="468" height="60" border="0"></a>
        </td>
    </tr>
</table>
</body>
</html>
```

SHTML (Server-parsed HTML) is a file extension used to identify HTML pages that contain server-side includes (SSIs). Server-parsed means that the server scans the page for commands that require additional insertion before an HTML page is sent to a client device, where the HTML page is rendered by a browser for display to the user. SHTML files are conventionally found in remote servers and are typically indexed using a URL value provided by a browser application in a client device. A remote server typically uses an SSI command to place up-to-date data or boilerplate text and graphics into an HTML document before sending it to the user. For example, it can be used to retrieve the current date and size of downloadable files that are constantly changing. It can also be used to insert a boilerplate message where only the boilerplate needs to be changed to bring all the pages up-to-date. HTML pages that contain server-side includes typically use the .shtml file extension. The SSI command inserts the contents of another document or variable at the SSI tag location. An echo command inserts the contents of an environment variable. The Fsize and Flastmod commands insert size and date of a file, and the Config command controls the format of the output. The Exec command executes a CGI script.

In the present invention, each SHTML template file in template store 562 typically includes data and graphical object tags that identify entities to be incorporated into the graphical markup format set forth within the SHTML file. For example, the text <body bgcolor="#FFFFFF9" marginwidth="0" marginheight="0" topmargin="0" leftmargin="0"> contained in Table 1 is markup language describing the background color for the display page and the margins. Each SHTML file also typically includes SSIs in the form of "Get" commands that are used to resolve references within the SHTML to outside data and retrieve the data into the SHTML file to form an HTML document.

Conventionally, a server process in a remote server uses the SHTML file to construct an HTML document for return to the client in an HTTP message, where it is subsequently rendered by a browser for display to a user. However, in the present invention, the SHTML files are template files structured in accordance with a document type definition (DTD) for a corresponding channel or application. The XML database 564, in turn, contains data and graphical entities that are identified by tag values and also structured according to the corresponding DTD. In order for an application in the client device to access content data provided by a remote server, both the application and the remote server process that provide the content data must conform to the DTD in order for the application to be able to find in XML database 564 the data provided by the remote server. This will be discussed in further detail below with respect to the update process 580.

Figure 12:
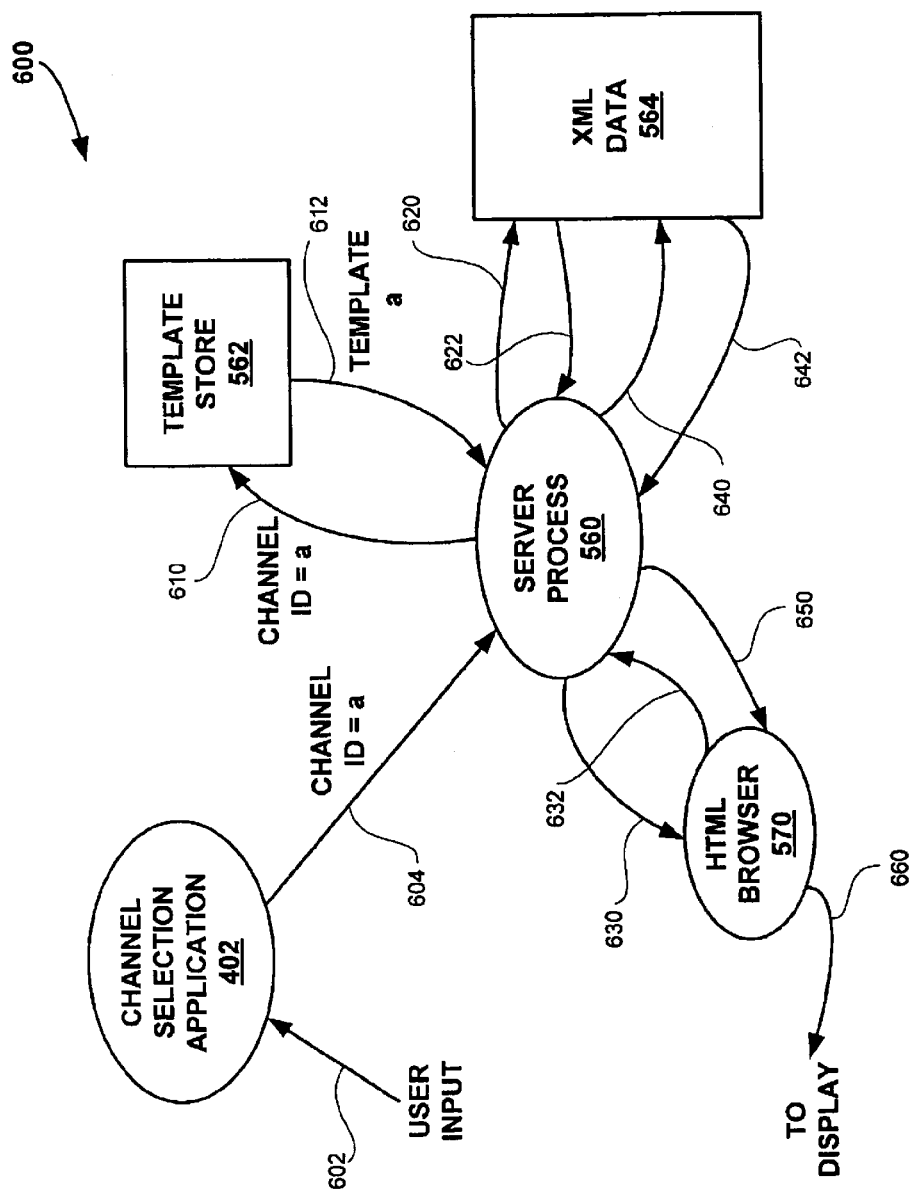
FIG. 12 is a software architecture diagram illustrating an example of the data flow in the architecture of FIG. 11 for a channel selection operation.

As noted above, the thin server process 560 is activated with a template ID that indicates a template file in template store 562. To demonstrate the processing performed in architecture 500, an example of an exchange of messages 600 involved in a user channel selection will be described in the context of FIG. 12, which is a simplified architecture diagram. In FIG. 12, channel selection application 402 receives user input 602 from the input knob 322 as described above. Based on the pointer value and the user input, channel selection application 402 retrieves the channel ID value selected by the user. Channel selection application 402 sends the channel ID value for the selected channel, channel D="a" in this example, in a message 604 to the server process 560 for further processing or, with respect to the alternative discussed above, a channel selection process passes the channel ID to a channel browser application.

Thin server process 560 receives the channel ID="a" through the operating system 510 or, alternatively, via an HTTP request from the channel browser, and, responsive thereto, searches template store 562 for a corresponding SHTML template file, as represented by arrow 610. When the SHTML template file for channel "a" is found, server process 560 retrieves it, as indicated by arrow 612, for further processing. When the user selects the weather channel, the SHTML file in Table 3 is selected. As discussed above, the SHTML file includes SSI statements that cause the server to retrieve data (as specified by tag values) from the database 564 and contains markup formatting information and may also include javascript and CGI commands and further URLs for additional data and image entities. In other words, the SHTML file is effectively a template for a page of information, similar to an HTML page, to be displayed to the user.

Thin server process 560 processes the SHTML file by identifying each of the tag values in the SHTML file and retrieving a corresponding object from the XML database 564 through a server side include (SSI), represented here as arrow 620. The data for each object, such as text, or an index referencing the object, such as a URL for an image, is retrieved from the XML database 564, represented by arc 622, and inserted into the corresponding portion of the SHTML template.

For example, the SHTML file of Table 3 above includes the following SSI command line: #exec cmd= "GetXMLPCData Content/Weather/Primary/Current/ Conditions". This instructs the thin server process 560 to execute the function GetXMLPCData in order to get the data located in directory location Content/Weather/Primary/ Current/Conditions in XML database 564. The other SSI commands in Table 3 are similarly processed to obtain the corresponding data object from XML database 564. As is understood by one of skill in the art, when alternative well-known database implementations are used, the SSI statement would conform to that database management implementation.

When all the SSI commands in the SHTML template have been executed and the data retrieved from the XML database 564, then the completed SHTML file, which is, at this point, effectively an HTML document, is forwarded to HTML browser 570 for further processing, as indicated by arc 630.

Also included in architecture 500 of FIG. 11 is HTML browser 570, which is configured to render the completed SHTML file, which is effectively an HTML document, into a display page for output to the user via display driver 530. As noted above, thin server process 560 executes the SSI to insert objects into the SHTML file. However, some SSIs may be resolved into an index to an object, such as a URL to an object in XML database 564, which may require further processing by the browser. That is, when HTML browser 570 encounters such an index or URL, it sends an http "get" request 632 containing the index to server process 560.

In response, server process 560 resolves the index to an object in XML database 564, represented by arc 640, and retrieves the object, represented by arc 642. The object, such as a gif file or graphical object, is returned to HTML browser 570 in an HTTP response, which is represented by arc 650.

Similarly, some SSIs may be resolved into other browser-oriented commands, such as a URL containing a Common Gateway Interface (CGI) call, or a hyperlink to another html page. The html page may be a static html page or another template-based document related to that channel. When HTML browser 570 encounters such an index, it sends an http "get" request 632 typically containing a URL (which may contain a cgi call) to server process 560.

The processing performed by browser 570 is essentially the same as is performed conventionally, except that the server process 560 resides on the client device and not on a remote server. Once HTML browser 570 has performed a get to retrieve the object for each index reference found in the completed SHTML document, it finishes rendering the page and outputs it to the user display through the OS, as represented by arc 660.

Each time the channel selection of the user changes, the process above is repeated using the newly selected channel ID value to obtain the SHTML file for the selected channel.

Figure 1:
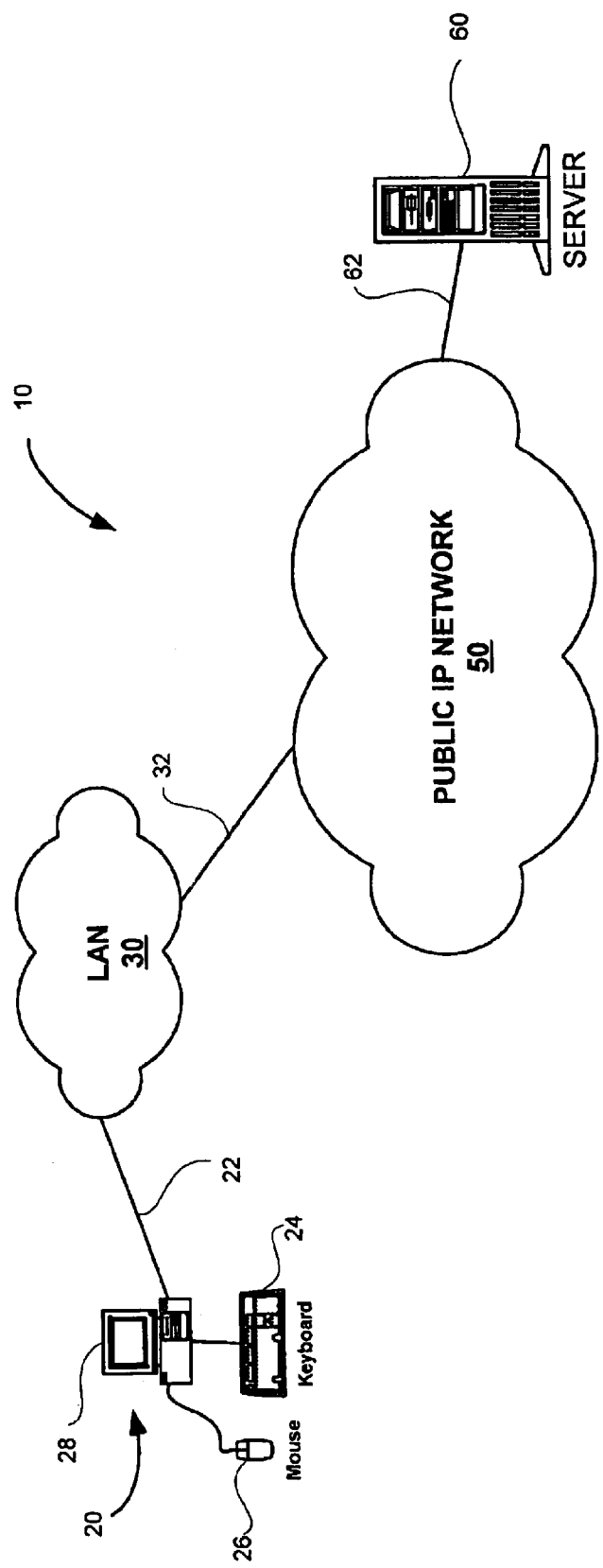
FIG. 1 is a functional block diagram illustrating an example of a conventional architecture for communication of a client device with a server connected to a public IP wide area network, where the client communicates through a LAN also connected to the IP network.
Figure 2:
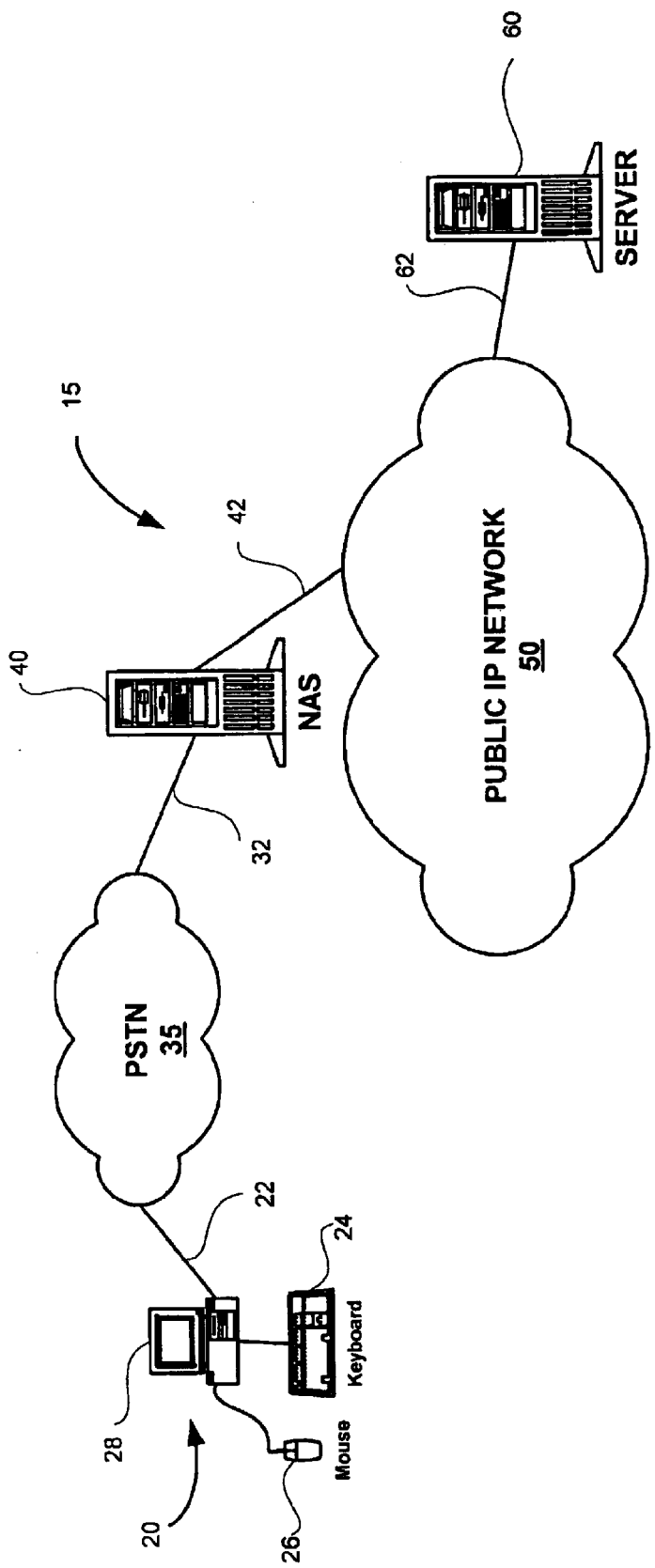
FIG. 2 is a functional block diagram illustrating another example of a conventional architecture for communication of a client device with a server connected to a public IP wide area network, where the client communicates through a public switched telephone network to a network access server also connected to the IP network.
Figure 3:
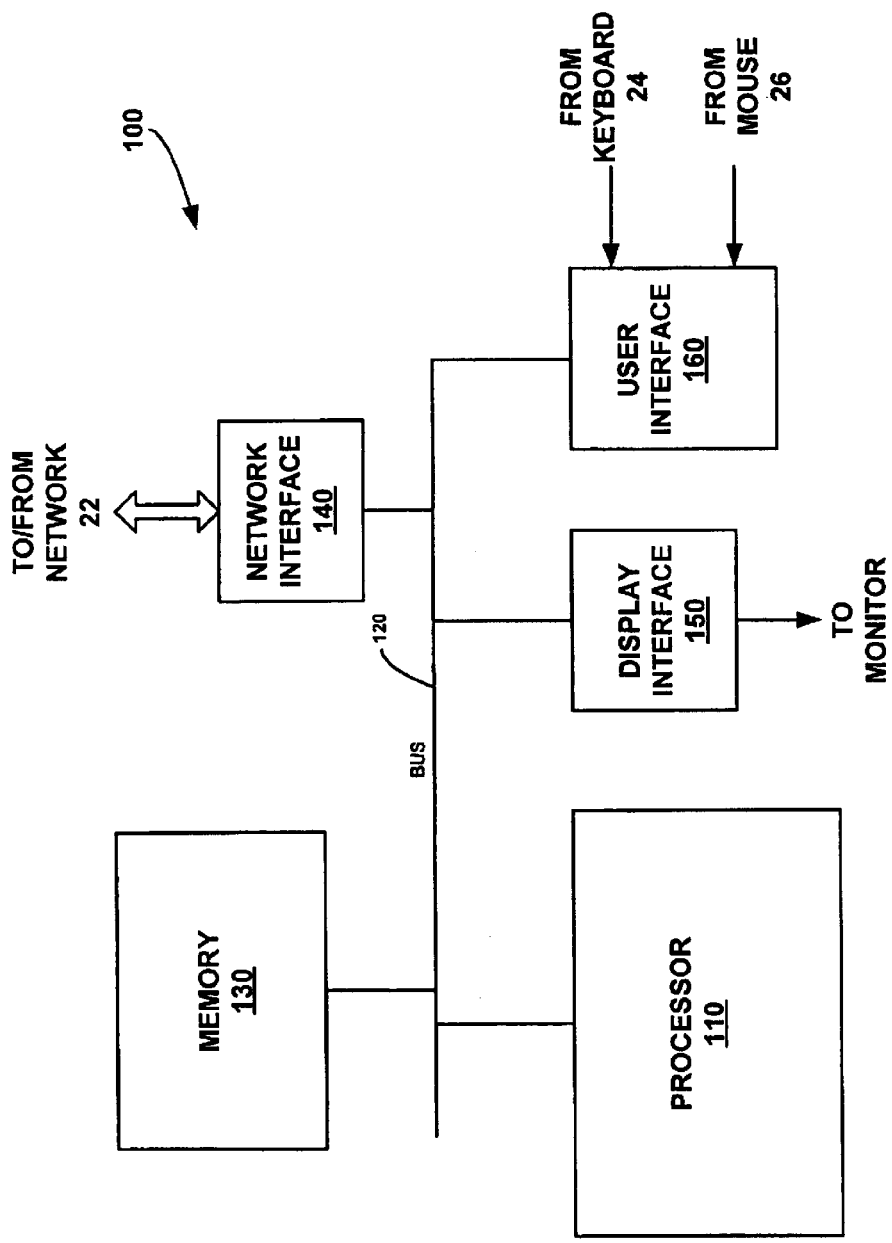
FIG. 3 is a functional block diagram illustrating an example of a client system architecture for the client device of FIGS. 2 and 3.

As noted above, the processing performed by server process 560 is similar to the processing performed by a conventional server, such as server 60, in response to an HTTP request from a conventional client, such as client 20 of FIGS. 1 and 2. The server 60 receives the HTTP request with a URL value for a resource accessible via server 60 and constructs an HTML document containing information corresponding to the URL value. Server 60 constructs the HTML document by performing server-side-includes (SSIs) to obtain the data needed for various parts of the HTML document. The SSIs can be used to obtain data entities for inclusion in the HTML document. The HTML document is then returned to the client device where the HTML document is rendered by a browser application residing at the client device.

Through the combination of templates, e.g. SHTML files, that reference common data objects, e.g. data in XML database 564, and a thin server process, the present invention may function as an efficient mechanism for providing user interface in a client device. For example, applications may be implemented by providing an SHTML file for each application and storing data in the XML database for the application. In this case, each application effectively utilizes the same user interface program, thereby saving the storage space that would otherwise be required to implement a user interface for each application, which reduces the memory footprint for the client device. This approach also simplifies the process of developing applications and channels because the user interface is already provided for other applications and channels. Also, the present invention makes efficient use of memory and bandwidth because, unlike a conventional HTML browser that requires that an entire HTML page of content data and mark-up be downloaded for each user access, only the content data needs to be updated in the XML database 564. Formatting formatting and mark-up information need not be downloaded for each access and may instead be downloaded automatically during periods of low usage, e.g. late at night, as described below.

As was mentioned above, the data content of XML database 564 is provided by a remote server. The data in XML database 564 must be periodically updated to maintain its currency. In addition, the files for the channels for channel selection application 402 may be periodically updated to change the content and appearance of the channel and to add channels.

XML update process 580 maintains the data objects in XML database 564. Update process 580 periodically establishes a connection to a server device, such as server 60, and requests update for the objects in XML database 564. This is accomplished by, for example, sending an HTTP message containing a URL value to a remote server having a content providing process that is configured to use the same DTD as the user application for a given channel. Thus, updated XML documents are retrieved in response to an HTTP request to one or more URLs as specified in the channel definition for the given channel. For example, in the update XML package of Table 4, a URL is defined for the information relating to a primary location indicated by the user's preferences. The URL, in this case, is stored in the database as the <URL> tag value "http://www.Weather.com/voxml/3comus", to which an HTTP request is sent to obtain an XML document containing the weather information for the primary location.

In response to the HTTP request from the update process in the client device, the remote server corresponding to the URL of the HTTP request retrieves the data objects for the request and constructs an XML data document for return to the client update process. The remote server may have its own SHTML template corresponding to the requested URL and, using the tag values from this SHTML template, the remote server performs an SSI with the tag to retrieve the latest version of a data object from a content database accessible from the remote server. The remote server incorporates the current data object for the tag value along with the tag itself in the XML data document sent in the reply to the update process 580 in the client device.

By executing the update process 580 periodically (every 10 minutes, for example) the data for each of the channels and applications in the client device may be made accessible to the user without the need for a connection to the server. The update process 580 may also be adapted to periodically check for updates to the DTD files for the various channels and applications in the client device.

The update process may be further configured to update different types of data at different intervals depending upon the nature of the data. For example, stock quote data may be updated every five minutes, weather data updated hourly, and movie schedules updated weekly. In addition, if a certain type of data changes at known intervals, then the update process may be configured to update the data relative to those intervals, e.g. movie schedules change on Thursday, so the movie channel information is updated on Thursdays. The user may also be provided the opportunity to specify when data is updated, e.g. a user may wish to select that stock quote data be updated every ten minutes and weather data updated every three hours.

The update process may also be configured to perform updates depending upon the communications technology employed by the client device. For example, if the client device uses a modem to communicate over a household telephone line, then the update process may be configured to perform certain update operations late at night or at other times when the household telephone line is typically not in use. Whereas a client device having a high-speed broadband connection, such as through a DSL or cable modem, may perform updates more frequently and with less concern for competing uses.

To perform an update, XML update process 580 accesses package files, residing in package store 582 for each channel or application. Table 4 below is an example illustrating the package file for the weather channel discussed above.

TABLE 4

Update XML package

```
<?xml version="1.0"?>
<!DOCTYPE Channel SYSTEM "./Channel.dtd">
<Channel _D="Weather"0 _Version="08.07.2000.10.45">
    <Image _ID="Graphic" _Type="Graphic" _Format="gif"
    Orientation="Landscape"
Height="104" Width="78" ScalePercent="100"
_Source="http://www.vs.aparato.net/demo/Weather/Weather.gif"
_Cache="True"/>
    <Image _ID="Icon" _Type="Graphic" _Format="gif"
    Orientation="Landscape"
Height="90" Width="33" ScalePercent="100"
_Source="http://www.vs.aparato.net/demo/Weather/WeatherIcon.gif"
_Cache="True"/>
    <Description>The Weather Channel</Description>
    <Archive _ID="Template" Type="Archive" _Format="tar"
_Source="http://www.vs.aparato.net/demo/Weather/template.tar"
_Cache="True"/>
    <URLs>
        <Package _Source="http://www.vs.aparato.net/cgi-bin/
        Weather_channel_update.cgi"
_Cache="False"/>
            <UpdateTable _Type="Table">
                <Update _ID="AW1">
                    <URL>http://www.Weather.com/voxml/
                    3comus</URL>
                    <Description>Weather forecast for primary
                    location</Description>
                    <Days>All</Days>
                    <Times>All</Times>
                    <Timezone/>
                    <DTDPath>Weather/Primary</DTDPath>
                </Update>
                <Update _ID="AW2">
                    <URL>http://www.Weather.com/voxml/
                    3comus</URL>
                    <Description>Weather forecast for alternate
                    location 1</Description>
                    <Days>All</Days>
                    <Times>All</Times>
                    <Timezone/>
                    <DTDPath>Weather/Alt1</DTDPath>
                </Update>
                <Update _ID="AW3">
                    <URL>http://www.Weather.com/voxml/
                    3comus</URL>
                    <Description>Weather forecast for alternate
                    location 3</Description>
                    <Days>All</Days>
                    <Times>All</Times>
                    <Timezone/>
                    <DTDPath>Weather/Alt2<DTDPath>
                </Update>
                <Update _ID="AW4">
                    <URL>http://www.Weather.com/voxml/
                    3comus</URL>
                    <Description>Weather forecast for alternate
                    location 4</Description>
                    <Days>All</Days>
                    <Times>All<</Times>
                    <Timezone/>
                    <DTDPath>Weather/Alt3</DTDPath>
                </Update>
            </UpdateTable>
    </URLs>
    <Preferences>
        <Applet_Type="Applet" _Format="html"
Source="http://www.vs.aparato.net/demo/Weather/prefs.shtml"
_Cache="True"/>
        <Global/>
        <PreferenceTable _Type="Table">
            <Preference _ID="AW1">
                <Enabled>Yes</Enabled>
                <UrlSuffix/>
                <Options>place=^ZIP</Options>
            </Preference>
            <Preference _ID="AW2">
                <Enabled>No</Enabled>
```

TABLE 4-continued

Update XML package

```
                <UrlSuffix/>
                <Options/>
            </Preference>
            <Preference _ID="AW3">
                <Enabled>No</Enabled>
                <UrlSuffix/>
                <Options/>
            </Preference>
            <Preference _ID="AW4">
                <Enabled>No</Enabled>
                <UrlSuffix/>
                <Options/>
            </Preference>
        </PreferenceTable>
    </Preferences>
</Channel>
```

The update XML package in Table 4 is received by the client device and is parsed and stored by the parser application, specifies the channel configuration information for the weather channel example described above. The package is configured according to a channel.dtd shown below in Table 5, as indicated by the DOCTYPE declaration toward the beginning of the file.

TABLE 5

Channel.dtd

```
<!--
    Import the ErgoTypes element/attribute/entity definitions.
-->
<!ENTITY % ErgoTypesDTD SYSTEM "./ErgoTypes.dtd">
%ErgoTypesDTD;
<!--
    Import the TrackingData element definitions.
-->
<!ENTITY % TrackingDataDTD SYSTEM "./TrackingData.dtd">
%TrackingDataDTD;
<!--
    Import the Media element/attribute/entity definitions.
-->
<!ENTITY % MediaDTD SYSTEM "./Media.dtd">
%MediaDTD;
<!--The channel's (brief) description -->
<!ELEMENT Description    (#PCDATA)>
<!ELEMENT Package        EMPTY>
<!ATTLIST Package
    %URLEnt;
>
<!--The channel's tracking upload URL -->
<!ELEMENT Tracking       EMPTY>
<!ATTLIST Tracking
    %URLEnt;
>
<!ELEMENT URL            (#PCDATA)>
<!--
    Format for Days is a "|"-separated list of days on which updates
    should occur. i.e. "Sun"|"Mon"|"Tues"|"Wed"|"Thu"|"Fri"|"Sat"
    or "All".
-->
<!ELEMENT Days           (#PCDATA)>
<!--
    Format for Times is a "|"-separated list of times on which updates
    should occur. The soonest scheduled update after the specified
    time is when the update should occur. Times should be in order,
    and the format for a time entry is HHMM, where HH ranges from
    "00" to "23" and MM ranges from "00" to "59". The string "All"
    can be specified to indicate that every update opportunity should be
    used.
-->
<!ELEMENT Times          (#PCDATA)>
<!--
    The Timezone element can be empty (if the Days and Times elements
```

TABLE 5-continued

Channel.dtd

```
    are both "All"), can be set to 'Z' or 'z' if the update times are
    maintained as UTC, or for any other timezone, the format is
    <STD>[<DST>[,<RULE>]] where:
    the format of <STD> and <DST> is:
    [+-]HH[:MM[:SS]]
    the format of <RULE> is:
    <START>[/<TIME>],<END>[/TIME>]
    <STD> and <DST> represent (respectively) the value in hours, minutes
    and seconds that must be added to the values in the Times element to
    arrive at UTC. If a '-' is present, the time zone is east of the
    Prime Meridian, otherwise it is west of the Prime Meridian. HH ranges
    from "00" to "24", MM and SS (if present) from "00" to "59". If <DST>
    is not present, then Daylight Savings (Summer) Time is not observed.
    <RULE> encodes when the changes to/from daylight savings time occur.
    <START> specifies the day the change to summer time happens.
    <END> specifies the day the change to standard time occurs.
    <TIME> specifies the time the change to/from summer time happens.
    the format of <START> and <END> consist of one of the following:
        J<n> - the Julian day <n> (1 <= <n> <= 365). Leap days
        are not counted and cannot be referenced.
        <n> - the zero-based Julian day (1 <= <n> <= 365). Leap
        years are counted and can be referenced.
        M<m>.<n>.<d> - the <d>th day (0 <= <d> <= 6) (day 0 is Sunday)
        of the <n>th week (1 <= <n> <= 5) of the <m>th month
        (1 <= <m> <= 12) of the year. If <n> equals 5, it references
        "the last <d> day in month <m>, which may occur in either the
        4th or 5th week. Week 1 is the 1st week in which the <d>th
        day occurs.
    the format of <TIME> is:
    HH[:MM[:SS]]
    where the legal values for HH, MM and SS are the same as for
    <STD> and <DST> (above).
    The default for <RULE> when not set (and when <DST> is specified) is:
        M4.1.0/02:00:00,M10.5.0/02:00:00
    which translates to daylight savings time starts on the first Sunday
        of April at 2:00 AM and ends on the last Sunday of October at
        2:00 AM.
-->
<!ELEMENT Timezone       (#PCDATA)>
<!--
    DTDPath specifies the DTD sub-hierarchy that will be refreshed.
    May be '.' to indicate the channel's top level.
-->
<!ELEMENT DTDPath        (#PCDATA)>
<!--
    The _ID of an Update element must match the _ID of a
    Preference element from the PreferenceTable.
-->
<!ELEMENT Update (URL, Description, Days, Times, TimeZone, DTDPath)>
<!ATTLIST Update
    _ID          CDATA       #REQUIRED
>
<!ELEMENT UpdateTable    (Update+)>
<!ATTLIST UpdateTable
    _Type        CDATA       #FIXED      "Table"
>
<!ELEMENT URLs (Package, Tracking?, UpdateTable)>
<!ELEMENT Global (#PCDATA)>
<!ELEMENT Enabled        (#PCDATA)> <!--Valid values:
                                         "Yes"|"No" -->
<!ELEMENT UrlSuffix      (#PCDATA)>
<!ELEMENT Options(#PCDATA)>
<!--
    The _ID of a Preference element must match the _ID of a
    Update element from the UpdateTable.
-->
<!ELEMENT Preference     (Enabled, UrlSuffix, Options)>
<!ATTLIST Preference
    _ID          CDATA       #REQUIRED
>
<!ELEMENT PreferenceTable (Preference+)>
<!ATTLIST PreferenceTable
    _Type        CDATA       #FIXED      "Table"
>
<!--
    Applet MUST have:
```

TABLE 5-continued

Channel.dtd

```
        "_Format" & "_Source" set, and
        "_Cache=True"
-->
<!ELEMENT Preferences    (Applet, Global, PreferenceTable)>
<!--
    Channel configuration.
    First Image element MUST have:
        "_ID=Graphic",
        "_Format" & "_Source" set, and
        "_Cache=True"
        "Orientation", "Height", "Width"
        and "ScalePercent" are recommended
    Second Image element MUST have:
        "_ID=Icon",
        "_Format" & "_Source" set, and
        "_Cache=True"
        "Orientation", "Height", "Width"
        and "ScalePercent" are recommended
    Archive MUST have:
        "_ID=Template"
        "_Format" & "_Source" set, and
        "_Cache=True"
-->
<!ELEMENT Channel (
    Image+,
    Description?,
    Archive?,
    URLs?,
    Preferences?,
    TrackingData?
)>
<!ATTLIST Channel
    _ID         CDATA    #REQUIRED
    _Version    CDATA    #REQUIRED
>
```

Note that the Channel.dtd file of Table 5 also references a TrackingData.dtd, which defines a structure for tracking user access to advertisements accessed by a user of the client device, and a Media.dtd, which defines a structure for downloading advertisements and media clips to the client device. These are shown as Tables 6 and 7, respectively.

TABLE 6

TrackingData.dtd

```
<!--
    SystemDataList specifies name-value pairs that will be collected
    and returned as part of the tracking upload. The "Name" is the
    "_ID" attribute and the "Value" is the corresponding #PCDATA.
    "Variables" can be specified (e.g. to retrieve the IP address).
    The "Values" representing "Variables" should be empty when the
    channel configuration is downloaded and will be filled in by the
    system during the upload process.
-->
<!ELEMENT Value             (#PCDATA)>
<!ATTLIST Value
    _ID         CDATA    #REQUIRED
>
<!ELEMENT SystemDataList    (Value*)>
<!ATTLIST SystemDataList
    _Type       CDATA    #FIXED    "List"
>
<!--
    Format for a hit is the same as TimeStampEnt (UTC).
    _ID attribute maps each hit to a particular _TrackId.
    The HitList should be empty when the channel configuration is
    downloaded and will be filled in by the system during use.
-->
<!ELEMENT Hit       (#PCDATA)>
<!ATTLIST Hit
    _ID         CDATA    #REQUIRED
>
```

TABLE 6-continued

TrackingData.dtd

```
<!ELEMENT HitList    (Hit*)>
<!ATTLIST HitList
    _Type       CDATA    #Fixed "List"
>
<!ELEMENT TrackingData (SystemDataList, HitList)>
```

TABLE 7

Media.dtd

```
<!--
    Used for the duration of audio and video clips,
    specified in HHMM[SS] format.
-->
<!ELEMENT Duration           (#PCDATA)>
<!ELEMENT Caption(#PCDATA)>
<!ELEMENT Copyright          (#PCDATA)>
<!ELEMENT Header (#PCDATA)>
<!ELEMENT Headline           (#PCDATA)>
<!ELEMENT Summary            (#PCDATA)>
<!ELEMENT Credit (#PCDATA)>
<!--
    If the element "Text" will contain HTML, it must be enclosed
    within a CDATA section to prevent parser errors.
-->
<!ELEMENT Text               (#PCDATA)>
<!ELEMENT Byline (#PCDATA)>
<!ATTLIST Byline
    _ID         CDATA    #REQUIRED
>
<!ELEMENT BylineList    (Byline+)>
<!ATTLIST BylineList
    _Type       CDATA    #FIXED    "List"
>
<!ELEMENT Dateline      EMPTY>
<!ATTLIST Dateline
    City        CDATA    #IMPLIED
    Country     CDATA    #IMPLIED
    %DateEnt;
>
<!ELEMENT TextBlock (Text?, Header?, BylineList?, Copyright?,
Dateline?, Credit?)>
<!ATTLIST TextBlock
    _ID         CDATA    #REQUIRED
    _Format     (
                    html     |
                    plain
                ) "html"
    %URLEnt;
    %TimeStampEnt;
>
<!ELEMENT Image (Caption?, BylineList?, Copyright?, Dateline?,
Credit?)>
<!ATTLIST Image
    _ID         CDATA    #REQUIRED
    _Type       CDATA    #FIXED    "Graphic"
    _Format     (
                    bmp      |
                    gif      |
                    jpeg     |
                    tiff     |
                ) "gif"
    Orientation (
                    Portrait|
                    Landscape
                ) "Portrait"
    Height      CDATA    #IMPLIED
    Width       CDATA    #IMPLIED
    ScalePercent CDATA   #IMPLIED
    %URLEnt;
    %TimeStampEnt;
>
<!ELEMENT AudioClip (Caption?, Duration?, BylineList?, Copyright?,
Dateline?, Credit?)>
```

TABLE 7-continued

Media.dtd

```
<!ATTLIST AudioClip
    _ID         CDATA       #REQUIRED
    _Type       CDATA       #FIXED      "Audio"
    _Format     (
                au      |
                mp3     |
                ra      |
                wav
    ) "ra"
    %URLEnt;
    %TimeStampEnt;
>
<!ELEMENT VideoClip   (Caption?, Duration?, BylineList?, Copyright?,
Dateline?, Credi?)>
<!ATTLIST VideoClip
    _ID         CDATA       #REQUIRED
    _Type       CDATA       #FIXED      "Video"
    _Format     (
                mov     |
                mp1     |
                mp2     |
                swf
    ) "swf"
    %URLEnt;
    %TimeStampEnt;
>
```

The XML package file includes a value for the attribute _ID of the Channel tag, e.g. _ID=Weather, that identifies the channel being updated as the Weather channel. Further, the _Version attribute of the Channel tag, e.g. _Version=08.07.2000.10.45, identifies the version of the channel. When update process 580 performs an update, it first sends an HTTP request to the remote server indicated by the URL value contained in the tag "Package Source=http://ww.vs.aparato.net/cgi-bin/Weatherchannelupdate.cgi", where the HTTP request includes the values for the _ID and _Version attributes. The remote server will check the version value for the channel against the latest version that the remote server possesses.

If the remote server has a newer version for the channel, then a new update XML file for the channel will be downloaded in place of the old version and the upper portion of the new XML file is executed. Using the example of Table 4, an Image tag for a graphical image, e.g. _ID=Graphic, for use in the preview area 350 of the client device 320, see FIG. 7, is downloaded from the source identified by "Image Source", e.g. http://www.vs.aparato.net/demo/Weather/Weather.gif, and the gif file returned from the remote server is cached (_Cache=True). Similarly, an icon (_ID=Icon) for use with a graphical user interface (GUI) is also downloaded and cached. Further, a new SHTML template file (_D=Template) is downloaded and archived to the template store 562 for subsequent access by thin server process 560.

The update process then proceeds in the same manner as if the package update file had been current. The UpdateTable is processed by requesting data for the primary location, since it is the only enabled preference.

The update process will include a DTDPath value (Weather/Primary) with the update request that will identify the root directory to be used in storing the updated files for the channel as they are parsed from a document received from the remote server. Each URL used to retrieve content from a remote server has a DTD path that provides a unique name space within the XML database 564. The Preference _ID=AW1 is sent to the remote server indicated by Package _Source and the value of ZIP is automatically appended to the source CGI script. A similar CGI script would be processed for each of the other preferences having the tag Enabled set to "Yes".

In response to the update request from update process 580, the remote server will construct an XML data document containing the requested data and return the XML data document to the client device. Table 8 below illustrates an example of a response.

TABLE 8

XML data document

```
<?xml version="1.0"?>
<Weather _Version="0.2" Partner="Weather.com">
    <Locale>ROLLING MEADOWS</Locale>
    <PrettyDayTime>5:40 PM CDT</PrettyDayTime>
        <Day _ID="Current" Date="20000816">
        <DayName>Today</DayName>
            <Conditions wxcode="01" >SUNNY</Conditions>
        <Temperature unit="F"> 73 </Temperature>
        <RealFeel unit="F"> 72 </RealFeel>
        <Pressure unit="INHG"> 30.18 </Pressure>
        <!--inches mercury-->
        <Windspeed unit="MPH"> 10 </Windspeed>
        <Wind_from> East northeast </Wind_from>
        <Pollen>Low</Pollen>
        <Airquality>Good</Airquality>
<Ad _ID="Ad1" _Type="Graphic" _Format="gif" _Cache="True"
_Source="http://ad.doubleclick.net/ad/Weather.com/Weather;in=home;
pg=home;sz=468
x60;tile=2;ord=81673"
_TrackID="2343987">
http;//ad.doubleclick.net/jump/Weather.com/Weather;in=home;pg=home;
sz=468x60;tile
=2;ord=81673
</Ad>
        </Day>
        <Day _ID="Day1.1" Date="20000816">
            <DayName>TODAY</DayName>
            <Conditions wxcode="01">SUNNY</Conditions>
            <High unit="F">78</High>
            <Low unit="F">64</Low>
        </Day>
        <Day _ID="Day1.2" Date="20000816">
            <DayName>TONIGHT</DayName>
            <Conditions wxcode="42">Thunderstorms overnight</
            Conditions>
            <Low unit="F">64</Low>
        </Day>
        <Day _ID="Day2" Date="20000817">
            <DayName>THURSDAY</DayName>
            <Conditions wxcode="15">Cloudy, thunderstorms;
            breezy</Conditions>
            <High unit="F">79</High>
            <Low unit="F">60</Low>
        </Day>
        <Day _ID="Day3" Date="20000818">
            <DayName>FRIDAY</DayName>
            <Conditions wxcode="03">Partly sunny; breezy
            early</Conditions>
            <High unit="F">76 </High>
            <Low unit="F">54</Low>
        </Day>
        <Day _ID="Day4" Date="20000819">
            <DayName>SATURDAY</DayName>
            <Conditions wxcode="03">Partly sunny; breezy
            later</Conditions>
            <High unit="F">70</High>
            <Low unit="F">53</Low>
        </Day>
        <Day _ID="Day5" Date="20000820">
            <DayName>SUNDAY</DayName>
            <Conditions wxcode="03">Partly to mostly
            sunny<"Conditions>
            <High unit="F">67</High>
            <Low unit="F">56</Low>
        </Day>
<Copyright><![CDATA[Copyright Weather, Inc. 2000]]></Copyright>
</Weather>
```

When update process 580 receives the XML data document from the remote server, it passes the XML data document to XML parser 584. In this embodiment, XML parser 584 is a non-validating parser. In other words, XML parser 584 simply parses the contents of the XML data document based on the tags found in the data document and does not verify the structure of the document. As a result, if a poorly formed XML data document is received, e.g. one containing extraneous data, then the parser 584 will create a directory structure containing the extraneous data. However, if the remote server does not construct the XML data document in sufficient conformance with the SHTML file for the channel, then it may not be possible for thin server process 560 to populate some portions of the SHTML file. In other words, the SHTML file for the channel indicates, in the context of the get commands, where to find certain data objects in the XML database 564. If the remote server does not construct the XML data document such that the data object is stored at the location indicated by the SHTML file, then the data object cannot be retrieved.

With respect to Table 8, for example, XML parser 584 will create a directory structure under a predetermined root directory, e.g. Content/Weather/Primary, that includes a Locale subdirectory that contains files having the text "ROLLING MEADOWS" obtained from the Locale tag in the document. Preferably, each tag from the XML data document corresponds to a directory and the files within the directory are named .attributes and .pcdata, where the .attributes file contains the data for each attribute of a tag and .pcdata contains the data for the tag itself. For example, the tag <Conditions wxcode="01">SUNNY</Conditions> in Table 8 will cause parser 584 to place the text "wxcode=01" into a .attributes file and the text "SUNNY" in a .pcdata file in the subdirectory/Conditions.

Furthermore, for tags representing subelements, where there can be a number of similar subelements, the directories are named using the __ID attribute of the element rather than the exact name of the subelement. This allows multiple instances of the same type of data object to be created without causing the parser to overwrite data objects.

Thus, when the parser encounters the tag, <Day __ID="Current" Date="20000816">, the parser will create a subdirectory called "Current" within the "Weather" directory, based on the value for __ID. The parser then creates child directories under the "Current" subdirectory entitled "Dayname" (with the text "Today" stored in the .pcdata file), Conditions (with wxcode="01" in the .attributes file and the text "SUNNY" stored in the pcdata file), Temperature (with unit="F" in the attributes file and the text "73" stored in the .pcdata file), Pressure (with unit="INHG" in the attributes file and the text "30.18" stored in the .pcdata file), Windspeed (with unit="MPH" in the attributes file and the text "10" stored in the .pcdata file), Wind_from (with the text "East northeast" stored in the .pcdata file), Pollen from (with the text "Low" stored in the .pcdata file), and Airquality (with the text "Good" stored in the .pcdata file). The parser will continue processing to similarly parse and store the remainder of the document.

The XML parser may also be configured to retrieve additional data, such as image data. For example, Table 8 above identifies an Ad tag as follows:

<Ad __ID="Ad1" __Type="Graphic" __Format="gif" __Cache="True" __Source="http://ad.doubleclick.net/ ad/Weather.com/Weather;in=home;pg=home; sz=468× 60;tile=2;ord=81673" __TrackID="2343987">
http://ad.doubleclick.net/jump/Weather.com/Weather;in= home;pg=home;pg=468×60;tile=2;ord=81673
</Ad>

The __ID="Ad1" attribute causes the XML parser 584 to create a subdirectory /Content/AccuWeather/Primary/ Current/Ad1. The __Source attribute identifies a URL value where the advertisement may be recovered. Using the source URL, XML parser 584 will retrieve the advertisement from the remote server indicated by the URL. Since __Cache= "True", the advertisement will be stored in the /Ad1 subdirectory as a gif file, since __Format="gif". The image for the advertisement may then be subsequently retrieved for display.

Note that while the embodiment discussed above is directed toward a directory structure for the XML database 564, other types of databases or data organizations may be adapted for use with the present invention. For example, XML database 564 may be implemented as a Structured Query Language (SQL) based database or a relational database. As yet another alternative, a flat file system may also be adapted for use.

Figure 13:
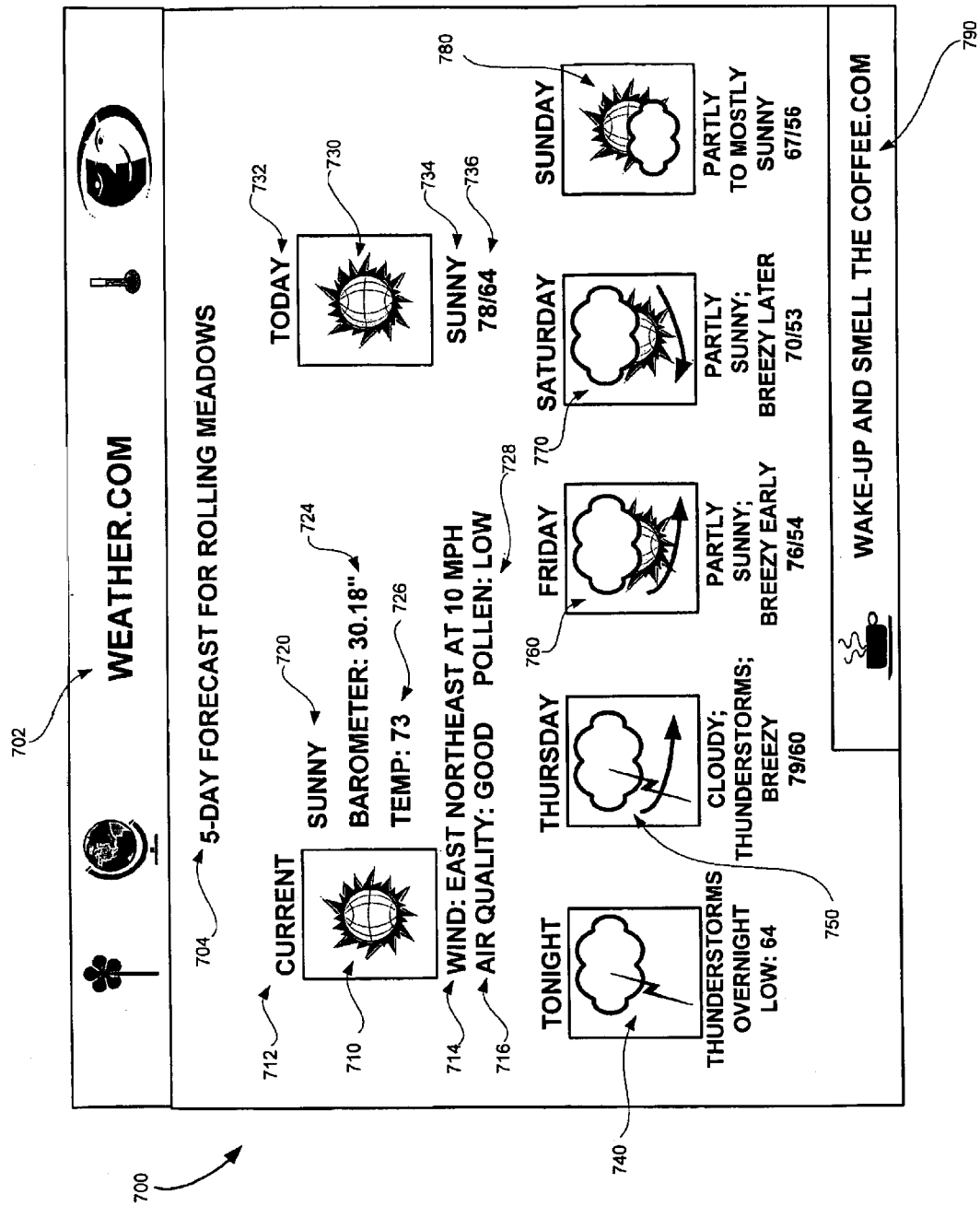
FIG. 13 is a diagram of an example of a display page generated as a result of the selection operation illustrated in FIG. 12.

As a further variation, XML data documents downloaded to the client device may be saved in the client device, e.g. as flat files, until needed by a channel or application. In this scenario, an XML data document is parsed at the time that a channel or application is selected that corresponds to the document. An application may also be configured to access the XML data document directly. In this case, the application operates in a manner similar to a full XML processor, reading and rendering the file in accordance with the XML standard into a form for display to the user Subsequently, when the weather channel is selected, the thin server process 560 will populate the SHTML template of Table 3 with the data from the XML data document of Table 8 that was inserted into XML database 564. The SHTML document, after processing, is rendered, for example, into the display page 700 shown in FIG. 13.

Display page 700 includes an image logo 702 for the weather channel. The reference to the logo appears in Table 3 as the command line:

<!--#config cmdecho="ON"--> <!--#exec cmd= "SetXMLPath/"--> <img
border=0 height=60 src="logo.jpg" width=640> which causes the thin server to retrieve the "logo.jpg" file for the display page.

The location for the forecast is then retrieved and appended to the text "5-DAY FORECAST FOR" by the processing for the SSI statement within the <td> tag in the following line:

<td colspan="3" height="40"><b><font color=#000066 face=Arial size=+1>
Weather® 5-DAY FORECAST FOR <!--#exec cmd="GetXMLPCData Content/Weather/Primary/ Locale"--> </font>
</b> </td> which is processed in thin server 560 by retrieving the text in the .pcdata file with the Content/Weather/Primary/Locale directory in XML database 564 and inserting it after the text defined within the tag. As explained previously, an alternative embodiment utilizes a standard SQL-based database or other suitable database technology for storing and retrieving data for populating the SHTML templates. The resulting text is rendered and displayed as text 704 in display page 700.

The current conditions are then obtained for rendering. A gif file for a current conditions icon is obtained by the following line:

<td align=center> <img border=0 src="Icons/<!--#exec cmd="GetXMLAttribute Content/Weather/Primary/

Current/Conditions wxcode"-->/<!--#exec cmd="GetXMLAttribute Content/Weather/Primary/Current/Conditions wxcode"-->.gif">
</td>

The thin process 560 resolves the wxcode from the XML database 564 and inserts it into another "get" command line to indicate where to find the appropriate gif file in an "Icons" directory. Note that the XML document of Table 8 included a tag for conditions of: <Conditions wxcode="01">SUNNY</Conditions>. Thus, the value of wxcode attribute is 01 and, in this case, a sun icon stored as Icons/01/01.gif is retrieved and rendered in space 710. The current condition is obtained by resolving the tag: <td> <b> <font face=Arial> <!--#exec cmd="GetXMLPCData Content/Weather/Primary/Current/Conditions" -->, which results in the text SUNNY being retrieved from the .pcdata file in the "Conditions" child directory of the "Current" directory and displayed in space 720.

Similarly, the text in space 724 is obtained by resolving and rendering the tag: BAROMETER: <!--#exec cmd="GetXMLPCData Content/Weather/Primary/Current/Pressure"-->. And the text TEMP: 73 in space 726 is obtained by resolving and rendering the tag: TEMP: <!--#exec cmd="GetXMLPCData Content/Weather/Primary/Current/Temperature"-->. Recall that these values were parsed from the portion of the XML document of Table 8 that included the tagged values <Temperature unit="F"> 73 </Temperature> and <Pressure unit="INHG">30.18 </Pressure>.

The current wind conditions WIND: EAST NORTHEAST AT 10 MPH in space 714 are obtained by resolving the tag:

```
<td colspan=2> <b> <font face=Arial> WIND: <!--#exec
cmd="GetXMLPCData Content/Weather/Primary/Current/
Wind_from" -->
    AT <!--#xec cmd="GetXMLPCData
Content/Weather/Primary/Current/Windspeed" -->MPH
    </font> </b> </td>
</tr>
```

Recall that the values for wind direction and wind speed were parsed from the portion of the XML document of Table 8 that included the tagged values <Wind_from> EAST NORTHEAST </ Wind_from > and <Windspeed unit="MPH"> 10 </Windspeed>.

The air quality and pollen displayed in spaces 716 and 728, respectively, of display page 700 are obtained by resolving and rendering the following tags:

```
<tr> <!--Current Air Quality/Pollen -->
    <td colspan=2> <b> <font face=Arial> AIR QUALITY: <i>
<font color=#009900>
        <!--#exec cmd="GetXMLPCData
Content/Weather/Primary/Current/Airquality" -->
        </font> </i> POLLEN: <i> <font color=#ff0000>
<!--#exec cmd="GetXMLPCData Content/Weather/Primary/Current/
Pollen" -->
        </font> </i> </font> </b> </td>
    </tr>
```

Recall that the values for air quality and pollen were parsed from the portion of the XML document of Table 8 that included the tagged values <Airquality> GOOD </Airquality> and <Pollen> LOW </Pollen>.

Likewise, the information for TODAY is obtained by processing the following portion of the SHTML file:

```
<td align=middle width="25%">
    <table border=0 cellpadding=0 cellspacing=0>
        <tr>
            <td align=middle bgcolor=#ffffff> <font face=Arial
            size=-1>
            <b> TODAY
                </b> </font> </td>
        </tr>
        <tr><!--Today Forecast Icon -->
            <td align=middle> <img border=0 src="Icons/<!--#exec
cmd="GetXMLAttribute Content/Weather/Primary/Day1.1/Conditions
wxcode" -->/<!--#exec cmd="GetXMLAttribute
Content/Weather/Primary/Day1.1/Conditions wxcode" -->.gif">
            </td>
        </tr>
        <tr> <!--Today Forecast Conditions/Temperature -->
            <td align=middle bgcolor=#ffffff> <b> <font face=Arial
            size=-1> <!--
#exec cmd="GetXMLPCData Content/Weather/Primary/Day1.1/
Conditions" -->
                <br>
                <!--#exec cmd="GetXMLPCData
Content/Weather/Primary/Day1.1/High" -->/<!--#exec
cmd="GetXMLPCData Content/Weather/Primary/Day1.1/Low" -->
                </font> </b> </td>
        </tr>
    </table>
</td>
```

The text TODAY is rendered into space 732, the icon indicated by the Conditions wxcode for Day 1.1 is inserted into space 730, the current condition from Day1.1/Conditions is inserted into space 734, and the high and low conditions in space 736 are obtained from Day1.1/High and Day1.1/Low, respectively. Recall that the information for TODAY was obtained from the portion of the XML document related to Day_ID="Day1.1" as follows:

<Day _ID="Day1.1" Date="20000816">
<DayName>TODAY</DayName>
<Conditions wxcode="03">SUNNY</Conditions>
<High unit="F">78</High>
<Low unit="F">64</Low>
</Day>

Likewise, the information relating to TONIGHT (Day_ID="Day1.2") is displayed in connection with space 740, THURSDAY (Day_ID="Day2") is displayed in connection with space 750, FRIDAY (Day_ID="Day3") is displayed in connection with space 760, SATURDAY (Day_ID="Day4") is displayed in connection with space 770, and SUNDAY (Day_ID="Day5") is displayed in connection with space 780.

Further note that an advertisement may be included in space 790 and is populated by the following tag from the SHTML file:

<td width="520" height="60" align="center"> <img border=0 height=60 src="ad.jpg" width=468>
</td>

The advertisement was also provided in the XML data document of Table 8 as follows:

<Ad _ID="Ad1" _Type="Graphic" _Format="gif" _Cache="True" _Source="http://ad.doubleclick.net/ad/Weather.com/Weather;in=home;pg=home;sz=468x60;tile=2;ord=81673" _TrackID="23439487"> http://ad.doubleclick.net/jump/Weather.com/Weather;in=home;pg=home;sz=468x60;tile=2;ord=81673
</Ad>

Note that the <Ad tag identifies a URL as the Source attribute for the file for the advertisement and uses the _TrackID (having a unique identifier of 2343987 in this example), defined as an attribute of the Ad tag in the Advertisement.dtd of Table 9.

TABLE 9

Advertisement DTD

```
<!--
    Import the common Ergo element/attribute/entity definitions.
-->
<!ENTITY % ErgoTypesDTD SYSTEM "ErgoTypes.dtd">
%ErgoTypesDTD;
<!ELEMENT Ad      (#PCDATA)> <!--CDATA encapsulated "click-
through" URL -->
<!ATTLIST Ad
    _ID       CDATA    #REQUIRED
    _Format (
            bmp    |
            gif    |
            jpeg   |
            tiff   |
            mov    |
            mp1    |
            mp2    |
            swf    |
    ) "gif"
    Height       CDATA    #IMPLIED
    Width        CDATA    #IMPLIED
    ScalePercent CDATA    #IMPLIED
    %URLEnt;
    %TrackEnt;
>
<!ELEMENT Ads    (Ad+)>
```

Metrics may be maintained indicating each time that the advertisement was output to the user and this metric information may be uploaded to a remote server in connection with the _TrackID.

In the present invention, however, the server process resides in the client device 320 and can be used to provide a user interface for multiple channels and may be applied to multiple user applications. The architecture according to the present invention also permits data to be readily shared across applications.

For example, user application 520 may be configured to use server process 560 to provide a user interface in a manner similar to the way that the server process provides a user interface for channel selection application 402. When user application 520 is activated responsive to, for example, user input, the user application sends a message with template ID="b", for example, to server process 560 through OS 510. Server process 560 retrieves SHTML template "b" from template store 562. Server process 560 resolves the entities in SHTML template "b" by including data objects from XML database 564 identified by the tags in SHTML template "b". Once SHTML template "b" is completed, it is forwarded to HTML browser 570 for rendering into a page for output to the user, as described in greater detail above.

Note that multiple user applications may access the same data objects in XML database 564. If the templates for two different application SHTML templates contain the same tag value, then the same data object will be incorporated into the output for each application. Thus, multiple applications may readily share data from the XML database 564.

For example, if user application 520 is a calendar application that is configured to display the weather for the current day, then the current weather data obtained and stored in XML database 564 can be used by the calendar application. Continuing the example above, the calendar application can obtain the current weather conditions by obtaining the data at directory location Content/Weather/Primary/Current/Conditions. Likewise, if the current temperature is to be displayed, then the temperature data may be obtained from location Content/Weather/Primary/Current/Temperature. The calendar application, if structured to use the thin server 560, may obtain the data by doing a SSI "get" command. Alternatively, it may access the XML database 564 itself and provide its own user interface. So long as the calendar application is structured to look for specific data entities in the same predetermined location used by the weather channel and the remote server providing content to the weather channel, then the data may be shared.

In one alternative embodiment of the present invention, the channel templates, when rendered, may preferably include a user input area where a user may choose to add a downloaded event as a calendar entry to one or more user's databases, such as Palm databases, residing in the client device 320. The user input area provides a brief description of the event next to a calendar icon, with instructions that clicking on the icon will add the event to the users' calendar. The icon has an associated URL that includes a CGI query, wherein one of the CGI query parameters identifies the specific event. The thin server 560 processes the query by passing the XML data object representing the event to the calendar application. Alternatively, a pointer or directory location in XML database 564 for the XML data object for the event may be passed to the calendar application, which subsequently processes the XML data object into a calendar entry.

The calendar application preferably invokes an interpreter that reformats the XML data object into an object suitable for insertion into the selected user database or databases, e.g. reformat the XML data into a Palm calendar event object. The calendar application then invokes a "create new event" input screen using the event data. The user may then select which user database the event will be added to and the user may otherwise edit the entry details before accepting the event. For example, an XML data object representing a sports event may be included in an XML data document, which contains data for a channel, sent from a remote server to the client device. The XML parser 584 parses the event data object from the data document and inserts it into XML database 564. When the channel is rendered, e.g. selected by the user for display, the event data object is displayed to the user and the user is prompted to select whether the event data object should be inserted into a user calendar database residing on the client device. If the user elects to have the event copied to a calendar database, then the calendar application is activated and prompts the user to indicate a selected calendar database or databases. After the user makes a calendar database selection, the event data object is reformatted, if necessary, and inserted into the selected calendar database or databases. Subsequently, the information from the sports event will appear in the selected calendar database or databases.

Automatic Configuration of a Client Device

Figure 14:
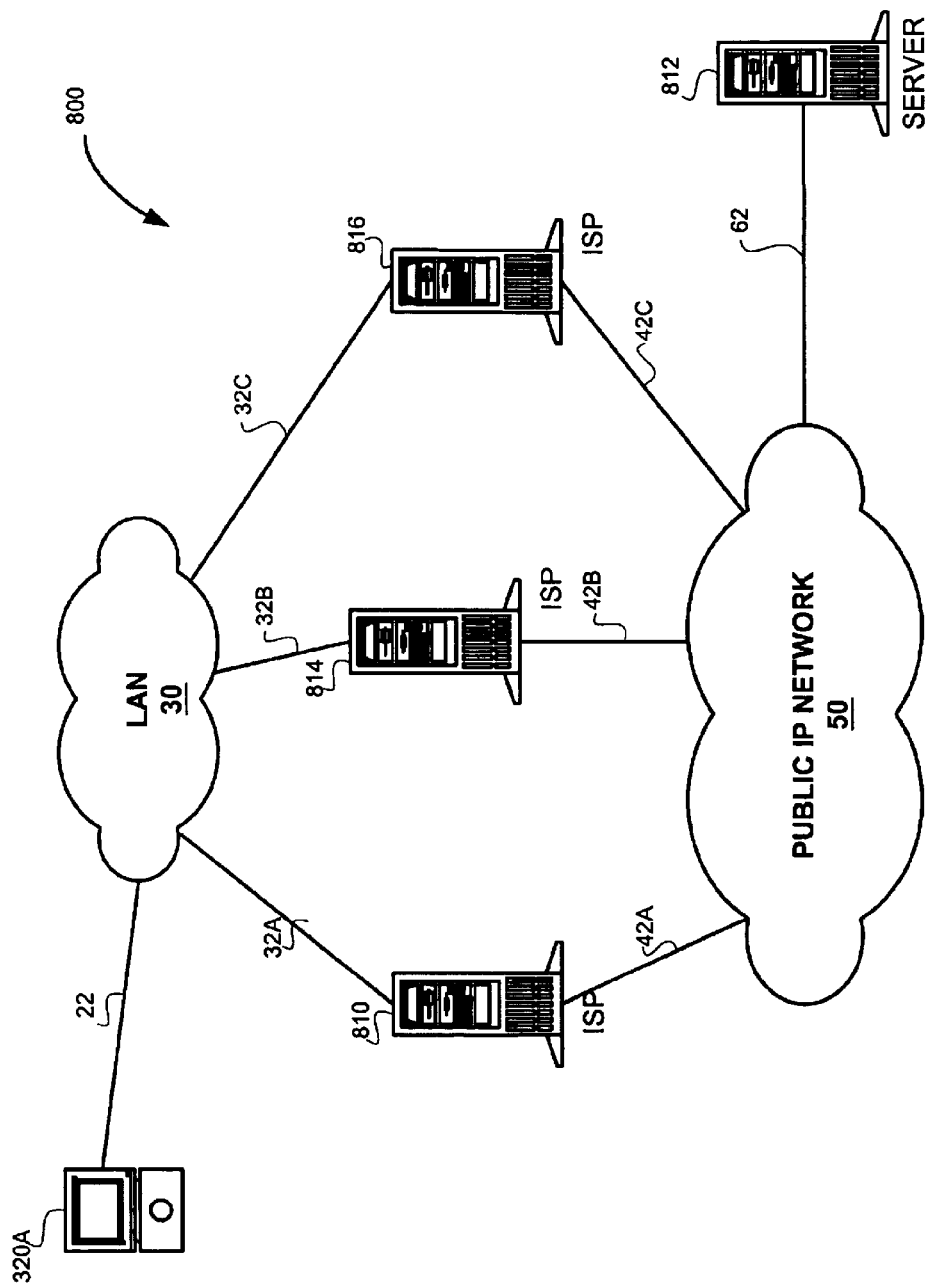
FIG. 14 is a block diagram illustrating a system in which an Internet Service Provider conforms to a universal type of subscription and allows for an automatic configuration of a client device.

FIG. 14 is a block diagram illustrating an exemplary system 800 with major elements used for automatically configuring a client device according to one embodiment of the present invention. The system 800 includes an embodiment of client device 320A connected to LAN 30 via communication link 22. Further, LAN 30 is connected to a plurality of systems each of which includes a plurality of network devices arranged to provide configuration data to client device 320A. According to an exemplary embodiment, the plurality of systems includes a plurality of Internet Service Providers ("ISPs") such as an ISP 810, an ISP 814 and an ISP 816, for example. Each of the plurality of ISPs provides means such as computers and/or network servers via which client device 320A may connect to Public IP Network 50. Further, each of the ISPs provides a user of client device 320A the ability to dial one or more telephone numbers for establishing a connection to one of the computers owned or managed by the ISPs. Alternatively, a user can employ other types of connections such as a DSL connection or a cable modem connection to establish a communication session with the ISP.

According to the exemplary embodiment, ISP 814, ISP 810 and ISP 816 conform to a universal type of subscription, which refers to each ISP employing a data structure compliant with a data structure sent from client device 320, such as an XML data structure, for example. Further, each of the ISPs in FIG. 14 is arranged to enable a user of client device 320A to automatically configure client device 320A. Further, each ISP is connected to Public IP Network 50 via connection 42A, 42B and 42C, and each ISP enables client device 320A to select network resources accessible through Public IP Network 50, such as those residing on a server 812, for example. The exemplary block diagram is described only by a way of an example, and more, fewer or other functional elements could be employed without departing from the scope of the present invention.

Prior to client device 320A having access to any network resources accessible through Public IP Network 50, such as resources residing on server 812, a user of client device 320A should register with an Internet Service Provider such as ISP 810 or ISP 814, for example. Upon registering with ISP 810, for example, ISP 810 provides client device 320A with a number of configuration parameters enabling client device 320A to connect to Public IP Network 50 and to access resources available on server 812, for example. The user of client device 320A may already have an existing account such as an Internet account with ISP 810, or the user may need to create a new account with the ISP 810, for example.

Figure 15:
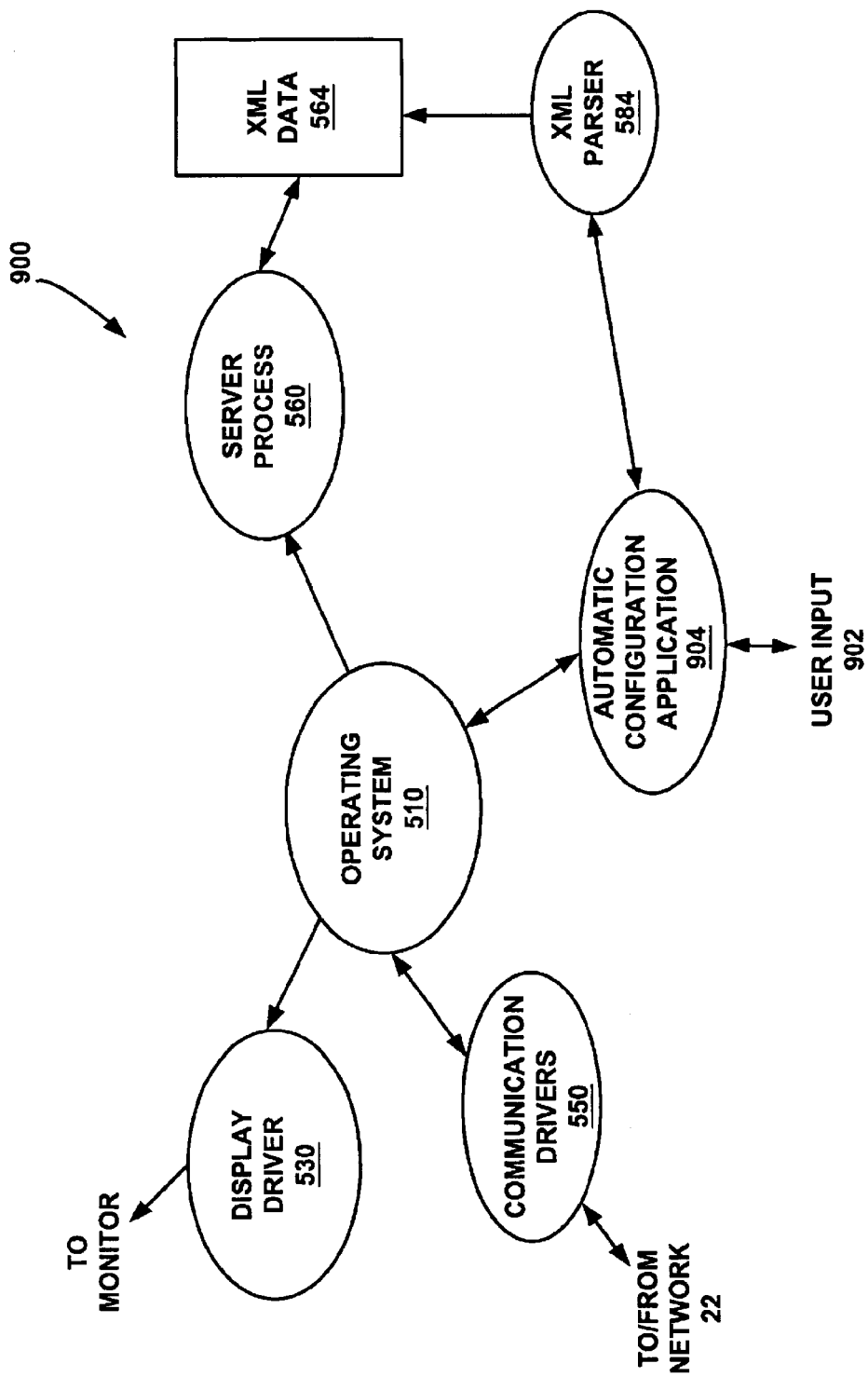
FIG. 15 is a block diagram illustrating an architecture that allows for an automatic configuration of a client device.

FIG. 15 is a simplified architecture diagram 900 illustrating processing that may be performed in architecture 500 for automatically configuring client device 320A according to one exemplary embodiment of the present invention. In FIG. 15, an automatic configuration application 904 may initiate an automatic configuration process on client device 320A. For example, when application 904 is activated upon a first installation of client device 320A, application 904 queries a user for data such as the user's information data. For example, application 904 displays to the user a sequence of graphical selection inputs and input windows via display drivers 530 on a monitor of client device 320A to query the user for the user information data.

Further, automatic configuration application 904 is arranged to provide a user with a list of ISPs that conform to the automatic configuration process and to configure the user information data required by a service provider into a predetermined data structure such as an XML data structure, for example. In one exemplary embodiment, XML database 564 can comprise a list of ISPs, and automatic configuration application 904 can retrieve the list of ISP from XML database 564. Further, in one embodiment, automatic configuration 904 includes a processor such as an XML processor to read XML documents and process them into a viewable format for the user.

Additionally, the automatic configuration application 904 sends the configured user information data via communication drivers 550 to an ISP selected by the user. Further, automatic configuration application 904 receives configuration data from the ISP via communication drivers 550. In addition, automatic configuration application 904 is arranged to forward configuration data received from an ISP such as configuration data in the XML data structure to XML parser 584, which parses the configuration data and forwards the parsed data to XML database 564. In one embodiment, XML database 564 comprises an XML configuration database for storing configuration data so that client device 320A may access the configuration data when connecting to the ISP. Architecture 900 in FIG. 15 is only an exemplary architecture and more, fewer or different elements could also be used.

Figure 16A:
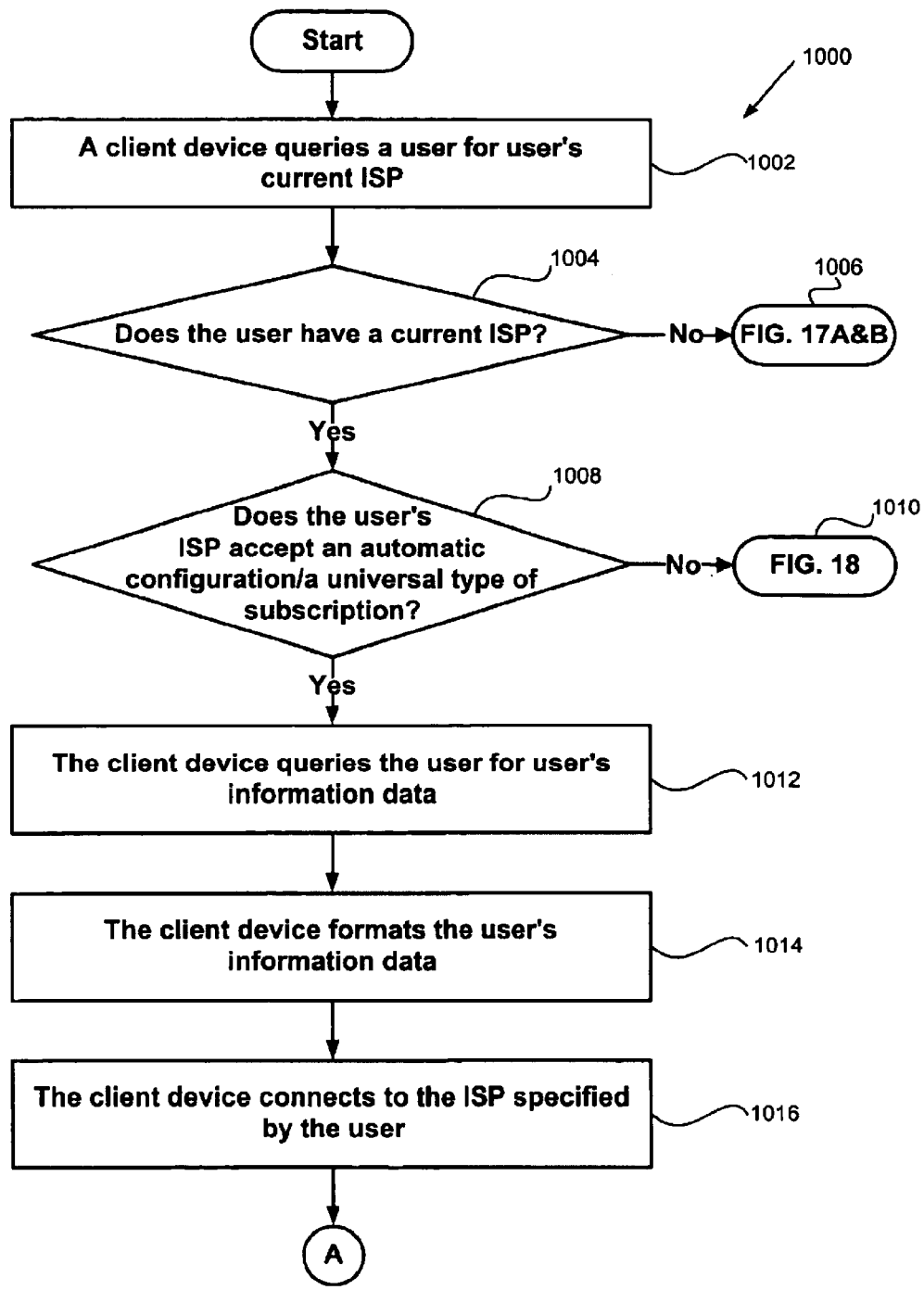
FIGS. 16A and 16B are flow charts illustrating a method for automatically configuring a client device, the method in which a user has an existing Internet Service Provider and the user's Internet Service Provider conforms to a universal type of subscription and allows for an automatic configuration.
Figure 16B:
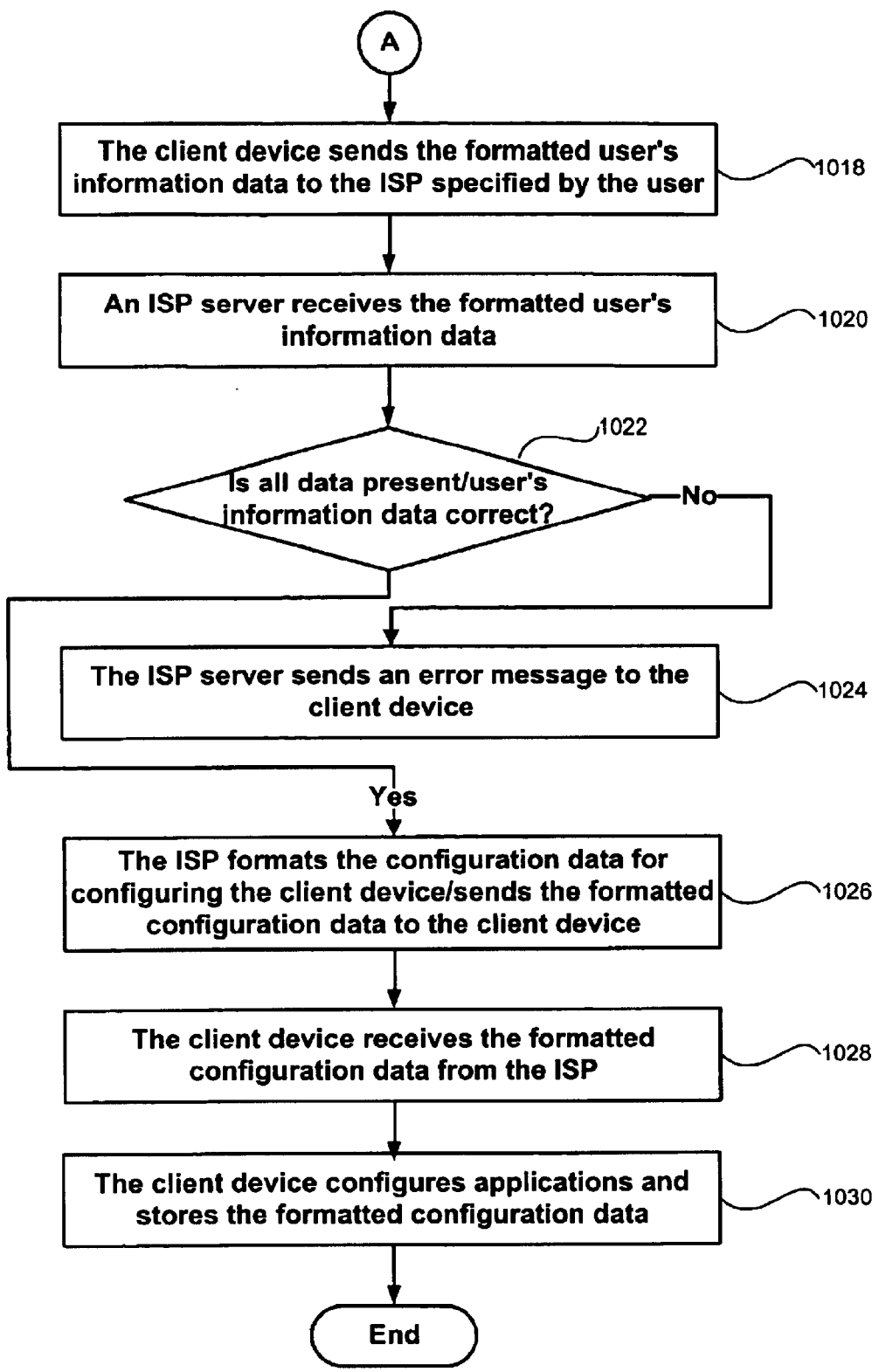

FIGS. 16A and 16B are flow charts illustrating a method 1000 for automatically configuring a client device according to one embodiment of the present invention. The method 1000 will be described in reference to client device 320A and ISP 810 shown in the block diagram of FIG. 14. The method 1000 illustrates a configuration process, in which ISP 810 conforms to the universal type of subscription and allows for the automatic configuration process. Further, the method 1000 illustrates a process in which a user of client device 320A already has an existing account with service provider such as ISP 810, for example.

At step 1002, client device 320A queries the user if the user has an existing ISP. In one embodiment, automatic configuration application 904 displays, via display drivers 530, a number of graphical selections on the monitor of client device 320A for the user to answer the client device's query. By selecting one of the graphical selections, the user may either input that the user does or does not have a current ISP. Alternatively, client device 320A displays to the user a list of names of ISPs that conform to the automatic configuration process. Further, client device 320A queries the user for a name of the user's current ISP. In one embodiment, the user inputs a name of the user's ISP via a user input means such as a keyboard or a stylus.

At step 1004, based on the user's input 902, automatic configuration application 904 of client device 320A determines whether the user has an existing ISP. If the user does not have an existing ISP, the method 1000 continues in FIGS. 17A and 17B, as shown at step 1006. However, if client device 320A determines that the user has input a name of the user's current ISP, at step 1008, automatic configuration application 904 verifies whether the user's current ISP accepts the automatic configuration process. In an exemplary embodiment, client device 320A may store in memory subsystem 420 a list of ISPs that accept the automatic configuration process. Further, processor 400 may be arranged to verify whether the user's current ISP is one of the ISPs stored in memory subsystem 420 upon a query initiated by automatic configuration application 904, for example. If the user's current ISP does not allow the automatic configuration process, the method 1000 continues in FIG. 18 as shown at step 1010.

Referring back to step 1008, if automatic configuration application 904 has verified that the user's current ISP supports the automatic configuration process and universal type of subscription, the method 1000 continues at step 1012. At step 1012, client device 320A queries the user to input the user's information data. According to an exemplary embodiment, client device 320A requests the user to input the user's e-mail address, password and telephone number, for example. However, the exemplary embodiment associated with the method 1000 is not limited to client device 320A querying a user for that user's information data, and other types of user's information data could also be used. The user may input the user's information data using a conventional means for inputting data such as a keyboard or, alternatively, the user may employ a stylus with graphical selection inputs displayed to the user on the monitor of client device 320A.

At step 1014, automatic configuration application 904 formats the user's information data into an XML data stream, which according to an exemplary embodiment is in a DTD format. At step 1014, client device 320A connects to the user's ISP. In an exemplary embodiment, automatic configuration application 904 employs communication drivers 550 having a communication port such as a modem to establish a communication session with the user's ISP, such as ISP 810. Further, client device 320A stores in a specialized database or memory subsystem 130 communication data for connecting with a plurality of predetermined ISPs. Alternatively, client device 320A establishes a communication session with the user's ISP via a cable modem connection or a DSL connection, for example.

When the communication session is established, as shown at step 1018, client device 320A sends the formatted user's information data to the user's ISP. According to an exemplary embodiment, client device 320A connects to an address such as an IP address of a user's ISP server that handles the automatic configuration process. Thus, client device 320A may attach the formatted user's information data to a predetermined Universal Resource Locator ("URL") on the ISP server. An exemplary URL with an attached formatted client information data could have the following format:

"http://host's name/folder, directory or port:/client device's predetermined name?AddressType= Email&user=name&domain= Emaildomain&Password=Pass&Area=XXX&Exch= XXX&Number=XXXX"

in which "name@Emaildomain" corresponds to the user's e-mail address and "Pass" corresponds to the user's password. Further, the "XXX" symbols associated with the "Area" correspond to digits of an area code of the user's telephone number, the "XXX" symbols associated with the "Exch" correspond to first three digits of the user's telephone number and the "XXXX" symbols associated with the "Number" correspond to last four digits of the user's telephone number. However, the exemplary embodiment is not limited to client device 320A sending formatted user's information in a URL, and client device 320A could employ other methods to deliver user's information data to a server associated with the user's ISP.

At step 1020, the user's ISP server receives the formatted user's information data. When the user's ISP server receives the formatted user's information data, at step 1022, the ISP server verifies whether the required data are present and whether the received data have a correct data structure. According to an exemplary embodiment, the correct structure is an XML data structure; however, other structures may also be used. If the ISP server verifies that either the structure of the received data is incorrect or the required data are missing, at step 1024, the ISP server sends an error message to client device 320A. According to an exemplary embodiment, the error message may comprise an ErrorCode value and an ErrorMessage associated with a particular ErrorCode value. For example, the ErrorCode value may be one of the following: "ServerDown", "UnknownRequest", "AreaCodeError", "ExchangeError", "PhoneNumberError", "AccountError", "DomainError", "PasswordError". However, the exemplary embodiment is not limited to only such ErrorCode values, and other ErrorCode values could also be used.

When automatic configuration application 904 of client device 320A receives one of such errors, automatic configuration application 904 interprets the received ErrorCode value. For example, if the ErrorCode value corresponds to "PasswordError", then automatic configuration application 904 formats the received error message into a format viewable by the user, and displays the "Password Error" message to the user. Additionally, automatic configuration application 904 queries the user to input a correct password. When the user inputs a new password, automatic configuration application 904 formats the new password into an XML data stream in the DTD format and sends it to the ISP server, and the method 1000 continues as described in reference to the steps 1018, 1020 and 1022.

Referring back to the step 1022, if the ISP server determines that the required data are present and the format of the data is correct, at step 1026, the ISP server formats a set of configuration data into an XML data stream including a number of DTDs. Further, the ISP sends the set of formatted configuration data to client device 320A. According to an exemplary embodiment, the ISP server formats the configuration data for client device 320A into an XML data stream having a plurality of DTDs. An exemplary set of data that is sent from the ISP server comprises a Point of Presence ("POP") table, Server data and Login information data for the user.

The POP table includes a list of telephone numbers that the user of client device 320A may use to connect to the user's ISP. According to the exemplary embodiment, since the user's ISP has been the user's existing ISP, some of the telephone numbers may be the telephone numbers that have already been known to the user. However, the list of telephone numbers may comprise a unique list of telephone numbers specifically reserved for users of client devices such as client device 320A. Further, similar to the user's telephone number that client device 320A has sent to the ISP server, each telephone number in the list may be separated into area code digits, exchange digits and number digits. According to one embodiment, the ISP server assigns the list of telephone numbers for the client device 320A based on the area code of the user's telephone number, for example. Further, along with each telephone number, the POP table includes a "status" of each attached telephone number. According to an exemplary embodiment, status values include a "new" status value associated with a telephone number (signifying that this is a new telephone number), or a "deprecated" status value associated with a telephone number (signifying that this number has been canceled). The POP table may include other parameters such as available capability of a connection or speed of the connection, for example.

According to an exemplary embodiment, the Server data set includes a list of available server names along with addresses of those available servers. For example, the list of available server names defines Domain Name Servers ("DNS") such as a "DNSPrimary" (i.e., the first server available), "DNSSecondary" or "DNSTertiary. The DNS, as known in the art, is a type of a server that includes a system of computers that convert domain names into IP addresses, which typically consist of a string of four numbers up to three digits each. Further, the list of available servers may further define a name of a server associated with an incoming mail such as a Post Office Protocol ("POP3") server or a name of a server associated with an outgoing mail server such as a Simple Mail Transfer Protocol ("SMTP") server. As known in the art, when a sender initiates sending of an electronic mail message, the sender sends the electronic mail message via an SMTP server to a POP3 server, from where the addressee may retrieve the electronic mail message. Therefore, when configuring an electronic mail application on client device 320A, a POP3 server and an SMTP server must be specified.

The Login Information data for the user generally refers to data that a user may use to access one of the computers and/or servers associated with the ISP upon establishing a connection with the ISP. Thus, according to an exemplary embodiment, the Login Information data includes an account number, a username and a password, for example.

Table 10 below is an example DTD file defining ISP configuration parameters that client device 320A receives from the ISP such as ISP 610, according to the present invention.

TABLE 10

```
ISPConfiguration.dtd

<!ELEMENT Number        (#PCDATA)>    <!--Required -->
<!ELEMENT City          (#PCDATA)>    <!--May be
                                         empty -->
<!ELEMENT State         (#PCDATA)>    <!--May be
                                         empty -->
<!ELEMENT Country       (#PCDATA)>    <!--May be empty -->
<!ELEMENT Capability    (#PCDATA)>    <!--Required,
                                         "Analog" | "SDN"
                                         -->
<!ELEMENT Speed         (#PCDATA)>    <!--May be empty
                                         -->
<!ELEMENT Status        (#PCDATA)>    <!--Required -->
<!--Valid values for Status: "Deprecated" | "Unchanged" | "New" -->
<!ELEMENT POP           (Number, City, State, Country, Capability,
                         Speed, Status)>
<!ATTLIST POP
    _ID      CDATA      #REQUIRED
>
<!ELEMENT POPTable (POP+)>
<!ATTLIST POPTable
    _Type    CDATA      #FIXED       "Table"
    Scope (
             Global       |
             AreaCode     |
             Exchange     |
             None
    ) #REQUIRED
>
<!ELEMENT Server    EMPTY>
<!ATTLIST Server
    _ID (
             DNSPrimary   |
             DNSSecondary |
             DNSTertiary  |
             POP3         |
             IMAP4        |
             SMTP         |
             NTP
    ) #REQUIRED
    Address            CDATA     #REQUIRED
    Account            CDATA     #IMPLIED
    Password           CDATA     #IMPLIED
>
<!ELEMENT Servers (Server*)>
<!ATTLIST Servers
    Domain             CDATA     #REQUIRED
    UseDHCP (
             True      |
             False
    ) "False"
>
<!ELEMENT Login    EMPTY>
<!ATTLIST Login
    Account            CDATA     #REQUIRED
    Password           CDATA     #REQUIRED
>
<!--Valid ErrorCode values are
    "ServerDown"
```

TABLE 10-continued

```
ISPConfiguration.dtd

"UnknownRequest"
    "AreaCodeError"
    "ExchangeError"
    "PhoneNumberError"
    "AccountError"
    "DomainError"
    "PasswordError"
    "SecondaryAuthNeeded"
    "SecondaryAuthError"
    "OtherError"
-->
<!ELEMENT ErrorCode          (#PCDATA)>
<!ELEMENT ErrorMessage       (#PCDATA)>
<!ELEMENT Error (ErrorCode, ErrorMessage)>
<!ATTLIST Error
    _ID             CDATA     #REQUIRED
>
<!ELEMENT ErrorTable (Error+)>
<!ELEMENT ISPConfiguration (ErrorTable | (POPTable, Servers,
Login) )>
<!ATTLIST ISPConfiguration
    _Version        CDATA     #FIXED      "1.1"
>
```

At step 1028, automatic configuration application 904 receives the formatted set of configuration data from the ISP via communication drivers 550. According to an exemplary embodiment, the set of configuration data is formatted into an XML data stream having a plurality of DTDs such as shown in Table 10, for example. Therefore, when automatic configuration application 904 receives the configuration data, automatic configuration application 904 processes the number of DTDs in the XML data stream by identifying each tag's value.

At step 1030, client device 320A initializes a number of applications such as a dial-up network application, for example. Additionally, automatic configuration application 904 forwards the XML data to XML parser 584, which parses the configuration data and forwards the parsed data to XML database 564, for example. Alternatively, client device 320A can have a separate configuration database arranged for storing the configuration data. Further, automatic configuration application 904 displays the login information to the user. However, the user is not limited to using the login information provided by the ISP, and the user may later request a modification of the login information. According to an exemplary embodiment, when automatic configuration application 904 receives the configuration information data from the ISP, client device 320A can update channels, and automatic configuration application 904 terminates the communication session with the ISP. Further, a user of client device 320A can later establish a new communication session with ISP server using the configuration parameters in XML database 564 downloaded by client device 320A.

The method 1000 described in reference to FIGS. 16A and 16B is a universal type of method and is not limited to only one ISP. Users of client devices, such as client device 320A, may employ the method 1000 to configure their client devices using any ISP conforming to the universal type of subscription. Alternatively, the method 1000 could be applied to ISPs that do not conform to the universal type of subscription. In such an embodiment, client device 320A can be arranged to store different structures of data associated with a plurality of ISPS, and based on the user's input, client device 320A can be arranged to send the user's information data in the data structure associated with the user's ISP such as XML data structure or HTML data structure. Further, client device 320A may be arranged to format user information data into a predetermined format employed by each ISP. For example, one ISP may require the user's telephone number data to be in a first field of data structure, and a second ISP may require the user's telephone number data to be in the third field of data structure. In such an embodiment, client device 320A stores a list of predetermined formats for each ISP in an internal look up table, and based on the user's ISP, client device 320A can format the user information data according to a predetermined data format associated with the ISP selected by the user.

Figure 17A:
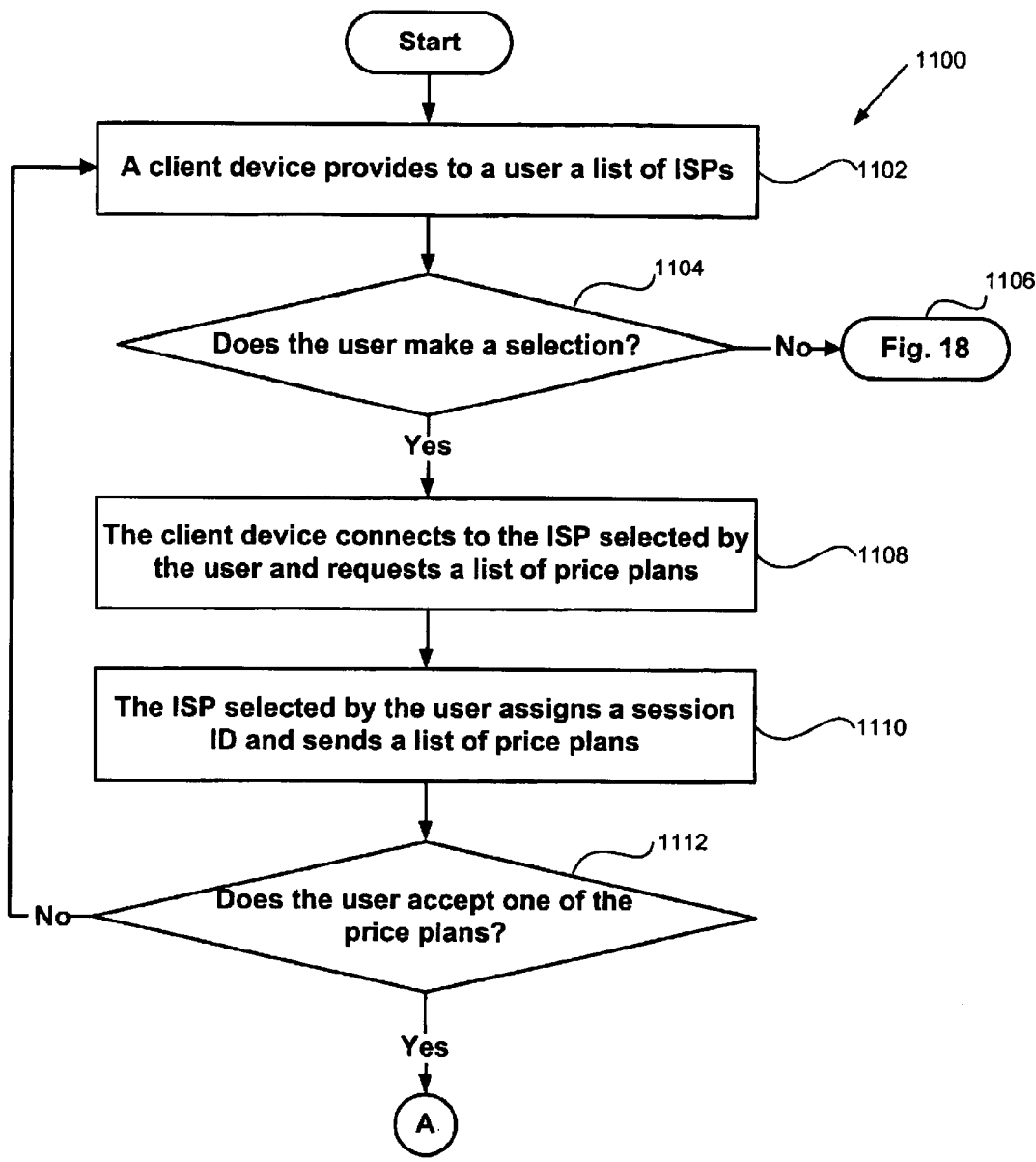
FIGS. 17A and 17B are flow charts illustrating a method for automatically configuring a client device, the method in which a user does not have an existing Internet Service Provider.
Figure 17B:
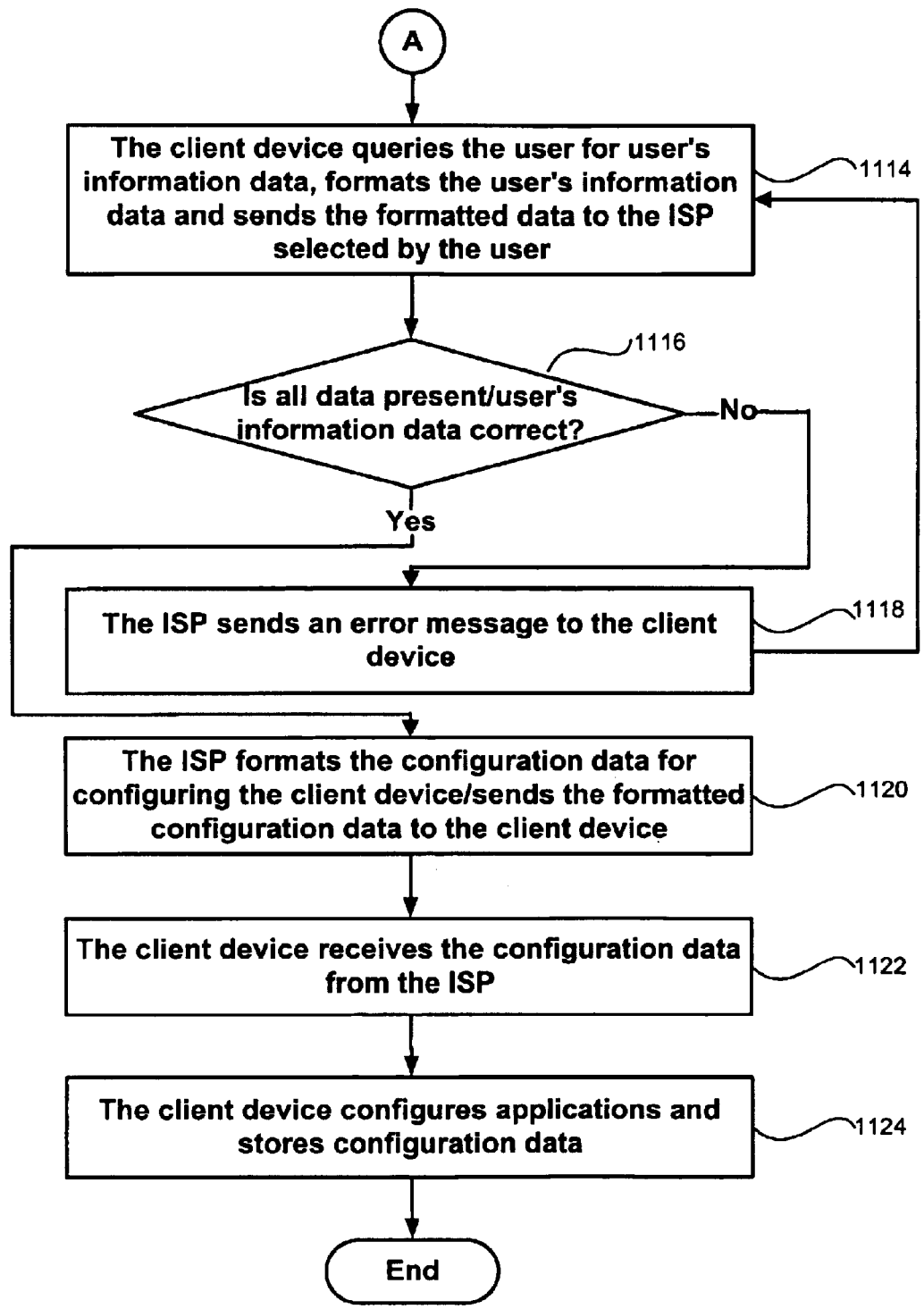

FIGS. 17A and 17B are flow charts illustrating a method 1100 for automatically configuring a client device. The method 1100 may be employed when a user does not have an existing account with any ISP and, further when the user selects to use an ISP that conforms to the universal type of subscription and accepts the automatic subscription method. It is understood that when the method 1100 refers to the ISP receiving, sending or processing information, one or more computers or servers associated with the ISP perform such functional operations.

At step 1102, automatic configuration application 904 of client device 320A displays, via display driver 530, to a user a list of ISPs that accept an automatic configuration process and that conform to a universal type of subscription. At step 1104, client device 320A determines whether the user has chosen one of the ISPs from the list provided to the user, or whether the user has declined to use one of the ISPs from the list. If the user declines to use one of the ISPs from the list provided by client device 320A and the user has an existing ISP, the method 1100 continues in FIG. 18, as shown at step 1106. If the user selects one of the ISPs from the list, at step 1108, automatic configuration application 904 connects to the ISP selected by the user. In an exemplary embodiment, automatic configuration application 904 employs one of the communication drivers 550 such as a modem to establish a communication session with the ISP selected by the user, such as ISP 810, for example. Further, at step 1108, automatic application 904 requests a list of price plans that the ISP offers for the service to users. In an exemplary embodiment, client device 320A sends the request as the XML data stream comprising a number of DTDs. Similar to method 1000 described in reference to FIGS. 16A and 16B, client device 320A may send a request to the ISP in a form of the URL on the ISP, for example. Additionally, a user may select more than one ISP, and in such an embodiment, client device 320A may simultaneously send more than one request for the price plans to more than one ISP.

At step 1110, the ISP selected by the user assigns a session ID to identify that a new service is being requested. The ISP then formats the session ID and a list of available price plans into a predetermined data stream structure. According to an exemplary embodiment, the ISP formats the list of available price plans and the session ID into an XML data stream having a plurality of DTDs, for example. In addition to the list of price plans, ISP may format additional details pertaining to each plan, such as available service information associated with each price plan or contract conditions, for example. Further, the ISP sends the session ID and the list of price plans to client device 320A. Table 11 below is an example DTD file used for defining different price plans by an ISP.

TABLE 11

ISPPricePlan.dtd

```
<!ELEMENT Description    (*PCDATA)>    <!--Encapsulate in
                                           CDATA section -->
<!ELEMENT SessionID      (*PCDATA)>
<!ELEMENT Details (#PCDATA)>    <!--Encapsulate in CDATA
                                    section -->
<!--
   "_ID" holds the Regcode or plan identifier
-->
<!ELEMENT PricePlan     (Description, SessionID, Details?)>
<!ATTLIST PricePlan
   _ID      CDATA     #REQUIRED
>
<!ELEMENT ISPPricePlans (PricePlan+)>
<!ATTLIST ISPPricePlans
   _Version            CDATA     #FIXED     "1.0"
>
```

When automatic configuration application 904 receives the list of price plans and the session ID via communication drivers 550, the automatic configuration application processes the received data and displays to the user available price plans and any additional detailed information pertaining to each price plan. According to an exemplary embodiment, client device 320A may display to the user a number of graphical selection inputs that the user may select in order to sign up for a certain price plan. Additionally, client device 320A may display a graphical selection input that the user may select in order to decline all of the presented price plans. At step 1112, automatic configuration application 904 verifies whether the user has selected one of the price plans available from the ISP or whether the user has declined to buy any of the price plans. If the user declines to buy one of the service plans available from the ISP, the method 1100 continues at step 1102.

If the user accepts one of the price plans available from the ISP, at step 1114, automatic configuration application 904 queries the user for user information data. Depending on requirements of the ISP, automatic configuration application 904 may query a user for different types of information. According to the exemplary embodiment, client device 320A may query a user for credit card information data, an address or a telephone number, for example. When the user inputs the required user information data, automatic configuration application 904 formats the user data into a predetermined format. According to the exemplary embodiment, automatic configuration application 904 formats the user information data into an XML data stream having a number of DTDs associated with the user data. Additionally, automatic configuration application 904 attaches the session ID to the XML data stream and sends the XML data stream to the ISP using an URL, for example.

At step 1116, the ISP verifies whether the required user information data are present and whether the format of the received data complies with the predetermined data structure such as the XML data structure. If the data structure is incorrect or the required data is missing, the ISP server sends an error message to client device 320A. According to an exemplary embodiment, the error message may include the ErrorCode value and the ErrorMessage such as those described in reference to FIGS. 16A and 16B. When client device 320A receives one or more ErrorCodes, automatic configuration application 904 interprets the received ErrorCode. If the ErrorCode pertains to the user information data, automatic configuration application may query the user for information specified by the ErrorCode, for example.

If the format and the user information data are correct, at step 1120, the ISP formats a set of configuration data parameters for configuring client device and sends the configuration data parameters to client device 320A. According to an exemplary embodiment, the ISP formats the configuration data into the XML data stream having a plurality of DTDs associated with configuration parameters. The configuration parameters that the ISP sends to client device include, for example, a POP table, server data and login information for the user. The POP table, the server data and the login information may comprise a number of parameters as described in FIGS. 16A and 16B.

At step 1122, client device 320A receives the formatted set of configuration data from the ISP. According to the exemplary embodiment, the set of configuration data is formatted into the XML data stream having a plurality of DTDs. Therefore, when client device 320A receives the set of configuration data, automatic configuration application 904 processes the DTDs in the XML data stream by identifying each tag's value.

At step 1124, client device 320A initializes a number of applications on client device 320A such as dial-up network application, for example. Further, automatic configuration application 904 forward the configuration data to XML parser 584 that in turn can forward the parsed configuration data to a specialized database arranged to store the configuration data for client device 320A, or it may forward the parsed configuration data to XML database 564. Additionally, automatic configuration application 904 displays the login information to the user via display drivers 530. According to an exemplary embodiment, when configuration data is downloaded to client device 320A from the ISP, client device 320A can download channel data, and automatic configuration application 904 terminates the communication session with the ISP. Later, a user of client device 320A can establish a new communication session with the ISP using the configuration data downloaded from the ISP.

Further, similar to method 1000, the method 1100 is not limited to ISP conforming with the universal type of subscription. In such an embodiment, automatic configuration application 904 may store an internal look up table having a list of assignments between each ISP and data structures associated with each ISP, for example. Based on a selection of an ISP by a user, automatic configuration application 904 can read a data structure used by the ISP selected by the user in the look up table and, subsequently, can employ the data structure of the ISP for any communication with the ISP related to obtaining configuration parameters from the ISP. Similarly, automatic configuration application 904 can store data formats associated with each ISP as described in reference to FIGS. 16A and 16B.

Figure 18:
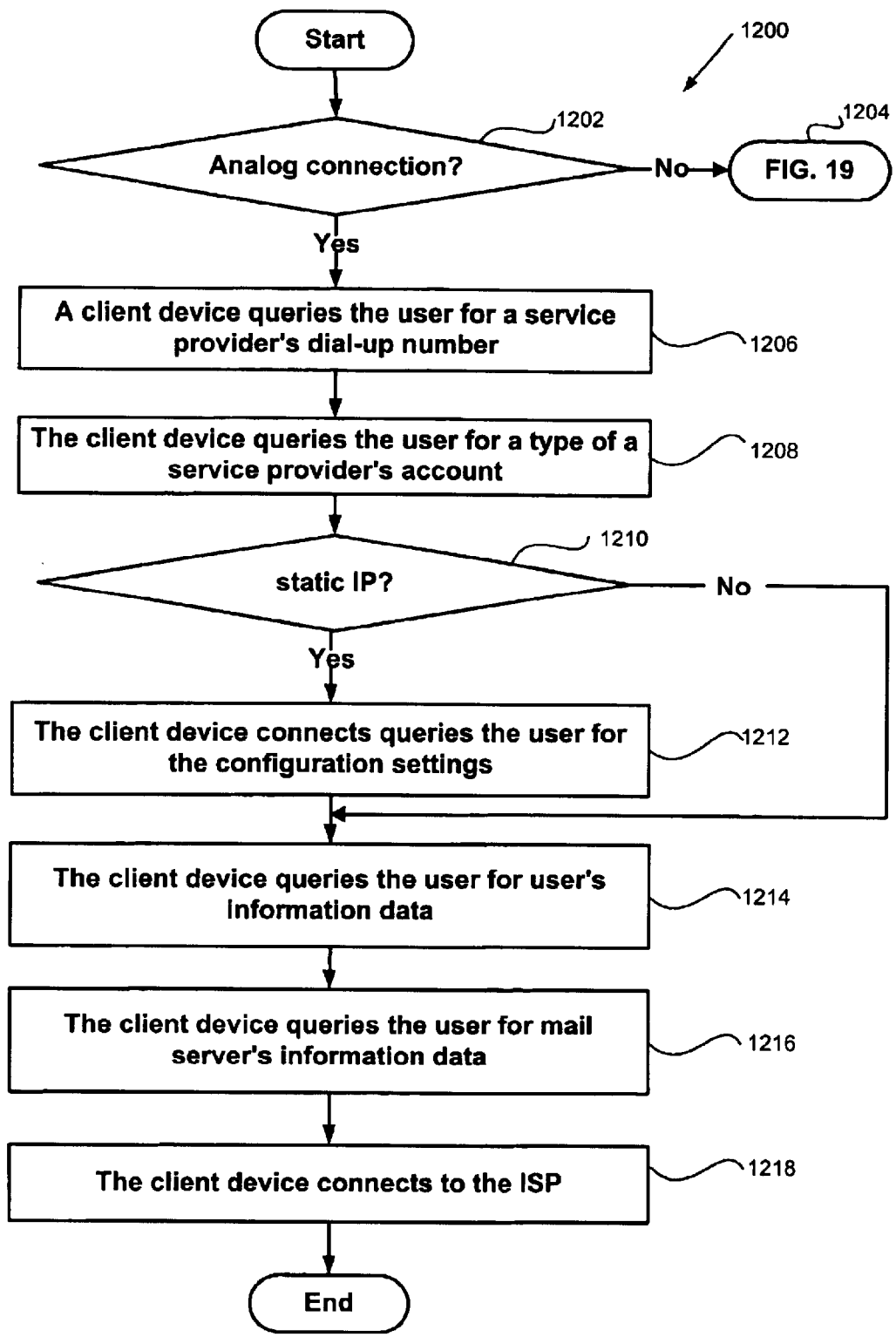
FIG. 18 is a flow chart illustrating a method for configuring a client device, the method in which a user has an existing Internet Service Provider and the user employs analog means to establish communication sessions with the user's Internet Service Provider.

FIG. 18 is a flow chart illustrating a method 1200 for configuring a client device. The method 1200 illustrates an embodiment in which a user has an existing account with a service provider that does not conform to an automatic configuration process. However, the method 1200 requires the user to know the configuration settings of the user's existing ISP connection. To obtain the configuration setting required by the method 1200, the user can either contact the user's current ISP, or the user can copy the configuration parameters from the TCP/IP settings stored on a computer that the user typically uses to connect with the user's ISP. Referring to FIG. 16A, if the user's ISP is not one of the ISPs that client device 320A displays to the user, the method 1000 continues at step 1202 in FIG. 18.

At step 1202, client device 320A queries the user whether the user's connection with the user's ISP is an analog connection and thus, whether the user connects to the user's ISP via an analog modem and a telephone line. If the user does not use an analog connection, the method 1200 continues in FIG. 19, as shown at step 1204.

However, if the user employs an analog connection to connect with the user's ISP, at step 1206, client device 320A queries the user for user's ISP dial-up settings such as one or more telephone numbers that the user typically uses to connect to the ISP. In one embodiment, client device 320A displays to the user a graphical display field, in which the user can input the dial-up settings.

At step 1208, client device 320A queries the user for a type of service provider's account. According to one embodiment, client device 320A can display to the user a number of graphical selection inputs pertaining to types of the service provider's account. For example, client device 320A can query the user whether the user has a Point-to-Point Protocol ("PPP") type of the account or an "assigned-static Internet Protocol ("IP")" type of the account. The PPP type of the account relates to an account in which an ISP assigns a random and unique IP address for every connection. The "assigned-static IP" type of the account relates to a type of an account, in which a user's ISP assigns a static IP address for a user.

At step 1210, client device 320A determined whether the user has an "assigned-static IP" account. If the user does not have an "assigned-static IP" type of the account, the method 1200 continues at step 1214. However, if the user has an "assigned-static IP" type of the account, at step 1212, client device 320A queries the user for configuration settings that the user typically uses to connect to the user's ISP. If the user has an "assigned-static IP" type of the account, client device 320A queries the user for the user's assigned IP address, the user's ISP's subnet mask, the user's primary DNS settings and the user's secondary DNS setting, for example.

At step 1214, client device 320A queries the user fort user's information data such as a username or a password that the user normally uses to gain access to the user's ISP. Further, the client device 320A can query the user whether the user's phone service provider requires the user to dial any additional digits prior to dialing up to the user's ISP. For example, some telephone services require their customers to dial "9" to access an outside line or "*70" to disable call waiting, for example. In one embodiment, client device 320A displays to the user, a plurality of graphical selection inputs pertaining to commonly required digits for Internet dialing. Alternatively, the user can enter any additional digits by simply clicking on the graphical inputs and entering additional digits.

At step 1216, client device 320A queries the user for user's mail server information data. In one embodiment, client device 320A queries the user to enter a user's incoming mail server name (POP3) and a user's outgoing mail server name (SMTP). Further, if the user's e-mail account uses a different name and password than the user's Internet access account, client device 320A can query the user for the user's information data associated with the user's e-mail account.

At step 1218, client device 320A connects to the user's ISP provider using configuration data provided by the user. If client device 320A successfully connects to the ISP provider, client device 320A can display to the user a message stating that client device has been successfully configured, and the method 1200 terminates. Alternatively, if client device 320A is not able to establish a communication link with the user's ISP, client device 320A displays to the user an error message with information pertaining how to resolve the problem.

Figure 19:
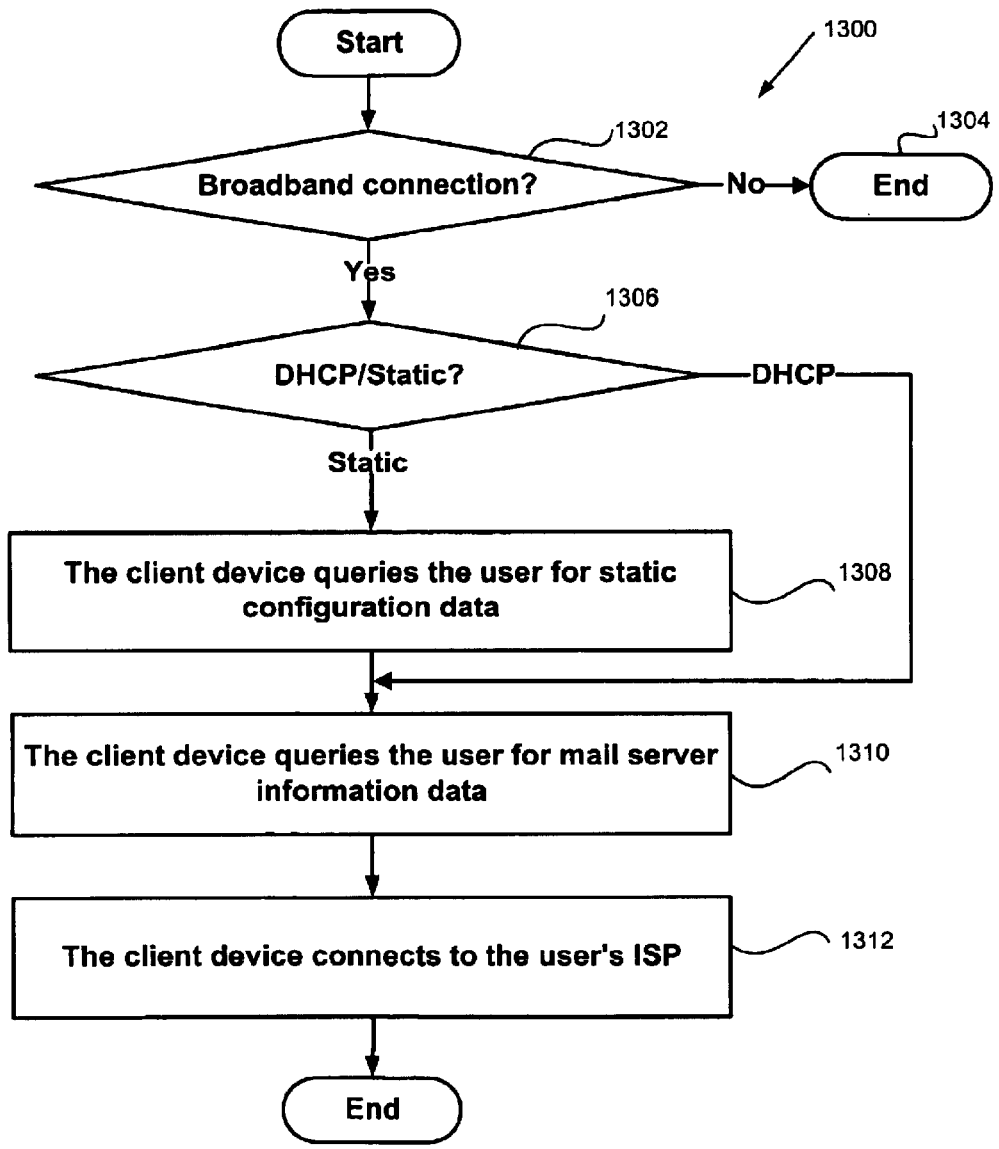
FIG. 19 is a flow chart illustrating a method for configuring a client device, the method in which a user has an existing Internet Service Provider and the user employs broadband means to establish communication sessions with the user's Internet Service Provider.

FIG. 19 is a flow chart illustrating a method 1300 for configuring a client device. The method 1300 describes one embodiment in which a user has an existing account with a service provider that does not conform to an automatic configuration process. Referring to FIG. 18 at step 1202 if the user does use analog means to connect with the user's ISP, the method 1200 continues in FIG. 19. At step 1302, client device 320A queries the user whether the user has broadband Internet access. The broadband Internet access, as known in the art, employs a Digital Subscriber Line ("DSL") technology or cable modem technology to provide a user with the access to the user's ISP. If the user does not have broadband Internet access, the method 1300 terminates as shown at step 1304. Alternatively, client device 320A once again queries the user to select one of the ISPs that accept the automatic configuration process.

If the user has broadband Internet access, at step 1306, client device 320A queries the user whether the user has a Dynamic Host Configuration Protocol ("DHCP") account or an "assigned/static IP" account. If the user has the "assigned/static IP" type of the account, at step 1308, client device 320A queries the user for configuration data. For example, client device 320A queries the user for an ISP's hostname, a static/assigned IP address, an ISP's subnet mask, an ISP's gateway, primary DNS settings and secondary DNS settings. When the user enters required information, the method 1300 continues at step 1310. Further, if client device 320A has determined at step 1306 that the user has a DHCP account, client device 320A can query the user for a hostname of the DHCP system, and the method continues at step 1310.

At step 1310, client device 320A queries the user for mail server information data. In one embodiment, client device 320A queries the user to enter a user's incoming mail server name (POP3) and a user's outgoing mail server name (SMTP). Further, if the user's e-mail account uses a different username or password than the user's Internet access account, client device 320A can query the user for the user's information data associated with the user's e-mail account.

At step 1314, client device 320A connects to the user's ISP provider using configuration data provided by the user. If client device 320A successfully connects to the ISP provider, client device 320A can display to the user a message stating that client device has been successfully configured, and the method 1300 terminates. Alternatively, if client device 320A is not able to establish a communication link with the user's ISP, client device 320A displays to the user an error message with information pertaining how to resolve the problem.

Figure 20:
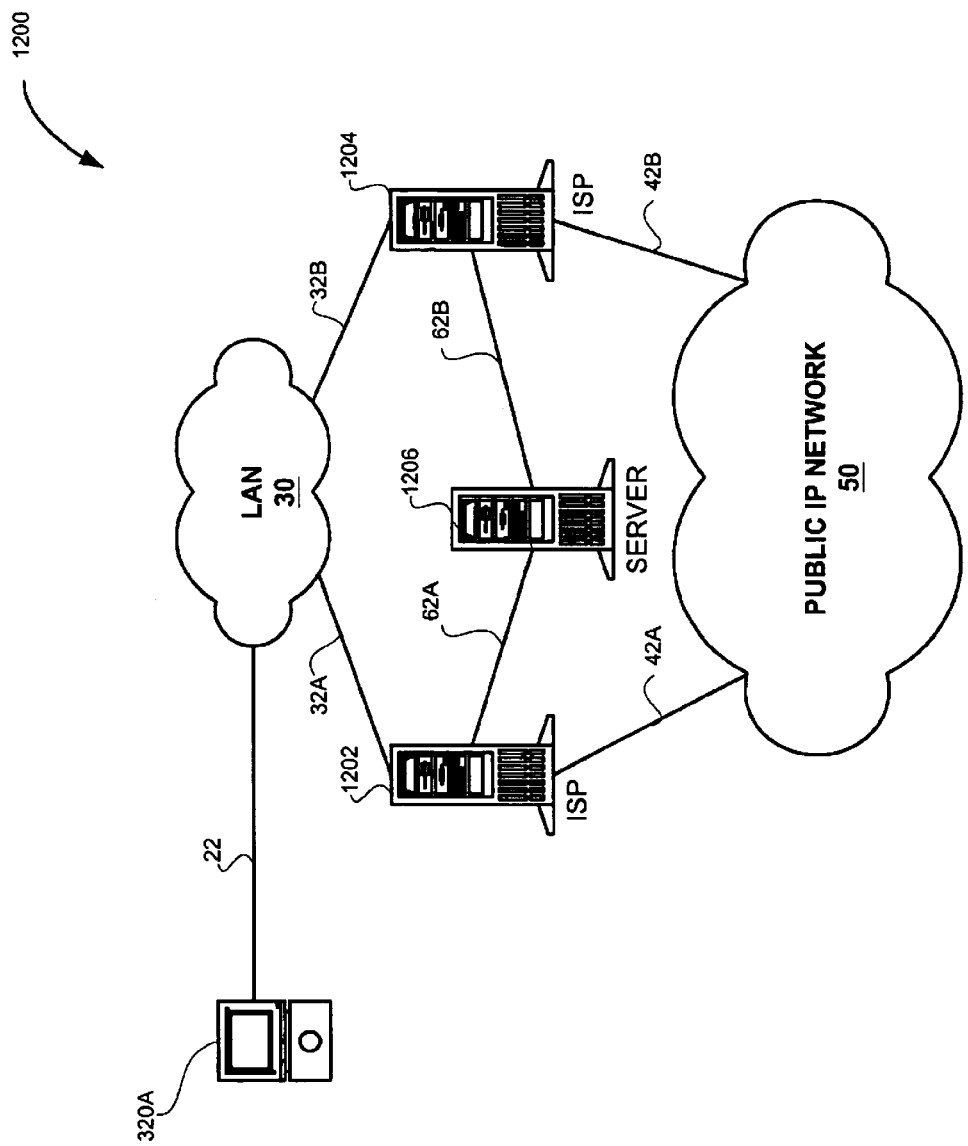
FIG. 20 is a block diagram illustrating a system in which an Internet Service Provider does not conform to a universal type of subscription, however, it allows for an automatic configuration of a client device.

FIG. 20 is an exemplary block diagram illustrating an exemplary system 1400 with major elements used for automatically configuring a client device according to an exemplary embodiment of the present invention. The exemplary system 1400 includes an embodiment of client device 320A connected to LAN 30 via communication link 22. Further, LAN 30 is connected to an ISP 1402 and an ISP 1404 via a communication link 32A and a communication link 32B, respectively. According to an exemplary embodiment, ISP 1402 and ISP 1404 comprises means such as servers and computers via which client device 320A may connect to Public IP Network 50. Further, according to an exemplary embodiment, ISP 1402 and ISP 1404 do not conform to the universal type of subscription, however, they allow for an automatic configuration of client device 320A. ISP 1402 and ISP 1404 are connected to a server 1406 via communication links 62A and 62B, respectively. According to an exemplary embodiment, server 1406 conforms to the universal type of subscription and acts as a translation server for ISP 1402 and 1404. The exemplary block diagram is described by a way of an example, and more, fewer or other functional elements could be employed without departing from the scope of the present invention. For example, ISP 1402 can comprise a firewall, which, as known in the art, limits the exposure of a group of computers to an illegal access from the outside. Further, if ISP 1402 has a firewall, according to an exemplary embodiment, server 1406 can access ISP 1402 through the firewall.

Figure 21A:
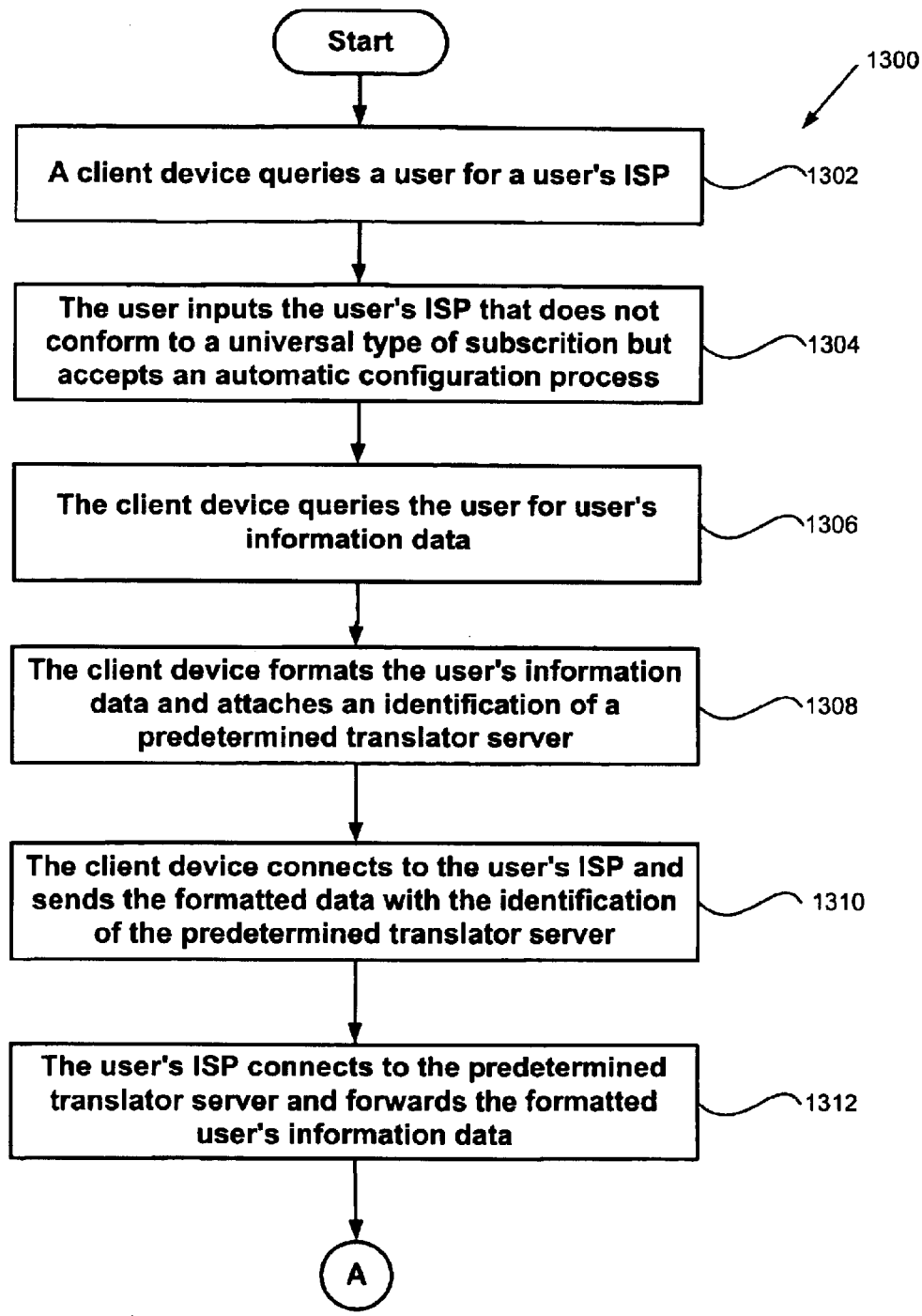
FIGS. 21A and 21B are flow charts illustrating a method for automatically configuring a client device, the method in which a user has an existing account with an Internet Service Provider not conforming to a universal type of subscription, but allowing an automatic configuration of the client device.
Figure 21B:
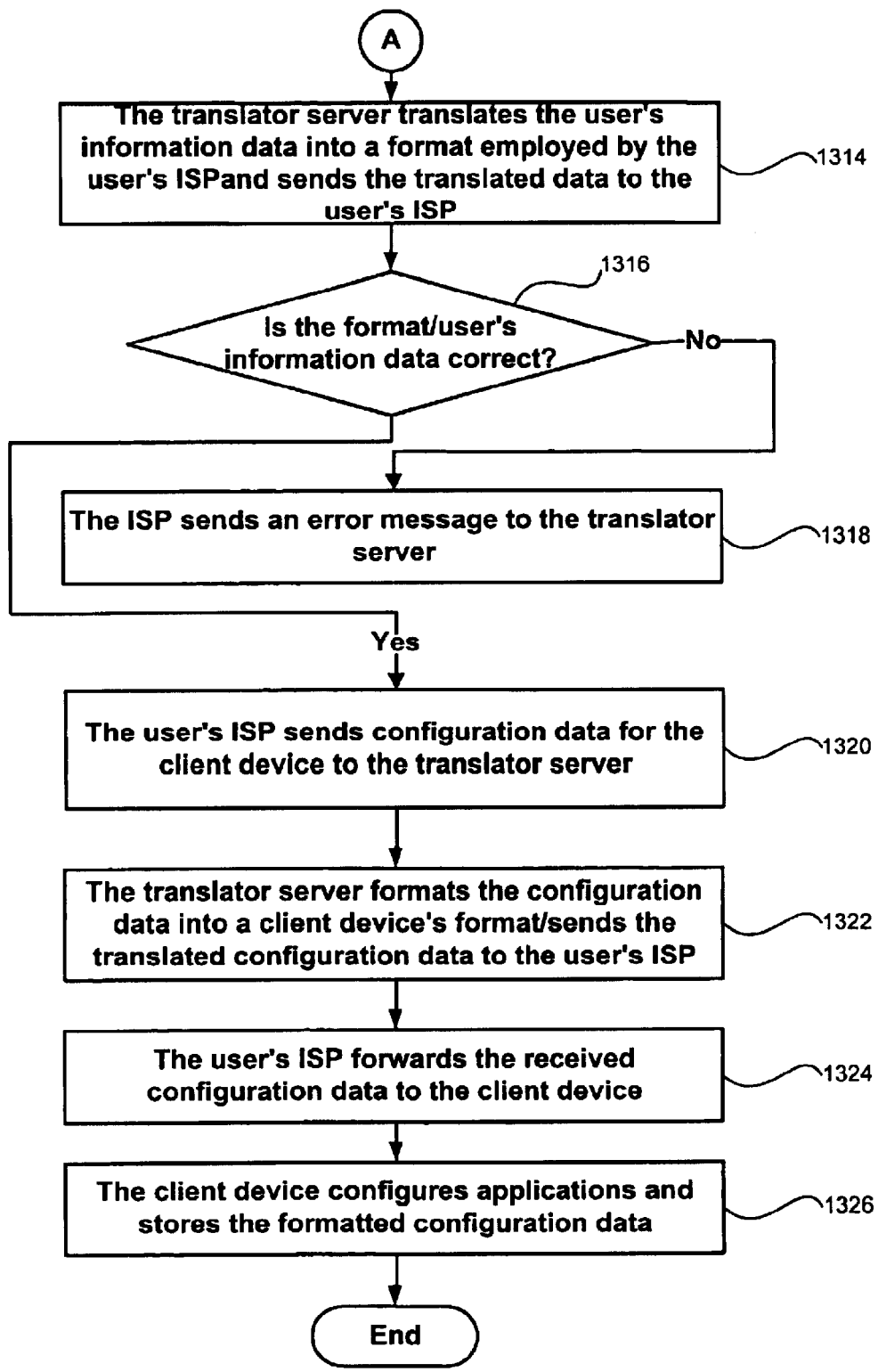

FIGS. 21A and 21B is a flow chart illustrating a method 1500 for automatically configuring a client device such as client device 320A. The method 1500 illustrates a process that client device 320A employs when a user of client device 320A has an existing account with an ISP that does not conform to the universal type of subscription, but allows for an automatic configuration of the user's client device such as client device 320A. The method 1300 illustrated in FIGS. 21A and 21B will be described in reference to ISP 1402 and translator server 1406. However, the exemplary embodiment is not limited to these network devices and other network devices could also be used.

At step 1502, automatic configuration application 904 of client device 320A queries a user whether the user has an existing ISP. In an exemplary embodiment, the user may select one of the graphical selection inputs, to answer the query. According to an exemplary embodiment, the user has the existing ISP and, thus, the user is queried for a name of the user's ISP. To enable a user to answer the query, client device 320A may display for the user a number of graphical selection inputs, each of which pertains to one name of ISP. At step 1504, the user selects one of the ISP providers by selecting one of the graphical selection inputs, for example. According to an exemplary embodiment, the user's existing ISP such as ISP 1402 does not conform to the universal type of subscription, however, it allows for the automatic configuration process.

At step 1506, client device 320A queries the user for user's information data. According to an exemplary embodiment, client device 320A requests the user to input a user's e-mail address, a user's password or user's location information such as a user's telephone number, for example. However, the exemplary embodiment is not limited to client device 320A querying the user for such user's data. For example, client device 320A could query the user for other types of user's information data as long as the user's existing ISP can match a particular ISP user with the user's information data.

At step 1508, automatic configuration application 904 formats the user's information data into a predetermined structure, such as an XML data stream having a plurality of DTD associated with the user's information data. Further, according to an exemplary embodiment, automatic configuration application 904 attaches to the XML data stream an identifier of a translator server such as translator server 1406, for example. The attached identifier can be an IP address of translator server 1406, for example.

At step 1510, client device 320A connects to ISP 1402. In an exemplary embodiment, automatic configuration application 904 employs one of the communication ports of communication drivers 550 such as a modem to establish a communication session with ISP 1402. When the communication session is established, automatic application configuration 904 sends to ISP 1402 the formatted user's information data with the attached identifier of translator server 1406. According to an exemplary embodiment, client device 320A sends the formatted user's information data in a form of a URL to ISP 1402, as described in reference to FIGS. 16A and 16B. However, a URL sent from client device 320A in an exemplary embodiment includes additional data pertaining to the identifier of the translator server such as the IP address of translator server 1406.

When ISP 1402 receives the data from client device and detects the identifier of translator server 1406, at step 1512, ISP 1202 establishes a communication session with translator server 1406. According to an exemplary embodiment, ISP 1402 communicates with translator server 1406 via communication link 62A. Further, ISP 1502 forwards the received user's information data to translator server 1406.

When translator server 1406 receives the user's information data from ISP 1402, at step 1514, translator server 1406 translates the received data into a data structure and a data format compliant with a data structure and format of ISP 1402. According to an exemplary embodiment, translator server 1406 comprises a look up table comprising identifications of each ISP and a data structure and a data format associated with each ISP. According to the exemplary embodiment, if ISP 1402 employs an HTML data structure and when translator server 1406 receives the user's information data in the XML data structure, translator server 1406 parses the user's data and translates the parsed data into a data structure compliant with a data structure of ISP 1402, such as the HTML data structure. Further, translator server 1406 transmits the translated user's information data to ISP 1402 via communication link 62A.

When ISP 1402 receives the translated user's information data, at step 1516, ISP 1402 verifies whether the data structure and data format of the received data are correct and whether the required user's information data are present. If ISP 1402 verifies that the format or user's data is incorrect, at step 1518, ISP 1402 sends an error message to translator server 1406. For example, if the format of the received data is incorrect, ISP 1402 can send to translator server 1406 an error message pertaining to a translation error. In such an embodiment, translator server 1406 can retranslate the user's information data and re-send that data to ISP 1402. Further, for example, if the user's data is incorrect, ISP 1402 sends to translator server 1406 an error message pertaining to an incorrect data error. In such an embodiment, translator server 1406 may send an ErrorCode value and an ErrorMessage to client device 320A via ISP 1402. The exemplary set of ErrorCode values has been described in reference to FIGS. 16A and 16B. Upon a receipt of one or more ErrorCode values, automatic configuration application 904 on client device 320A processes the received ErrorCode values and depending on a type of the ErrorCode queries the user for user's information data. Then, automatic configuration application 904 translates the new data into an XML data stream, and the method 1500 continues at steps 1512, 1514 and 1516.

Referring back to step 1516, if ISP 1402 verifies that the format of the data and the user's information data are correct, at step 1520, ISP 1402 sends configuration data for client device 320A to translator server 1406 via communication link 62A. According to an exemplary embodiment, ISP 1402 sends the configuration data in the HTML format. The configuration data can comprise a list of telephone numbers assigned based on the user's location, server data for configuring applications on client device 320A and login information for the user of client device 320A to access ISP 1402.

When translator server 1406 receives the configuration data from ISP 1402, at step 1522, translator server 1406 formats the received configuration data into a predetermined format. According to an exemplary embodiment, translator server 1406 translates the configuration data into an XML data stream with a plurality of DTDs. Upon a completion of the translation process, translator server 1406 sends the translated configuration data to ISP 1402 with a request for ISP 1402 to forward the translated configuration data to client device 320A.

At step 1524, when ISP 1402 receives the translated configuration data, ISP 1402 forwards the configuration data to client device 320A. At step 1526, client device 320A receives the configuration data from ISP 1402. According to the exemplary embodiment, the configuration data comprises the XML data stream with the number of DTDs. Therefore, when client device 320A receives the configuration data, automatic configuration application 904 processes the received DTDs in the XML data stream by identifying each tag value associated with the DTDs. Further, at step 1526, automatic configuration application 904 uses the configuration parameters to initialize applications such as a dial-up network application, for example. Additionally, automatic configuration application 904 forwards the configuration data to XML parser 584 that in turn forwards the parsed configuration data to a database arranged to store configuration data for client device 320A. Further, automatic configuration application 904 forwards the login information data to display drivers 530 to be displayed to the user. According to an exemplary embodiment, automatic configuration application 904 terminates the communication session with ISP 1402 when client device 320A downloads the configuration data. Later, a user of client device 320A can establish a new communication session with ISP 1402 using the downloaded configuration parameters.

The method 1500 described in reference to FIGS. 21A and 21B is a universal type of method and does not have to be specially customized for each ISP that does not conform to the universal type of subscription, but which accepts the automatic configuration process. Further, a client device such as client device 320A is not limited to sending user information data to an ISP, and the ISP then forwarding the data to a translator server. Alternatively, the client device can first establish a communication session with a translator server and send the user information data to the translator server. Further, the translator server can translate the data into a data structure/data format of the ISP selected by the user, and then it may establish a communication link with that ISP and send the translated data to the ISP. Therefore, in such an embodiment, when the translator server receives configuration data from the ISP, the translator server can translate the configuration data and send the data directly to the client device.

Alternatively, if the user does not have an existing ISP, client device 320A displays to the user a list of ISPs that accept the automatic configuration process, and the list may include a plurality of ISPs that conform to the universal type of configuration and those that do not. For example, if a user selects an ISP that does not conform to the universal type of configuration, prior to querying the user for user's information data, client device 320A establishes a communication session with the ISP selected by the user and requests the ISP to transmit price plans. In an exemplary embodiment, client device 320A transmits an identification of a translator server in combination with the request for the price plans. Further, client device 320A transmits data to the ISP in the XML data stream, for example. Thus, when the ISP receives the request, the ISP assigns a Session ID, establishes a communication session with the specified translator server, and forwards the received request to the translator server. Upon a reception of the forwarded request, the translator server translates data in the request to a data structure compliant with a data structure that is employed by the ISP such as an HTML data stream, for example. Subsequently, the translator server sends the translated request to the ISP, which in turn processes the request and sends available price plans to the translator server in an HTML data stream, for example. In addition to the available price plans, the ISP may attach billing information data, user agreement data, for example. Subsequently, the translator server translates the HTML into an XML data stream and forwards the translated data to the ISP, which forwards the data to client device 320A. Upon a reception of data with price plans, client device 320A displays the available price plans along with any additional information such as billing information to the user. When the user selects one of the price plans, the exemplary embodiment can continue as shown in FIGS. 21A and 21B starting at step 1506 on and excluding the step of establishing a communication session with the ISP as described in step 1510.

In a view of the wide variety of embodiments to which the principles of the invention can be applied, it should be understood that the illustrated embodiment is an exemplary embodiment, and should not be taken as limiting the scope of the invention. For example, one of ordinary skill in the art will readily appreciate that various elements of the present invention can be practiced with software, hardware, or a combination of thereof.

The claims should not be read as limited to the described order or elements unless stated to that effect. Therefore, all embodiments that come within the scope and spirit of the following claims and equivalent thereto are claimed as the invention.

We claim:

1. A method for automatically configuring a client device for communication with a service provider, the method comprising:

selecting a service provider by a user on the client device, wherein the user selects the service provider from a plurality of service providers;

entering user information data on the client device, wherein the user information data can be used by one of the plurality of service providers to create configuration data for the client device used to configure the client device to access the service provider;

accessing the service provider by the client device and providing user information data to the service provider, wherein the client device provides the user information data in a first data structure;

providing by the service provider to a translation network device the user information data in the first data structure;

converting on the translation network device the user information data from the first data structure to a second data structure, wherein the service provider communicates in a second data structure;

providing by the translation network device the user information data in the second data structure to the service provider;

receiving at the client device configuration data from the service provider; and configuring the client device based on the configuration data.

2. The method of claim 1, wherein the user information data comprises user identification data and user location data.

3. The method of claim 1, wherein the user information data comprises an XML data stream.

4. The method of claim 1, wherein a format for the user information data is the same for each of the plurality of service providers.

5. The method of claim 1, wherein the step of accessing the service provider comprises accessing a server associated with the service provider.

6. The method of claim 5, wherein accessing the server associated with the service provider comprises a URL query.

7. The method of claim 1, wherein the configuration data comprises server data communication data and user login data.

8. The method of claim 1, wherein the configuration data comprises an XML data stream.

9. The method of claim 1, further comprising storing in a memory unit of the client device the configuration data.

10. The method of claim 1, wherein the first data structure comprises an XML data structure.

11. The method of claim 1, wherein the second data structure comprises an HTML data structure.

12. The method of claim 1, wherein the translation network device comprises a translator server in communication with the service provider.

13. The method of claim 1, further comprising:

providing the configuration data in the second data structure to the translation network device;

converting the configuration data from the second data structure to the first data structure by the translation network device; and sending the configuration data in the first data structure from the translation network device to the service provider; wherein the step of providing by the service provider the configuration data to the client device comprises providing the configuration data in the first data structure.

14. A system for automatically configuring a client device for communication with a service provider, the system comprising:

the client device arranged to:

query a user for a service provider, wherein the client device is arranged to provide a user with an ability to select one of a plurality of service providers;

query the user for user information data;

send the user information data to the service provider selected by the user wherein the user information data can be used by one of the plurality of service providers to create configuration data used to configure the client device, wherein the client device is further arranged to send the user information data to one of the plurality of service providers in a first data structure;

receive configuration data from the service provider selected by the user;

use the received configuration data to configure an internal application; and establish a communication session with the service provider selected by the user;

the plurality of service providers in communication with the client device, each service provider arranged to:

create the configuration data upon receipt of the user information data, based on the user information data;

send the configuration data to the client device, wherein the plurality of service providers is further arranged to send the configuration data to the client device in the first data structure, and;

wherein the plurality of service providers is further arranged to:

communicate in a second data structure;
communicate with a translator network device arranged to:
receive data in the first data structure from one of the plurality service providers;
translate the data in the first data structure to data in the second data structure;
send the data in the second data structure to one of the plurality service providers,
receive data in the second data structure;
translate the data in the second data structure to data in the first data structure; and
send the data in the first data structure to the one of the plurality of service providers.

15. The system of claim 14, wherein the first data structure is an XML data structure.

16. The system of claim 14, wherein the plurality of service providers is arranged to communicate in the first data structure.

17. The system of claim 14, wherein the second data structure comprises an HTML data structure.

18. The system of claim 14, wherein the translator network device comprises a translator server.

19. The system of claim 14, wherein the data translated from the first data structure comprises the user information data.

20. The system of claim 14, wherein the data translated from the second data structure to the first data structure comprises the configuration data.

21. The system of claim 14, wherein the translator network device is further arranged to:
communicate with the client device;
receive the data in the first structure from the client device; and
send the data structure to the client device.

* * * * *